United States Patent
O'Kelly et al.

(10) Patent No.: US 11,861,321 B1
(45) Date of Patent: Jan. 2, 2024

(54) SYSTEMS AND METHODS FOR STRUCTURE DISCOVERY AND STRUCTURE-BASED ANALYSIS IN NATURAL LANGUAGE PROCESSING MODELS

(71) Applicant: Casetext, Inc., San Francisco, CA (US)

(72) Inventors: Brian O'Kelly, Denver, CO (US); Javed Qadrud-Din, Union City, CO (US); Ryan Walker, Lancaster, PA (US); Walter DeFoor, Rockville, MD (US); Pablo Arredondo, Palo Alto, CA (US)

(73) Assignee: Casetext, Inc., San Francisco, CA (US)

( * ) Notice: Subject to any disclaimer, the term of this patent is extended or adjusted under 35 U.S.C. 154(b) by 0 days.

(21) Appl. No.: 18/344,344

(22) Filed: Jun. 29, 2023

(51) Int. Cl.
| | |
|---|---|
| G06F 40/40 | (2020.01) |
| G06F 40/289 | (2020.01) |
| G06F 40/186 | (2020.01) |
| G06F 16/338 | (2019.01) |
| G06F 40/205 | (2020.01) |
| G06F 16/33 | (2019.01) |
| G06F 40/174 | (2020.01) |
| G06F 40/279 | (2020.01) |

(52) U.S. Cl.
CPC ............ *G06F 40/40* (2020.01); *G06F 16/33* (2019.01); *G06F 16/338* (2019.01); *G06F 16/3344* (2019.01); *G06F 40/174* (2020.01); *G06F 40/186* (2020.01); *G06F 40/205* (2020.01); *G06F 40/279* (2020.01); *G06F 40/289* (2020.01)

(58) Field of Classification Search
CPC .... G06F 16/33; G06F 16/3344; G06F 40/279; G06F 40/289
See application file for complete search history.

(56) References Cited

U.S. PATENT DOCUMENTS

| | | | |
|---|---|---|---|
| 8,812,291 | B2 | 8/2014 | Brants et al. |
| 11,281,976 | B2 | 3/2022 | Dua et al. |
| 11,481,416 | B2 | 10/2022 | Dua et al. |

(Continued)

OTHER PUBLICATIONS

Chen et al. ("Data Extraction via Semantic Regular Expression Synthesis." arXiv preprint arXiv:2305.10401 (May 17, 2023)) (Year: 2023).*

(Continued)

*Primary Examiner* — Samuel G Neway
(74) *Attorney, Agent, or Firm* — Polygon IP, LLP

(57) ABSTRACT

A regular expression prompt may be determined by combining a regular expression prompt template with input text from an input document. The regular expression prompt template may include a natural language instruction to identify one or more regular expressions from the input text and one or more fillable portions designated for filling with the input text. The regular expression prompt may be sent to a large language model for evaluation, and one or more regular expressions may be identified based on a response received from the large language model. The regular expressions may be used to disaggregate the input text, and the disaggregated text portions may be used to determine a structured document based on the input document. The structured document may be used to determine a response to a query of the input document.

20 Claims, 21 Drawing Sheets

(56) References Cited

U.S. PATENT DOCUMENTS

| | | |
|---|---|---|
| 2011/0125734 A1 | 5/2011 | Duboue et al. |
| 2014/0172907 A1* | 6/2014 | Dubbels ............... G06F 16/3338 |
| | | 707/769 |
| 2018/0075011 A1 | 3/2018 | Allen et al. |
| 2018/0322110 A1 | 11/2018 | Rhodes et al. |
| 2019/0042551 A1 | 2/2019 | Hwang |
| 2019/0286753 A1* | 9/2019 | Feng ................. G06F 16/24578 |
| 2020/0019642 A1 | 1/2020 | Dua et al. |
| 2020/0243076 A1 | 7/2020 | Kim |
| 2020/0342862 A1 | 10/2020 | Gao et al. |
| 2020/0364403 A1 | 11/2020 | Choi et al. |
| 2021/0124876 A1 | 4/2021 | Kryscinski et al. |
| 2021/0326428 A1 | 10/2021 | Edwards et al. |
| 2021/0374341 A1 | 12/2021 | Krause et al. |
| 2022/0180051 A1 | 6/2022 | Lillemo et al. |
| 2022/0253447 A1 | 8/2022 | Boytsov et al. |
| 2022/0284174 A1 | 9/2022 | Galitsky |
| 2022/0300718 A1 | 9/2022 | Chen et al. |
| 2023/0080674 A1 | 3/2023 | Attali et al. |
| 2023/0092702 A1 | 3/2023 | Mao et al. |
| 2023/0108863 A1 | 4/2023 | Gunasekara et al. |
| 2023/0121711 A1 | 4/2023 | Chhaya et al. |

OTHER PUBLICATIONS

Barsha et al., "Natural Language Interface to Database by Regular Expression Generation." 2021 5th International Conference on Electrical Information and Communication Technology (EICT). IEEE, (Year: 2021).*

U.S. Appl. No. 18/154,175, Final Office Action dated Jun. 29, 2023, 22 pgs.

U.S. Appl. No. 18/154,175, Non Final Office Action dated Apr. 21, 2023, 20 pgs.

U.S. Appl. No. 18/169,701, Final Office Action dated Jun. 29, 2023, 42 pgs.

U.S. Appl. No. 18/169,701, Non Final Office Action dated May 3, 2023, 38 pgs.

U.S. Appl. No. 18/169,707, Non Final Office Action dated May 10, 2023, 33 pgs.

Lewis, Patrick et al. Retrieval-Augmented Generation for Knowledge-Intensive NLP Tasks. Facebook AI Research, University College London; New York University; Apr. 12, 2021.

* cited by examiner

SYSTEMS AND METHODS FOR STRUCTURE DISCOVERY AND STRUCTURE-BASED ANALYSIS IN NATURAL LANGUAGE PROCESSING MODELS

FIELD OF TECHNOLOGY

This patent document relates generally to natural language processing systems and more specifically to structure-based analysis.

BACKGROUND

Natural language processing systems are increasingly sophisticated. Large language models are pre-trained to generate text. A large language model may be provided with input text, such as a question. The model may then provide output text in response, such as an answer to the question. Recent advances have led large language models to become increasingly powerful, often able to produce text that approaches that which would be generated by humans.

Many applications of large language models are based on input documents. However, documents are often structured in complex ways. For some types of documents, much of the semantic content is embedded in the structure of the document rather than the words. Conventional natural language processing approaches do not accurately and effectively account for document structure. Accordingly, improved techniques for natural language processing are needed.

BRIEF DESCRIPTION OF THE DRAWINGS

The included drawings are for illustrative purposes and serve only to provide examples of possible structures and operations for the disclosed inventive systems, apparatus, methods and computer program products for structural analysis of documents text. These drawings in no way limit any changes in form and detail that may be made by one skilled in the art without departing from the spirit and scope of the disclosed implementations.

DETAILED DESCRIPTION

Figure 1:
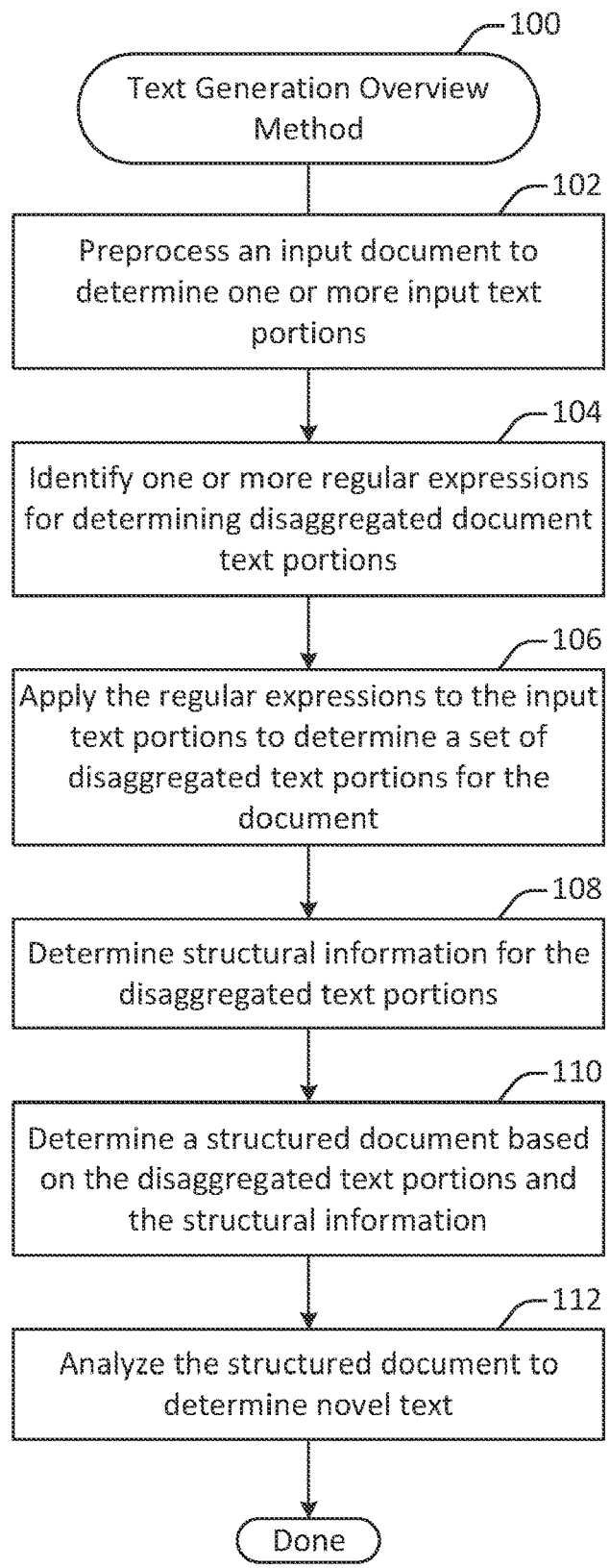
FIG. 1 illustrates an overview method for generating novel text, performed in accordance with one or more embodiments.

Techniques and mechanisms described herein provide for the generation of novel text based on structured input documents. According to various embodiments, a document may first be analyzed by a large language model to identify a set of structural components. The structural components may then be used to subdivide the document into individual portions of text. These text portions may then be analyzed to determine a structural information associated with each portion. The structural information and the text portions may then be used to determine a structured document in which the text portions are arranged and organized in association with structural information. Finally, the structured document may be analyzed by a large language model to generate novel text.

Consider the challenge of a transactional attorney who wishes to understand the common formulation of a given deal term in the market for contracts having particular characteristics. Using conventional techniques, the transactional attorney would need to rely on inaccurate and/or incomplete information, such as personal knowledge, simple text searches, surveys, practice guides, manual review of large volumes of documents, and the like. Such processes are slow, expensive, and/or error prone. The same is true for a variety of such complex, text-based inquiries. The following example queries that may be addressed in accordance with some embodiments of techniques and mechanisms described herein are drawn from the analysis of legal contracts. For example, "Show me material adverse effect definitions from public company merger agreements in the last 2 years." As another example, "Identify all double trigger vesting acceleration clauses." As yet another example, "What is the typical liquidation preference multiple in Series B rounds in the last 3 years?" As still another example, "Was it typical for force majeure clauses to mention pandemics prior to 2020?"

Making matters worse, many documents included useful information embedded in the document structure itself. As a simple example, consider a document that includes a list of factual assertions under a heading that states: "These statements have been admitted as false." Considered in isolation, each of the factual assertions would lead a conventional natural language processing system to an inaccurate conclusion. As another simple example, consider a document that includes one subheading that identifies statements of facts agreed upon by the parties, and another subheading identifying statements of fact that are in dispute. Again, the contextual information embedded in the document's structure is helpful for a natural language processing system to more fully understand the text of the document within each subheading.

In contrast, embodiments of techniques and mechanisms described herein may be used to generate answers to complex queries of natural language documents. For instance, keeping to the above example, a set of reference contracts may be parsed to generate or update a database table characterizing the reference contracts along one or more numerical and/or classification dimensions. The database system may then be queried using terms identified based on a search query to identify a set of contracts that exhibit particular characteristics. The identified documents may then be further analyzed using a large language model to determine and quantify the various formulations of the given deal term for those documents, based in part on the structure of such documents.

According to various embodiments, techniques and mechanisms described herein may be able to review large numbers of documents and to understand them sufficiently well so as to classify them along one or more numerical and/or discrete dimensions. The documents may then be filtered to identify a subset of documents relevant to a particular search query. The text of the filtered documents may then be analyzed against the search query to produce document-level answers to the search query. These document-level answers may then be combined into a single response to the search query. For instance, the system may answer a search query that asks about which features are common in a subset of a corpus of documents that exhibit one or more characteristics.

According to various embodiments, techniques and mechanisms described herein provide for novel text generation in domain-specific contexts. A text generation interface system may take as input one or more arbitrary documents, process them via optical text recognition, segment them into portions, and process the segmented text via various tasks based on need. Different workflows are provided for different tasks, and this application describes a number of examples of such workflows. In many workflows, an input document is divided into chunks via a chunking technique. Then, chunks are inserted into prompt templates for processing by a large language model such as the GPT-3 or GPT-4 available from OpenAI. The large language model's response is then parsed and potentially used to trigger additional analysis, such as one or more database searches, one or more additional prompts sent back to the large language model, and/or a response returned to a client machine.

According to various embodiments, techniques and mechanisms described herein provide for retrieval augmented generation. A search is conducted based on a search query. Then, the search results are provided to an artificial intelligence system. The artificial intelligence system then further processes the search results to produce an answer based on those search results. In this context, a large language model may be used to determine the search query, apply one or more filters and/or tags, and/or synthesize potentially many different types of search. Such techniques may be aided by employing structured rather than unstructured document text.

According to various embodiments, techniques and mechanisms described herein provide for a sophisticated document processing pipeline. The pipeline receives one or more input documents, identifies text that should be kept together, identifies extraneous text such as headers, footers, and line numbers, and segments the text accordingly. In this way, the quality of the text provided to the rest of the system is improved. Similarly, document text may be subdivided into portions which may then be arranged in accordance with structural information. In this way, the contextual information embedded in document structure may be employed during document analysis.

According to various embodiments, techniques and mechanisms described herein provide for new approaches to text segmentation. Large language models often receive as input a portion of input text and generate in response a portion of output text. In many systems, the large language model imposes a limit on the input text size. Accordingly, in the event that the large language model is asked to summarize a length document, the document may need to be segmented into portions in order to achieve the desired summarization.

Conventional text segmentation techniques frequently create divisions in text that negatively affect the performance of the model, particularly in domains-specific contexts such as law. For example, consider a caption page of a legal brief, which includes text in a column on the left that encompasses the parties, text in a column on the right that includes the case number, a title that follows lower on the page, and line numbering on the left. In such a configuration, the text in the different columns should not be mixed and should be treated separately from the line numbers, while both columns should precede the document title, when converting the document to an input query for a large language model. However, conventional techniques would result in these semantically different elements of text being jumbled together, resulting in an uninformative query provided to the large language model and hence a low-quality response. In contrast to these conventional techniques, techniques and mechanisms described herein provide for a pipeline that cleans such raw text so that it can be provided to a large language model.

According to various embodiments, techniques and mechanisms described herein provide for the division of text into chunks, and the incorporation of those chunks into prompts that can be provided to a large language model. For instance, a large language model may impose a limit of, for instance, 8,193 tokens on a task, including text input, text output, and task instructions. In order to process longer documents, the system may split them. However, splitting a document can easily destroy meaning depending on where and how the document is split. Techniques and mechanisms described herein provide for evenly splitting a document or documents into chunks, and incorporating those chunks into prompts, in ways that retain the semantic content associated with the raw input document or documents.

In some embodiments, techniques and mechanisms described herein may be applied to generate novel text in domain-specific contexts, such as legal analysis. Large language models, while powerful, have a number of drawbacks when used for technical, domain-specific tasks. When using conventional techniques, large language models often invent "facts" that are actually not true. For instance, if asked to summarize the law related to non-obviousness in the patent context, a large language model might easily invent a court case, complete with caption and ruling, that in fact did not occur. In contrast to conventional techniques, techniques and mechanisms described herein provide for the generation of novel text in domain-specific contexts while avoiding such drawbacks.

According to various embodiments, techniques and mechanisms described herein may be used to automate complex, domain-specific tasks that were previously the sole domain of well-trained humans. Moreover, such tasks may be executed in ways that are significantly faster, less expensive, and more auditable than the equivalent tasks performed by humans. For example, a large language model may be employed to produce accurate summaries of legal texts, to perform legal research tasks, to generate legal documents, to generate questions for legal depositions, and the like.

In some embodiments, techniques and mechanisms described herein may be used to divide text into portions while respecting semantic boundaries and simultaneously reducing calls to the large language model. The cost of using many large language models depends on the amount of input and/or output text. Accordingly, techniques and mechanisms described herein provide for reduced overhead associated with prompt instructions while at the same time providing for improved model context to yield an improved response.

In some embodiments, techniques and mechanisms described herein may be used to process an arbitrary number of unique documents (e.g., legal documents) that cannot be accurately parsed and processed via existing optical character recognition and text segmentation solutions.

In some embodiments, techniques and mechanisms described herein may be used to link a large language model with a legal research database, allowing the large language model to automatically determine appropriate searches to perform and then ground its responses to a source of truth (e.g., in actual law) so that it does not "hallucinate" a response that is inaccurate.

In some embodiments, techniques and mechanisms described herein provide for specific improvements in the legal domain. For example, tasks that were previously too laborious for attorneys with smaller staffs may now be more easily accomplished. As another example, attorneys may automatically analyze large volumes of documents rather than needing to perform such tasks manually. As another example, text chunking may reduce token overhead and hence cost expended on large language model prompts. As yet another example, text chunking may reduce calls to a large language model, increasing response speed. As still another example, text chunking may increase and preserve context provided to a large language model by dividing text into chunks in semantically meaningful ways.

According to various embodiments, techniques and mechanisms described herein may provide for automated solutions for generated text in accordance with a number of specialized applications. Such applications may include, but are not limited to: simplifying language, generating correspondence, generating a timeline, reviewing documents, editing a contract clause, drafting a contract, performing legal research, preparing for a depositions, drafting legal interrogatories, drafting requests for admission, drafting requests for production, briefing a litigation case, responding to requests for admission, responding to interrogatories, responding to requests for production, analyzing cited authorities, and answering a complaint.

FIG. 1 illustrates an overview method 100 for generating novel text, performed in accordance with one or more embodiments. In some implementations, the method 100 may be performed at a text generation interface system such as the system 200 shown in FIG. 2. For instance, the method 100 may be performed at the text generation interface system 210.

An input document is preprocessed at 102 to determine one or more input text portions. According to various embodiments, preprocessing an input document may involve one or more operations related to cleaning, parsing, tokenizing, sharding, analyzing, structuring, or dividing the text of the input document. Additional details regarding some examples of the types of operations that may be performed during document preprocessing are discussed with respect to FIG. 3, FIG. 4, and FIG. 5.

One or more regular expressions for determining disaggregated document portions are identified at 104. In some implementations, regular expressions may be determined by providing some or all of the input text portions determined at 102 to a large language model for analysis. The text portions may be included in one or more prompts that in turn include natural language instructions to the large language model. The instructions may instruct the large language model to determine one or more natural expressions for subdividing the text into portions that correspond with structural elements of the input document. For instance, a structural element may include a heading, a subheading, a paragraph, a bulleted list, or some other type of text included within the document. Additional details regarding the determination of the regular expressions are discussed with respect to the method 1800 shown in FIG. 18.

The regular expressions are applied to the text of the document at 106 to determine a set of disaggregated text portions. In some embodiments, applying the regular expressions may involve executing them against the disaggregated text portions to determine a match.

When a match is determined, an input text portion may be divided into two or more disaggregated text portions. The disaggregated text portions may in turn be evaluated against other regular expressions until the input text portions have been fully subdivided. Additional details regarding the disaggregation of the input text portions into the disaggregated text portions are discussed with respect to the method 1900 shown in FIG. 19.

Structural information is determined for the disaggregated text portions at 108. In some embodiments, the structural information may be determined at least in part by providing to a large language model one or more prompts that include the disaggregated text portions. The one or more prompts may include natural language instructions to determine structural information for the disaggregated text portions. Additional details regarding the determination of structural information are discussed with respect to the method 2000 shown in FIG. 20.

A structured document is determined at 110 based on the disaggregated text portions and the structural information. In some embodiments, determining a structured document may involve creating a data structure, structured document (e.g., XML, JSON, etc.), or other type of output that reflects both the input text portions and the structural information. Additional details regarding the determination of the structured document are discussed with respect to the method 2100 shown in FIG. 21.

The structured document is analyzed at 112 to determine novel text. According to various embodiments, the operations performed when determining novel text based on the structured document may vary based on the type of application. Examples of such applications may include, but are not limited to: search, querying, policy evaluation, correspondence generation, filtering, and more. Additional details regarding the determination of novel text based on the structured document are discussed throughout the application, for instance with respect to FIGS. 8-18.

Figure 2:
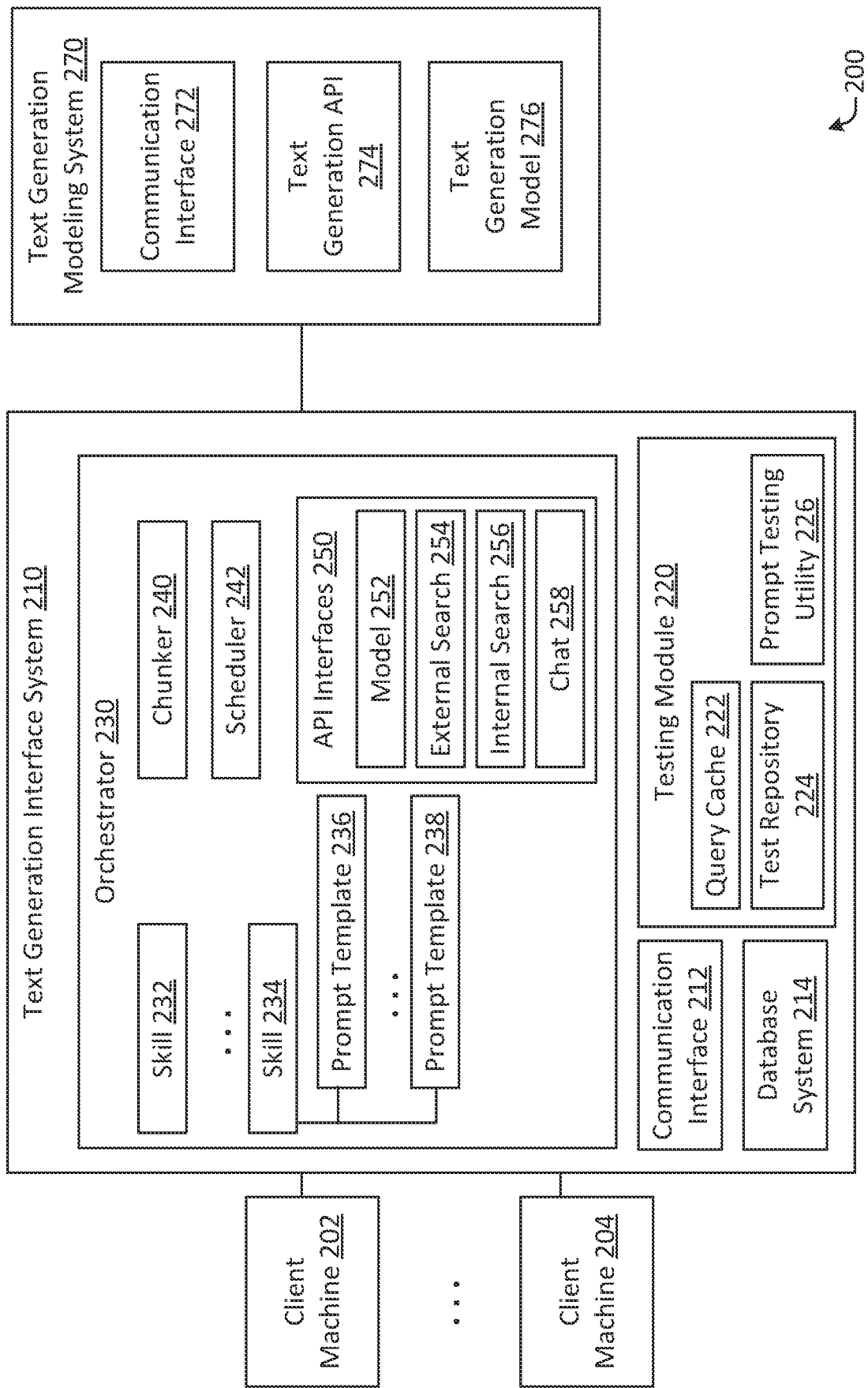
FIG. 2 illustrates a text generation system, configured in accordance with one or more embodiments.

FIG. 2 illustrates a text generation system 200, configured in accordance with one or more embodiments. The text generation system 200 includes client machines 202 through 204 in communication with a text generation interface system 210, which in turn is in communication with a text generation modeling system 270. The text generation modeling system 270 includes a communication interface 272, a text generation API 274, and a text generation model 276. The text generation interface system 210 includes a communication interface 212, a database system 214, a testing module 220, and an orchestrator 230. The testing module 220 includes a query cache 222, a test repository 224, and a prompt testing utility 226. The orchestrator 230 includes skills 232 through 234, and prompt templates 236 through 238. The orchestrator also includes a chunker 240 and a scheduler 242. The orchestrator also includes API interfaces 250, which include a model interface 252, an external search interface 254, an internal search interface 256, and a chat interface 258.

According to various embodiments, a client machine may be any suitable computing device or system. For instance, a client machine may be a laptop computer, desktop computer, mobile computing device, or the like. Alternatively, or additionally, a client machine may be an interface through which multiple remote devices communicate with the text generation interface system 210.

According to various embodiments, a client machine may interact with the text generation interface system in any of various ways. For example, a client machine may access the text generation interface system via a text editor plugin, a dedicated application, a web browser, other types of interactions techniques, or combinations thereof.

According to various embodiments, the text generation modeling system 270 may be configured to receive, process, and respond to requests via the communication interface 272, which may be configured to facilitate communications via a network such as the internet.

In some embodiments, some or all of the communication with the text generation modeling system 270 may be conducted in accordance with the text generation API 274, which may provide remote access to the text generation model 276. The text generation API 274 may provide functionality such as defining standardized message formatting, enforcing maximum input and/or output size for the text generation model, and/or tracking usage of the text generation model.

According to various embodiments, the text generation model 276 may be a large language model. The text generation model 276 may be trained to predict successive words in a sentence. It may be capable of performing functions such as generating correspondence, summarizing text, and/or evaluating search results. The text generation model 276 may be pre-trained using many gigabytes of input text and may include billions or trillions of parameters.

In some embodiments, large language models impose a tradeoff. A large language model increases in power with the number of parameters and the amount of training data used to train the model. However, as the model parameters and input data increase in magnitude, the model's training cost, storage requirements, and required computing resources increase as well. Accordingly, the large language model may be implemented as a general-purpose model configured to generate arbitrary text. The text generation interface system 210 may serve as an interface between the client machines 210 and the text generation modeling system 270 to support the use of the text generation modeling system 270 for performing complex, domain-specific tasks in fields such as law. That is, the text generation interface system 210 may be configured to perform one or more methods described herein.

According to various embodiments, the orchestrator 230 facilitates the implementation of one or more skills, such as the skills 232 through 234. A skill may act as a collection of interfaces, prompts, actions, data, and/or metadata that collectively provide a type of functionality to the client machine. For instance, a skill may involve receiving information from a client machine, transmitting one or more requests to the text generation modeling system 270, processing one or more response received form the text generation modeling system 270, performing one or more searches, and the like. Skills are also referred to herein as text generation flows.

In some embodiments, a skill may be associated with one or more prompts. For instance, the skill 234 is associated with the prompt templates 236 and 238. A prompt template may include information such as instructions that may be provided to the text generation modeling system 270. A prompt template may also include one or more fillable portions that may be filled based on information determined by the orchestrator 230. For instance, a prompt template may be filled based on information received from a client machine, information returned by a search query, or another information source.

In some implementations, the chunker 240 is configured to divide text into smaller portions. Dividing text into smaller portions may be needed at least in part to comply with one or more size limitations associated with the text. For instance, the text generation API 274 may impose a maximum size limit on prompts provided to the text generation model 276. The chunker may be used to subdivide text included in a request from a client, retrieved from a document, returned in a search result, or received from any other source.

According to various embodiments, the API interfaces 250 include one or more APIs for interacting with internal and/or external services. The model interface 252 may expose one or more functions for communicating with the text generation modeling system 270. For example, the model interface 252 may provide access to functions such as transmitting requests to the text generation modeling system 270, receiving responses from the text generation modeling system 270, and the like.

In some embodiments, the external search interface 254 may be used to search one or more external data sources such as information repositories that are generalizable to multiple parties. For instance, the external search interface 254 may expose an interface for searching legal case law and secondary sources.

In some implementations, the internal search interface 256 may facilitate the searching of private documents. For instance, a client may upload or provide access to a set of private documents, which may then be indexed by the text generation interface system 210.

According to various embodiments, the chat interface 258 may facilitate text-based communication with the client machines. For instance, the chat interface 258 may support operations such as parsing chat messages, formulating responses to chat messages, identifying skills based on chat messages, and the like. In some configurations, the chat interface 258 may orchestrate text-based chat communication between a user at a client machine and the text generation model 276, for instance via web sockets.

In some embodiments, the query cache 222 may store queries such as testing queries sent to the text generation modeling system 270. Then, the query cache 222 may be instructed to return a predetermined result to a query that has already been sent to the text generation modeling system 270 rather than sending the same query again.

In some embodiments, the prompt testing utility 226 is configured to perform operations such as testing prompts created based on prompt templates against tests stored in the test repository 224.

In some embodiments, the communication interface 212 is configured to facilitate communications with the client machines and/or the text generation modeling system 270 via a network such as the internet. The scheduler 242 may be responsible for scheduling one or more tasks performed by the text generation interface system 210. For instance, the scheduler may schedule requests for transmission to the text generation modeling system 270.

In some embodiments, the database system 214 is configured to store information determined based on natural language. For example, the database system 214 may be configured to store one or more database tables that include fields corresponding with information extracted from natural language documents. As another example, the database system 214 may be configured to store metadata information about documents based on information extracted from those documents. As yet another example, the database system 214 may be configured to store linkages between documents and document portions.

According to various embodiments, the database system 214 may be configured using any of a variety of suitable database technologies. For instance, the database system 214 may be configured as a relational database system, a non-relational database system, or any other type of database system capable of supporting the storage and querying of information described herein.

Figure 3:
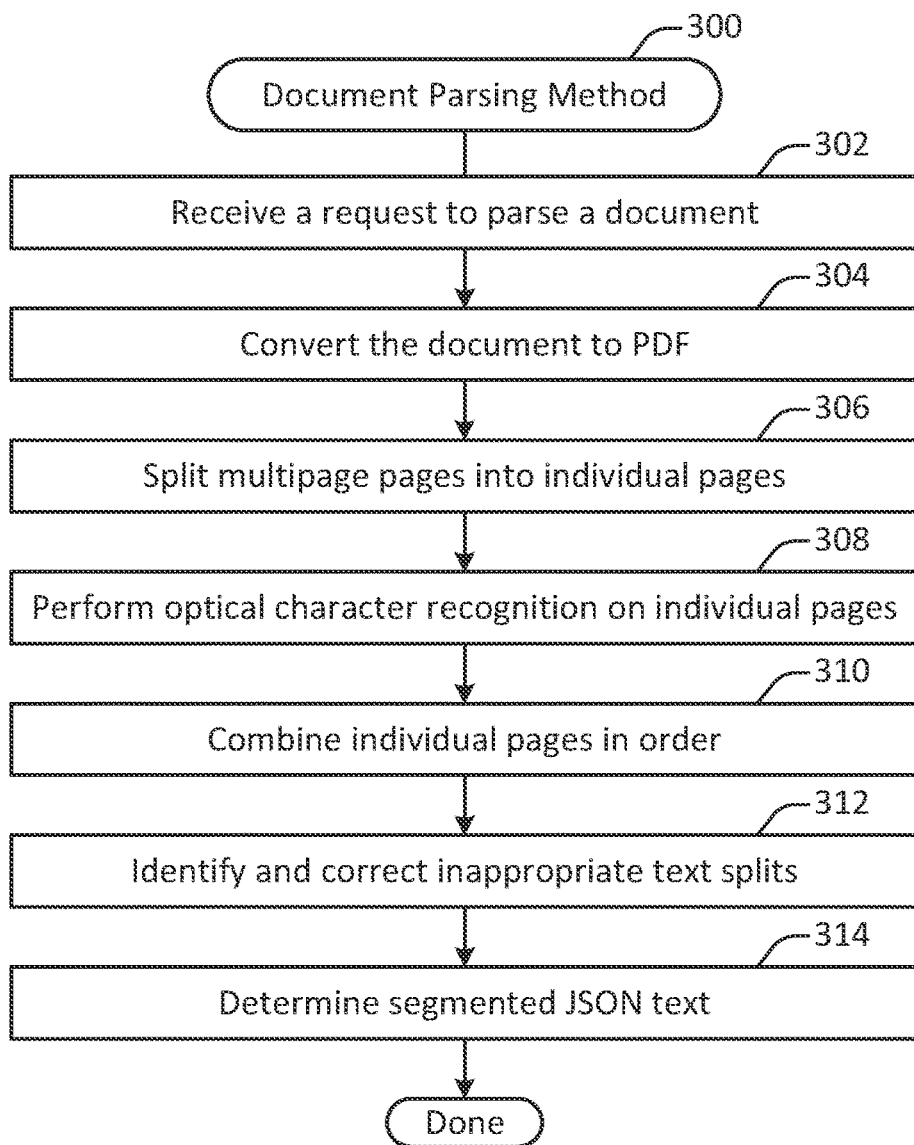
FIG. 3 illustrates a document parsing method, performed in accordance with one or more embodiments.

FIG. 3 illustrates a document parsing method 300, performed in accordance with one or more embodiments. According to various embodiments, the method 300 may be performed on any suitable computing system. For instance, the method 300 may be performed on the text generation interface system 230 shown in FIG. 2. The method 300 may be performed in order to convert a document into usable text while at the same time retaining metadata information about the text, such as the page, section, and/or document at which the text was located.

A request to parse a document is received at 302. In some embodiments, the request to parse a document may be generated when a document is identified for analysis. For example, as discussed herein, a document may be uploaded or identified by a client machine as part of communication with the text generation interface system 230. As another example, a document may be returned as part of a search result.

The document is converted to portable document format (PDF) or another suitable document format at 304. In some embodiments, the document need only be converted to PDF if the document is not already in the PDF format. Alternatively, PDF conversion may be performed even on PDFs to ensure that PDFs are properly formatted. PDF conversion may be performed, for instance, by a suitable Python library or the like. For instance, PDF conversion may be performed with the Hyland library.

Multipage pages are split into individual pages at 306. In some implementations, multipage pages may be split into individual pages via a machine learning model. The machine learning model may be trained to group together portions of text on a multipage page. For instance, a caption page in a legal decision may include text in a column on the left that encompasses the parties, text in a column on the right that includes the case number, a title that follows lower on the page, and line numbering on the left. In such a configuration, the machine learning model may be trained to treat separately the text in the different columns, and to separate the text from the line numbers. The document title may be identified as a first page, with the left column identified as the second page and the right column identified as the third page.

Optical character recognition is performed on individual pages or on the document as a whole at 308. In some implementations, optical character recognition may be performed locally via a library. Alternatively, optical character recognition may be performed by an external service. For instance, documents or pages may be sent to a service such as Google Vision. Performing optical character recognition on individual pages may provide for increased throughout via parallelization.

Individual pages are combined in order at 310. In some implementations, combining pages in order may be needed if optical character recognition were applied to individual pages rather than to the document as a whole.

Inappropriate text splits are identified and corrected at 312. In some embodiments, inappropriate text splits include instances where a paragraph, sentence, word, or other textual unit was split across different pages. Such instances may be identified by, for example, determining whether the first textual unit in a page represents a new paragraph, sentence, word, or other unit, or if instead it represents the continuation of a textual unit from the previous page. When such a split is identified, the continuation of the textual unit may be excised from the page on which it is located and moved to the end of the previous page. Such an operation may be performed by, for instance, the Poppler library available in Python.

Segmented JSON text is determined at 314. In some embodiments, the segmented JSON text may include the text returned by the optical character recognition performed at operation 308. In addition, the segmented JSON text may include additional information, such as one or more identifiers for the page, section, and/or document on which the text resides. The output of the segmented JSON may be further processed, for instance via the text sharding method 500 shown in FIG. 5 and/or the text chunking method 600 shown in FIG. 6.

Figure 4:
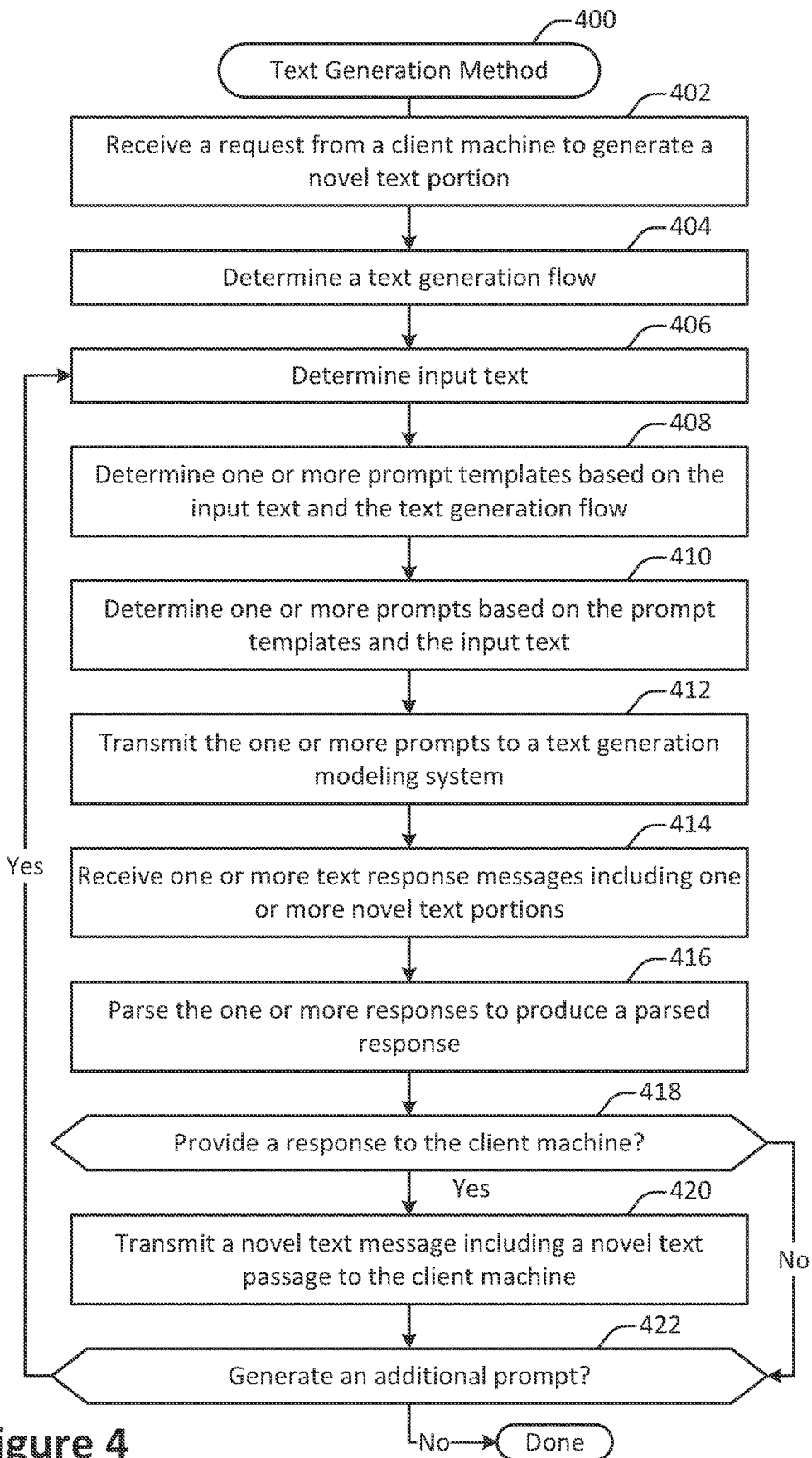
FIG. 4 illustrates a text generation method, performed in accordance with one or more embodiments.

FIG. 4 illustrates a text generation method 400, performed in accordance with one or more embodiments. According to various embodiments, the method 400 may be performed on any suitable computing system. For instance, the method 400 may be performed on the text generation interface system 230 shown in FIG. 2. The method 400 may be performed in order to identify and implement a text generation flow based on input text.

A request from a client machine to generate a novel text portion is received at 402. In some embodiments, the request may include a query portion. The query portion may include natural language text, one or more instructions in a query language, user input in some other format, or some combination thereof. For instance, the query portion may include an instruction to "write an email", "summarize documents", or "research case law".

In some embodiments, the request may include an input text portion. For example, the request may link to, upload, or otherwise identify documents. As another example, the request may characterize the task to be completed. For instance, the request may discuss the content of the desired email or other correspondence. The particular types of input text included in the request may depend in significant part on the type of request. Accordingly, many variations are possible.

A text generation flow is determined at 404. In some embodiments, the text generation flow may be explicitly indicated as part of the request received from the client machine. For instance, the client machine may select a particular text generation flow from a list. Alternatively, the text generation flow may be determined at least in part by analyzing the request received from the client machine. For example, the request may be analyzed to search for keywords or other indications that a particular text generation flow is desired. As another example, all or a portion of the request may be provided to a machine learning model to predict the requested text generation flow. In some configurations, a predicted text generation flow may be provided to the client machine for confirmation before proceeding.

Input text is determined at 406. In some embodiments, the input text may be determined by applying one or more text processing, search, or other operations based on the request received from the client machine. For example, the input text may be determined at least in part by retrieving one or more documents identified in or included with the request received from the client machine. As another example, the input text may be determined at least in part by applying one or more natural language processing techniques such as cleaning or tokenizing raw text.

In some embodiments, determining input text may involve executing a search query. For example, a search of a database, set of documents, or other data source may be executed base at least in part on one or more search parameters determined based on a request received from a client machine. For instance, the request may identify one or more search terms and a set of documents to be searched using the one or more search terms.

In some embodiments, determining input text may involve processing responses received from a text generation modeling system. For instance, all or a portion of the results from an initial request to summarizing a set of text portions may then be used to create a new set of more compressed input text, which may then be provided to the text generation modeling system for further summarization or other processing.

One or more prompt templates are determined at 408 based on the input text and the text generation flow. As discussed with respect to FIG. 2, different text generation flows may be associated with different prompt templates. Prompt templates may be selected from the prompt library based on the particular text generation flow.

At 410, one or more prompts based on the prompt templates are determined. In some embodiments, a prompt may be determined by supplementing and/or modifying a prompt template based on the input text. For instance, a portion of input text may be added to a prompt template at an appropriate location. As one example, a prompt template may include a set of instructions for causing a large language model to generate a correspondence document. The prompt template may be modified to determine a prompt by adding a portion of input text that characterizes the nature of the correspondence document to be generated. The added input text may identify information such as the correspondence recipient, source, topic, and discussion points.

The one or more prompts are transmitted to a text generation modeling system at 412. In some embodiments, the text generation modeling system may be implemented at a remote computing system. The text generation modeling system may be configured to implement a text generation model. The text generation modeling system may expose an application procedure interface via a communication interface accessible via a network such as the internet.

One or more text response messages are received from the remote computing system at 414. According to various embodiments, the one or more text response messages include one or more novel text portions generated by a text generation model implemented at the remote computing system. The novel text portions may be generated based at least in part on the prompt received at the text generation modeling system, including the instructions and the input text.

The one or more responses are parsed at 416 to produce a parsed response. In some embodiments, parsing the one or more responses may involve performing various types of processing operations. For example, in some systems a large language model may be configured to complete a prompt. Hence, a response message received from the large language model may include the instructions and/or the input text. Accordingly, the response message may be parsed to remove the instructions and/or the input text.

In some implementations, parsing the one or more responses may involve combining text from different responses. For instance, a document may be divided into a number of portions, each of which is summarized by the large language model. The resulting summaries may then be combined to produce an overall summary of the document.

A determination is made at 418 as to whether to provide a response to the client machine. In some embodiments, the determination made at 418 may depend on the process flow. For example, in some process flows, additional user input may be solicited by providing a response message determined based at least in part on one or more responses received from the text generation modeling system. As another example, in some process flows, a parsed response message may be used to produce an output message provided to the client machine.

If a response is to be provided to the client machine, then a client response message including a novel text passage is transmitted to the client machine at 420. In some embodiments, the client response message may be determined based in part on the text generation flow determined at 404 and in part based on the one or more text response messages received at 414 and parsed at 416.

A determination is made at 422 as to whether to generate an additional prompt. According to various embodiments, the determination as to whether to generate an additional prompt may be made based in part on the text generation flow determined at 404 and in part based on the one or more text response messages received at 414 and parsed at 416. As a simple example, a text generation flow may involve an initial set of prompts to summarize a set of portions, and then another round of interaction with the text generation modeling system to produce a more compressed summary.

According to various embodiments, the operations shown in FIG. 4 may be performed in an order different from that shown. Alternatively, or additionally, one or more operations may be omitted, and/or other operations may be performed.

For example, a text generation flow may involve one or more search queries executed outside the context of the text generation modeling system. As another example, a text generation flow may involve one or more processes for editing, cleaning, or otherwise altering text in a manner not discussed with respect to FIG. 4. Various operations are possible.

Figure 5:
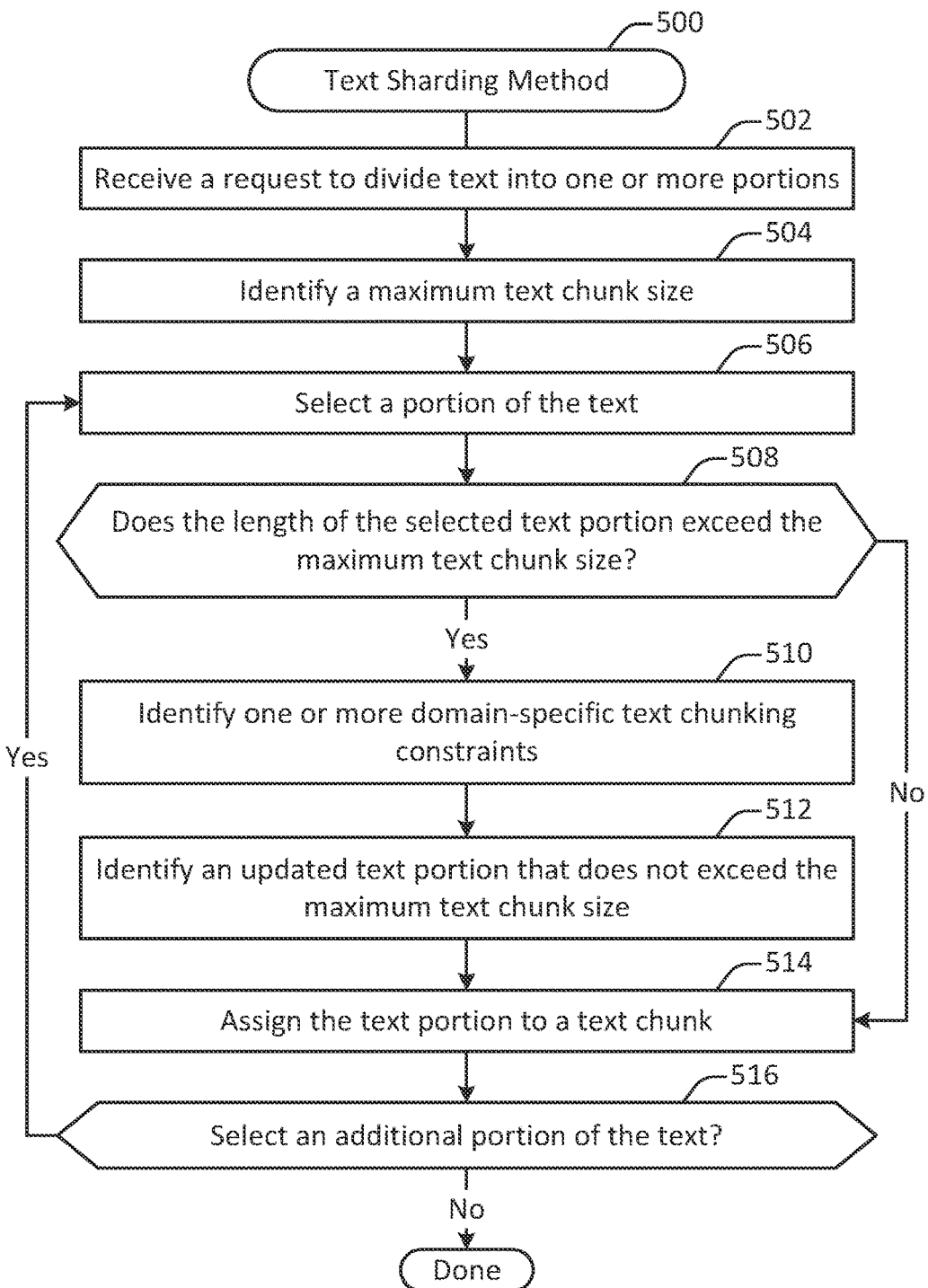
FIG. 5 illustrates a method of sharding text, performed in accordance with one or more embodiments.

FIG. 5 illustrates a method 500 of sharding text, performed in accordance with one or more embodiments. According to various embodiments, the method 500 may be performed on any suitable computing system. For instance, the method 500 may be performed on the text generation interface system 230 shown in FIG. 2. The method 500 may be performed in order to divide a body of text into potentially smaller units that fall beneath a designated size threshold, such as a size threshold imposed by an interface providing access to a large language model. For instance, a text generation modeling system implementing a large language model may specify a size threshold in terms of a number of tokens (e.g., words). As one example of such a threshold, a text generation modeling system may impose a limit of 8,193 tokens per query.

In particular embodiments, a size threshold may be adjusted based on considerations apart from a threshold imposed by an external text generation modeling system. For instance, a text generation interface system may formulate a prompt that includes input text as well as metadata such as one or more instructions for a large language model. In addition, the output of the large language model may be included in the threshold. If the external text generation modeling system imposes a threshold (e.g., 8,193 tokens), the text generation interface system 230 may need to impose a somewhat lower threshold when dividing input text in order to account for the metadata included in the prompt and/or the response provided by the large language model.

A request to divide text into one or more portions is received at 502. According to various embodiments, the request may be received as part of the implementation of one or more of the workflows shown herein. The request may identify a body of text. The body of text may include one or more documents, search queries, instruction sets, search results, and/or any other suitable text. In some configurations, a collection of text elements may be received. For instance, a search query and a set of documents returned by the search query may be included in the text.

In some implementations, text may be pre-divided into a number of different portions. Examples of divisions of text into portions may include, but are not limited to: lists of documents, documents, document sections, document pages, document paragraphs, and document sentences. Alternatively, or additionally, text may be divided into portions upon receipt at the text generation interface system 230. For instance, text may be divided into a set of portions via a text chunker, document parser, or other natural language processing tool.

A maximum text chunk size is identified at 504. In some embodiments, the maximum text chunk size may be identified based on one or more configuration parameters. In some configurations, the maximum text size may be imposed by the text generation interface system 230. Alternatively, or additionally, a size threshold may be imposed by an interface providing access to a large language model. As one example of a maximum text chunk size may be 100 kilobytes of text, 1 megabyte of text, 10 megabytes of text, or any other suitable chunk size.

A portion of the text is selected at 506. In some embodiments, as discussed herein, text may be pre-divided into text portion. Alternatively, or additionally, text may be divided into text portions as part of, or prior to, the operation of the method 500. As still another possibility, text may not be divided into portions. In such a configuration, the initial portion of text that is selected may be the entirety of the text. Then, the identification of one or more updated text portions at 512 may result in the division of the text into one or more portions as part of the operation of the method 500.

A determination is made at 508 as to whether the length of the selected text portion exceeds the maximum text chunk size. In some embodiments, the determination may be made by computing a length associated with the selected text portion and then comparing it with the maximum text chunk size. The calculation of the length associated with the selected text portion may be performed in different ways, depending on how the maximum text chunk size is specified. For instance, the maximum text chunk size may be specified as a memory size (e.g., in kilobytes or megabytes), as a number of words, or in some other fashion.

If it is determined that the length of the selected text portion exceeds the maximum text chunk size, then at 510 one or more domain-specific text chunking constraints are identified. In some embodiments, domain-specific text chunking constraints may be identified based on one or more pre-determined configuration parameters. For example, one domain-specific text chunking constraint may discourage division of a question and answer in a deposition transcript or other question/answer context. As another example, a domain-specific text chunking constraint may discourage splitting of a contract clause. As yet another example, a domain-specific text chunking constraint may discourage splitting of a minority and majority opinion in a legal opinion.

An updated text portion that does not exceed the maximum text chunk size is identified at 512. In some embodiments, the updated text portion may be determined by applying a more granular division of the text portion into small portions. For example, a document may be divided into sections, pages, or paragraphs. As another example, a document page or section may be divided into paragraphs. As another example, a paragraph may be divided into sentences. As still another example, a sentence may be divided into words. In particular embodiments, the updated text portion may be the sequentially first portion of the selected text portion that falls below the maximum text chunk size threshold identified at operation 504.

The text portion is assigned to a text chunk at 514. In some embodiments, the text may be associated with a sequence of text chunks. The text portions selected at 506 and identified at 512 may be assigned to these text chunks, for instance in a sequential order. That is, text portions near to one another in the text itself may be assigned to the same text chunk where possible to reduce the number of divisions between semantically similar elements of the text.

In particular embodiments, some attention may be paid to text divisions such as document, document section, paragraph, and/or sentence borders when assigning text portions to chunks. For instance, text portions belonging to the same document, document section, paragraph, and/or sentence may be grouped together when possible to ensure semantic continuity.

Figure 6:
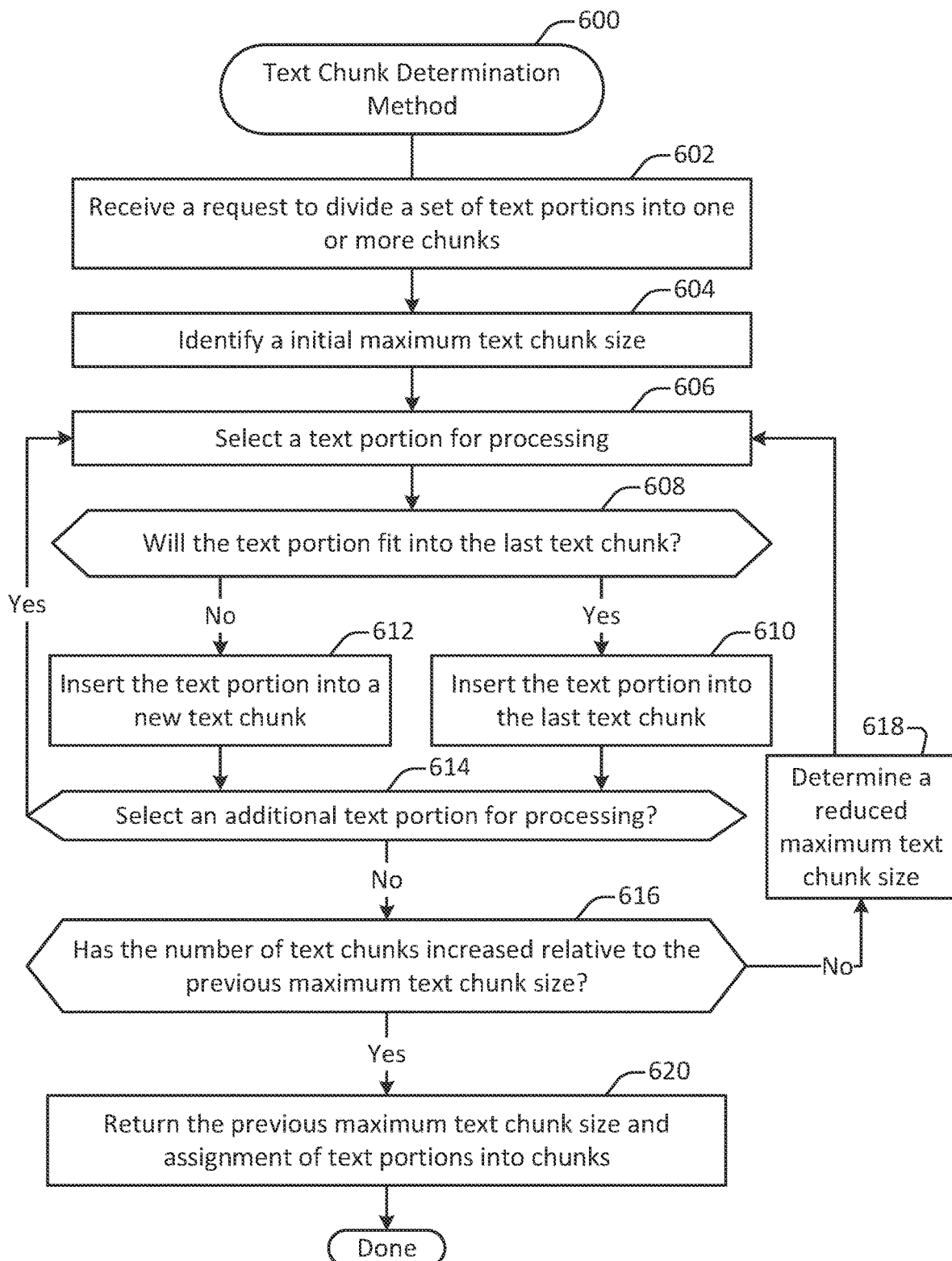
FIG. 6 illustrates a text chunk determination method, performed in accordance with one or more embodiments.

In particular embodiments, the method 500 may be performed in conjunction with the method 600 shown in FIG. 6. In such a configuration, operation 514 may be omitted. Alternatively, the assignment of text portions into text chunks in operation 514 may be treated as provisional, subject to subsequent adjustment via the method 600 shown in FIG. 6.

In some implementations, the identification of an updated text portion may result in the creation of two or more new text portions as a consequence of the division. In this case, the updated text portion may be assigned to a text chunk at 514, while the remainder portion or portions may be reserved for later selection at 506. Alternatively, or additionally, if two or more of the text portions resulting from the division at 512 each fall below the maximum text chunk size, then each of these may be assigned to a text chunk or chunks at operation 514.

A determination is made at 516 as to whether to select an additional portion of the text. According to various embodiments, additional portions of the text may continue to be selected as long as additional portions are available, or until some other triggering condition is met. For example, the system may impose a maximum amount of text for a particular interaction. As another example, the amount of text may exceed a designated threshold, such as a cost threshold.

FIG. 6 illustrates a text chunk determination method 600, performed in accordance with one or more embodiments. According to various embodiments, the method 600 may be performed on any suitable computing system. For instance, the method 600 may be performed on the text generation interface system 230 shown in FIG. 2. The method 600 may be performed in order to assign a set of text portions into text chunks.

In some embodiments, the method 600 may be used to compress text portions into text chunks of smaller size. For instance, the method 600 may receive as an input a set of text portions divided into text chunks of highly variable sizes, and then produce as an output a division of the same text portions into the same number of text chunks, but with the maximum text chunk size being lower due to more even distribution of text portions across text chunks.

A request is received at 602 to divide a set of text portions into one or more chunks. In some embodiments, the request may be automatically generated, for instance upon completion of the method 500 shown in FIG. 5. The request may identify, for instance, a set of text portions to divide into text chunks.

An initial maximum text chunk size is identified at 604. In some embodiments, the initial maximum text chunk size may be identified in a manner similar to that for operation 504 shown in FIG. 5.

A text portion is selected for processing at 606. In some embodiments, text portions may be selected sequentially. Sequential or nearly sequential ordering may ensure that semantically contiguous or similar text portions are often included within the same text chunk.

A determination is made at 608 as to whether the text portion fits into the latest text chunk. In some embodiments, text portions may be processed via the method 500 shown in FIG. 5 to ensure that each text portion is smaller than the maximum chunk size. However, a text chunk may already include one or more text portions added to the text chunk in a previous iteration.

In the event that the text portion fits into the last text chunk size, the text portion is inserted into the last text chunk at 610. If instead the text portion is the first to be processed, or the text portion does not fit into the last text chunk size, then the text portion is inserted into a new text chunk at 612. The new chunk may be created with a maximum size in accordance with the maximum text chunk size, which may be the initial maximum text chunk upon the first iteration or the reduced maximum text chunk size upon subsequent iterations.

A determination is made at 614 as to whether to select an additional text portion for processing. In some embodiments, additional text portions may be selected until all text portions have been added to a respective text chunk.

A determination is made at 616 as to whether the number of text chunks has increased relative to the previous maximum text chunk size. If the number of text chunks increases, then a reduced maximum text chunk size is determined at 618, and the text portions are again assigned into chunks in operations 606 through 614.

According to various embodiments, for the first iteration, the number of chunks will not have increased because there was no previous assignment of text portions into text chunks. However, for the second and subsequent iterations, reducing the maximum text chunk size at 618 may cause the number of text chunks needed to hold the text portions to crease because the reduced maximum text chunk size may cause a text portion to no longer fit in a chunk and instead to spill over to the next chunk.

In some embodiments, the first increase of the number of text chunks may cause the termination of the method at operation 620. Alternatively, a different terminating criteria may be met. For instance, an increase in the number of text chunks may be compared with the reduction in text chunk size to produce a ratio, and additional reductions in text chunk size may continue to be imposed so long as the ratio falls below a designated threshold.

In some embodiments, the reduced text chunk size may be determined at 618 in any of various ways. For example, the text chunk size may be reduced by a designated amount (e.g., 10 words, 5 kilobytes, etc.) As another example, the text chunk size may be reduced by a designated percentage (e.g., 1%, 5%, etc.).

When it is determined that the number of text chunks has unacceptably increased, then at 620 the previous maximum text chunk size and assignment of text portions into chunks is returned. In this way, the number of text chunks may be limited while at the same time dividing text portions more equally into text chunks. The number of text chunks may be strictly capped at the input value, or may be allowed to increase to some degree if a sufficiently improved division of text portions into text chunks is achieved.

Figure 7:
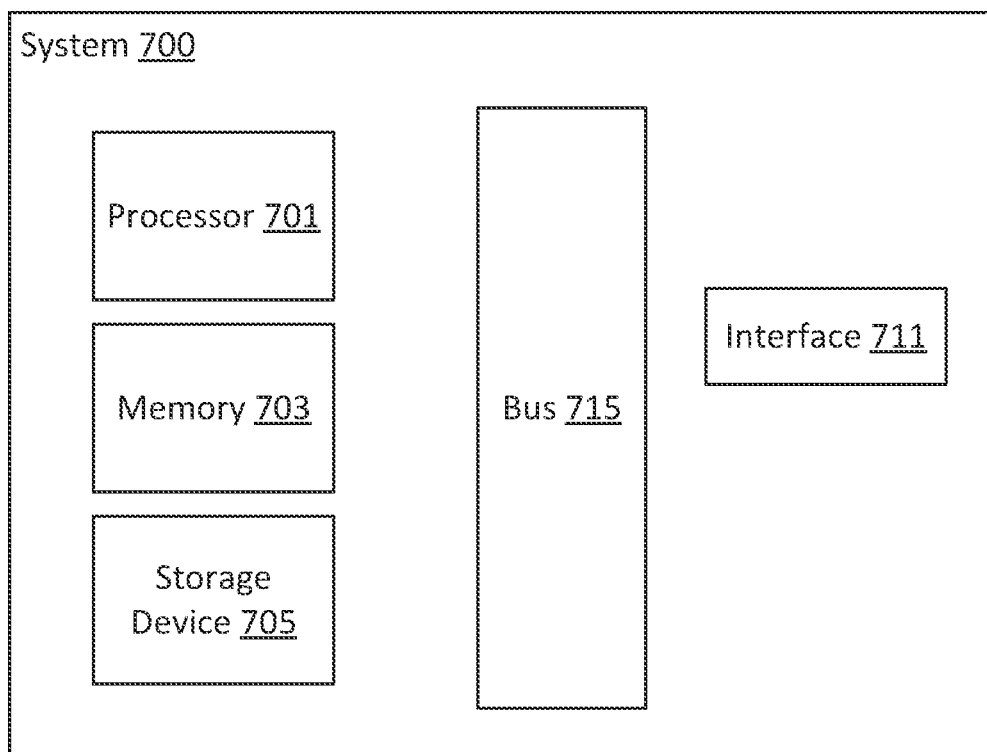
FIG. 7 illustrates one example of a computing device, configured in accordance with one or more embodiments.

FIG. 7 illustrates one example of a computing device 700, configured in accordance with one or more embodiments. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 8:
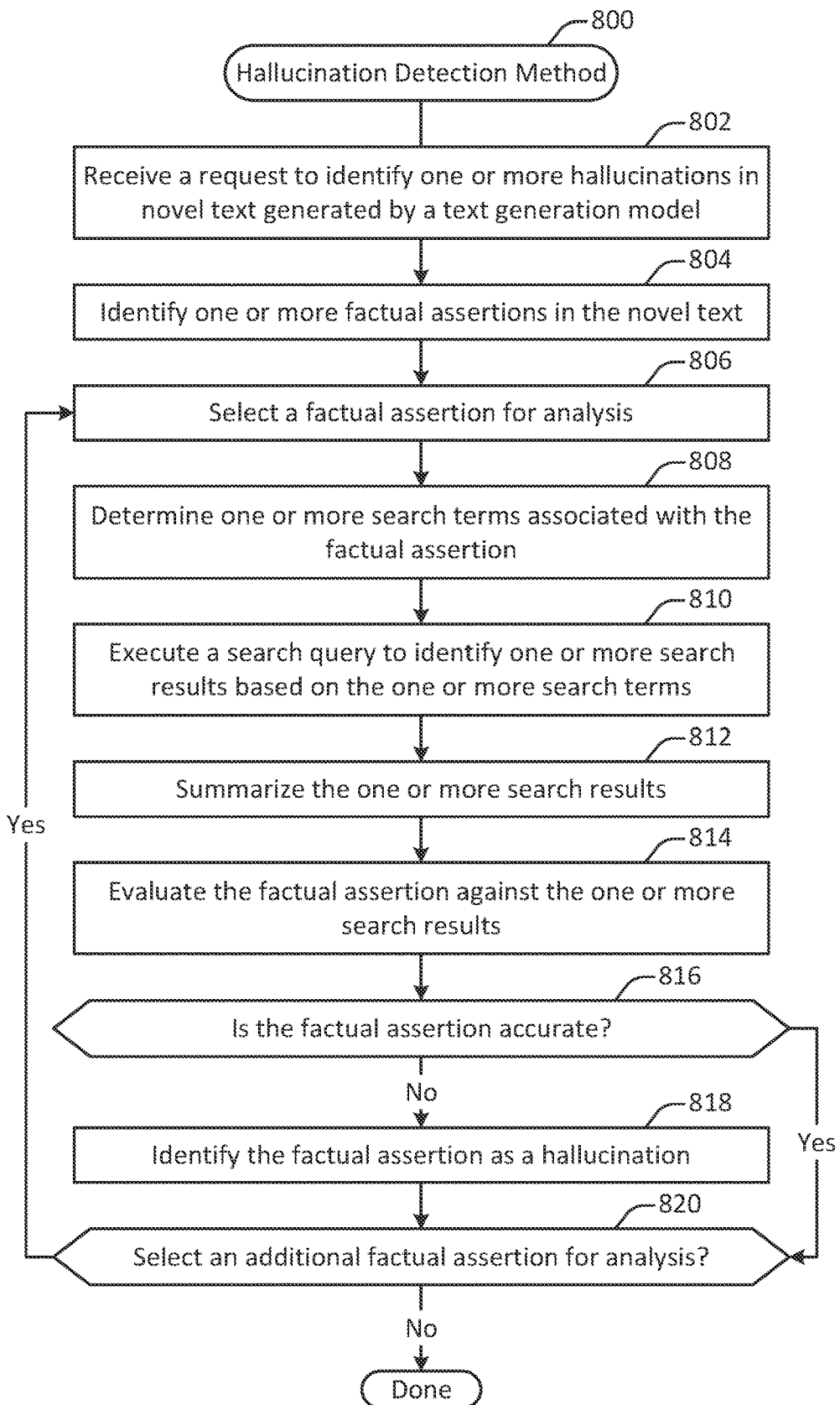
FIG. 8 illustrates a hallucination detection method, performed in accordance with one or more embodiments.

FIG. 8 illustrates a hallucination detection method 800, performed in accordance with one or more embodiments. The method 800 may be performed by the text generation interface system 210 shown in FIG. 2.

In some embodiments, the method 800 may be performed in order to determine whether novel text generated by a text generation modeling system includes one or more hallucinations. Generative text systems sometimes generate text that includes inaccurate claims. For example, in the legal sphere, a request to summarize a set of judicial opinions about a point of law may result in a summary text that includes a citation to a non-existent opinion.

A request is received at 802 to identify one or more hallucinations in novel text generated by a text generation model. In some embodiments, the request may be received as part of one or more methods shown herein. For example, the method 800 may be performed to evaluate a response returned by the text generation modeling system. When employed in this way, the method 800 may be used to prompt the system to revise the response. Alternatively, or additionally, the method 800 may be used to prompt the system to generate a new response, to flag the error to a systems administrator, and/or to inform a response recipient of a potentially inaccurate response.

In some implementations, the request may be received as part of a training and/or testing procedure. For instance, one or more prompts may be tested by the prompt testing utility 226 against one or more tests stored in the test repository 224. A test result may be evaluated using the method 800 to determine whether a prompt constructed from a prompt template being tested resulted in the generation of a hallucination, which may be treated as a test failure.

One or more factual assertions in the novel text are identified at 804. In some embodiments, the one or more factual assertions may be identified by transmitting a prompt to the text generation modeling system. For instance, the novel text may be included in a prompt requesting that the text generation modeling system identify factual claims in the novel text. The resulting completed prompt may be parsed to identify the one or more factual assertions.

A factual assertion is selected for analysis. Factual assertions identified at 804 may be analyzed in sequence, in parallel, or in any suitable order.

One or more search terms associated with the factual assertion are determined at 808. In some embodiments, one or more search terms may be returned by the text generation modeling system at 804. Alternatively, or additionally, one or more search terms may be determined based on a separate request sent to the text generation modeling system for the factual assertion being analyzed.

A search query to identify one or more search results based on the one or more search terms is executed at 810. According to various embodiments, one or more searches may be executed against any suitable database. Such databases may include, but are not limited to: public sources such as the internet, internal document databases, and external document databases.

The one or more search results are summarized at 812. In some embodiments, summarizing the one or more search results may involve, for instance, dividing documents into chunks and transmitting the one or more chunks to the text generation modeling system within summarization prompts.

At 814, the factual assertion is evaluated against the one or more search results. In some embodiments, evaluating the factual assertion may involve transmitting to the text generation modeling system a prompt that includes a request to evaluate the factual assertion, information characterizing the factual assertion, and a summary of the one or more search results determined as discussed at 812.

A determination is made at 816 as to whether the factual assertion is accurate. In some embodiments, the determination may be made by parsing the response returned by the text generation modeling system at 814. For instance, the text generation modeling system may complete the prompt by indicating whether the factual assertion is true, false, or uncertain based on the provided summary of search results.

If it is determined that the factual assertion is inaccurate, then at 818 the factual assertion is identified as a hallucination. In some embodiments, identifying the factual assertion as a hallucination may cause one or more consequences in an encompassing process flow. For example, in a testing phase, the detection of a hallucination may cause the test to fail. As another example, in a production phase, the detection of a hallucination may cause the system to initiate a flow to revise the novel text to remove the hallucination.

Figure 9:
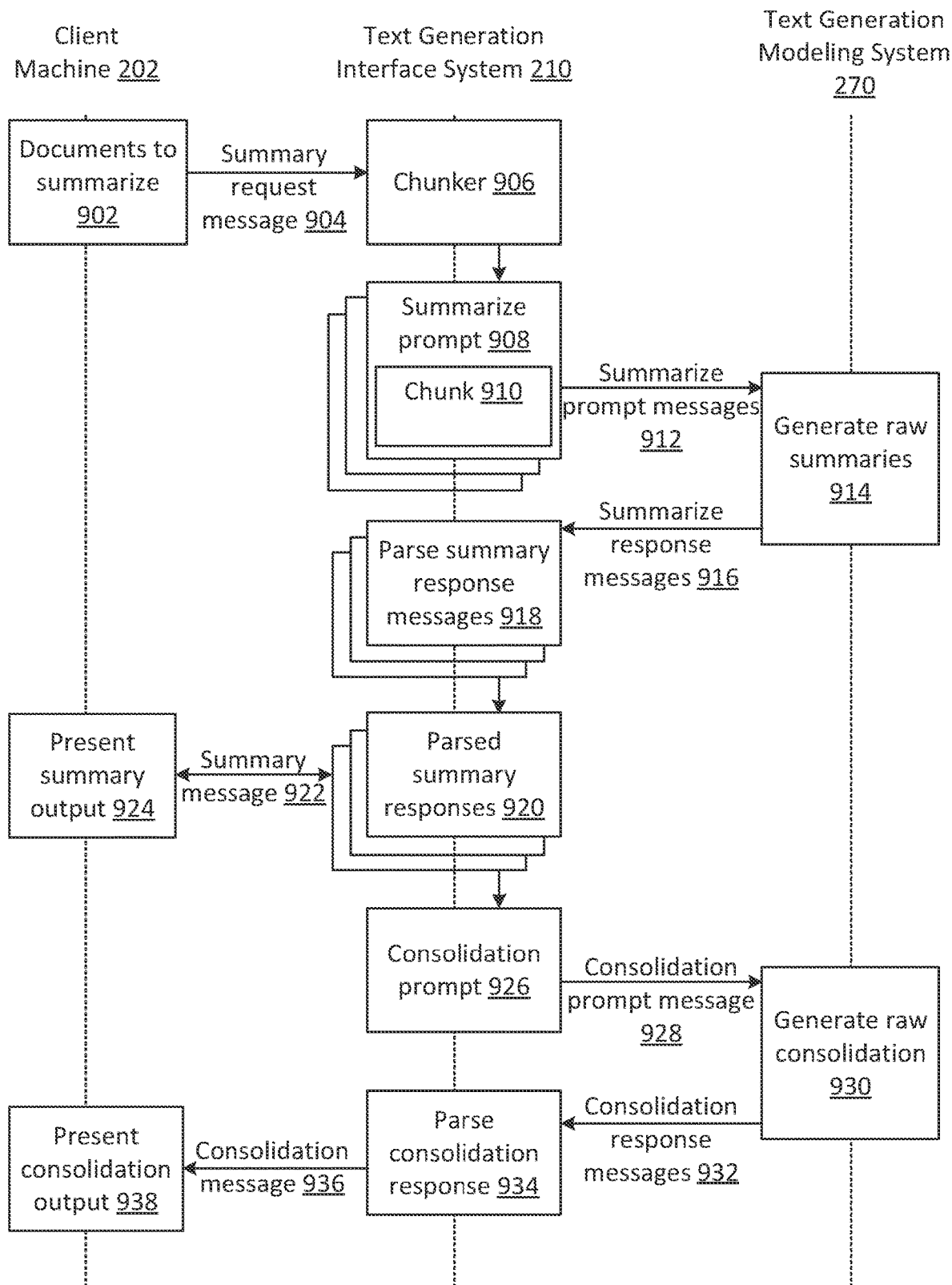
FIG. 9 illustrates an example of a method for generating a document summary, performed in accordance with one or more embodiments.

FIG. 9 illustrates an example of a method 900 for generating a document summary, performed in accordance with one or more embodiments. The method 900 may be performed at the text generation system 200 in order to summarize one or more documents provided or identified by a client machine. In some configurations, the method 900 may be performed to summarize one or more documents returned by a search query.

One or more documents are received at 902. In some embodiments, a document may be uploaded by the client machine. Alternatively, a document may be identified by the client machine, for instance via a link. As still another possibility, a document may be returned in a search result responsive to a query provided by a client machine. A single summary request may include documents identified and provided in various ways.

In some embodiments, the one or more documents may be received along with user input. The user input may be received via a chat interface such as iMessage, Google Chat, or SMS. Alternatively, or additionally, user input may be provided via a different mechanism, such as an uploaded file. The user input may be used to generate a summary input message 904, which is sent to the text generation interface system 210. In some implementations, the summary input message 904 may be received by the text generation interface system 210 via a web socket. Alternatively, a different form of communication may be used, for instance an asynchronous mode of communication.

At 906, the text generation interface system 210 determines one or more summarize prompt 908 based on the summary request message 904. In some embodiments, the determination of the summarize prompt may involve processing one or more input documents via the chunker. As discussed herein, for instance with respect to the methods 500 and 600 shown in FIG. 5 and FIG. 6, the chunker may perform one or more operations such as pre-processing, sharding, and/or chunking the documents into manageable text. Then, each chunk may be used to create a respective summarize prompt for summarizing the text in the chunk. For instance, text may be inserted into a template via a tool such as Jinja2.

The one or more summarize prompts 908 may include one or more instructions for implementation by the text generation modeling system 270. Additionally, the one or more summarize prompts each includes a respective text chunk 910 determined based on the summary request message 904.

The one or more summarize prompts 908 are then sent to the text generation modeling system 270 via one or more summarize prompt messages 912. The text generation modeling system 270 generates one or more raw summaries at 914, which are then sent back to the text generation interface system 210 via one or more summarize response messages at 916.

The one or more summarize response messages are parsed at 918 to produce one or more parsed summary responses at 920. In some embodiments, the one or more summary response messages received at 916 may include ancillary information such as all or a portion of the summarize prompt messages sent at 912. Accordingly, parsing the summarize response messages may involve performing operations such as separating the newly generated summaries from the ancillary information included in the one or more summarize response messages.

An example of a prompt template used to instruct a text generation system to summarize a text is shown below:

You are a highly sophisticated legal AI. A lawyer has submitted questions that need answers.

Below is a portion of a longer document that may be responsive to the questions:

$$DOCUMENT$$
  {%—for page in page_list—%}
    $$PAGE {{page["page"]}}$$
    {{page["text"]}}
    $$/PAGE$$
  {%—endfor—%}
$$/DOCUMENT$$

We would like you to perform two tasks that will help the lawyer answer the questions. Each task should be performed completely independently, so that the lawyer can compare the results.

Extractive Task

The purpose of this task is not to answer the questions, but to find any passages in the document that will help the lawyer answer them. For each question, perform the following steps:

1. Extract verbatim as many passages from the document (sentences, sentence fragments, or phrases) as possible that could be useful in answering the question. There is no limit on the number of passages you can extract, so more is better. Don't worry if the passages are repetitive; we need every single one you can find.

If the question asks for a list of things or the number of times something occurred, include a passage for every instance that appears in the document 2. If you extracted any passages, assign each one a score from 1 to 5, representing how the passage relates to the question:

5 (complete answer)

4 (one piece of a multipart answer)

3 (relevant definition or fact)

2 (useful context)

1 (marginally related)

Abstractive Task

The purpose of this task is to compose an answer to each question. Follow these instructions:

Base the answer only on the information contained in the document, and no extraneous information. If a direct answer cannot be derived explicitly from the document, do not answer.

Answer completely, fully, and precisely.

Interpret each question as asking to provide a comprehensive list of every item instead of only a few examples or notable instances. Never summarize or omit information from the document unless the question explicitly asks for that.

Answer based on the full text, not just a portion of it.

For each and every question, include verbatim quotes from the text (in quotation marks) in the answer. If the quote is altered in any way from the original text, use ellipsis, brackets, or [sic] for minor typos.

Be exact in your answer. Check every letter.

There is no limit on the length of your answer, and more is better

Compose a full answer to each question; even if the answer is also contained in a response to another question, still include it in each answer Here are the questions:

$$QUESTIONS$$
{{question_str}}
$$/QUESTIONS$$

Return your responses as a well-formed JSON array of objects, with each object having keys of:

'id' (string) The three-digit ID associated with the Question

'passages' (array) a JSON array of the verbatim passages you extracted, or else an empty array. Format each item as a JSON object with keys of:

'passage' (string)

'score' (int) the relevancy score you assigned the passage

'page' (int) the number assigned to the page in which the snippet appears

'answer' (string) the answer you drafted, or else "N/A"

Escape any internal quotation marks or newlines using \" or \n

[{"id": <id>, "passages": [{"passage": <passage>, "score": <score>, "page": }, . . . ]|[ ], "answer": <text>|"N/A"}, . . . ]

Only valid JSON; check to make sure it parses, and that quotes within quotes are escaped or turned to single quotes, and don't forget the ',' delimiters.

<|endofprompt|>

Here is the JSON array and nothing else:

According to various embodiments, the one or more parsed summary responses 920 may be processed in any of various ways. In some embodiments, the one or more parsed summary response messages 920 may be concatenated into a summary and provided to the client machine via a summary message 922. The summary may then be presented as output on the client machine at 924. Presenting the summary as output may involve, for instance, presenting the summary in a user interface, outputting the summary via a chat interface, and/or storing the summary in a file.

In some embodiments, the one or more parsed summary responses 920 may be used as input to generate a consolidated summary. For example, a consolidated summary may be generated if the aggregate size of the parsed summary responses 920 exceeds or falls below a designated threshold. As another example, a consolidated summary may be generated if the client machine provides an instruction to generate a consolidated summary, for instance after receiving the summary message at 922.

In some embodiments, generating a consolidated summary may involve determining a consolidation prompt at 926. The consolidation prompt may be determined by concatenating the parsed summary responses at 920 and including the concatenation result in a consolidation prompt template. In the event that the concatenated parsed summary responses are too long for a single chunk, then more than one consolidation prompt may be generated, for instance by dividing the parsed summary response 920 across different consolidation prompts.

In some implementations, one or more consolidation prompt messages including the one or more consolidation prompts are sent to the text generation modeling system 270 at 928. The text generation modeling system 270 then generates a raw consolidation of the parsed summary responses 920 and provides the novel text generated as a result via one or more consolidation response messages sent at 932.

According to various embodiments, the one or more consolidation response messages are parsed at 934. For instance, if the one or more consolidation response messages include two or more consolidation response messages, each of the different messages may be separately parsed, and the parsed results concatenated to produce a consolidated summary. The consolidated summary is provided to the client machine at 936 via a consolidation message. The client machine may then present the consolidated summary as consolidation output at 938. In the event that further consolidation is required, operations 920-934 may be repeated.

Figure 10:
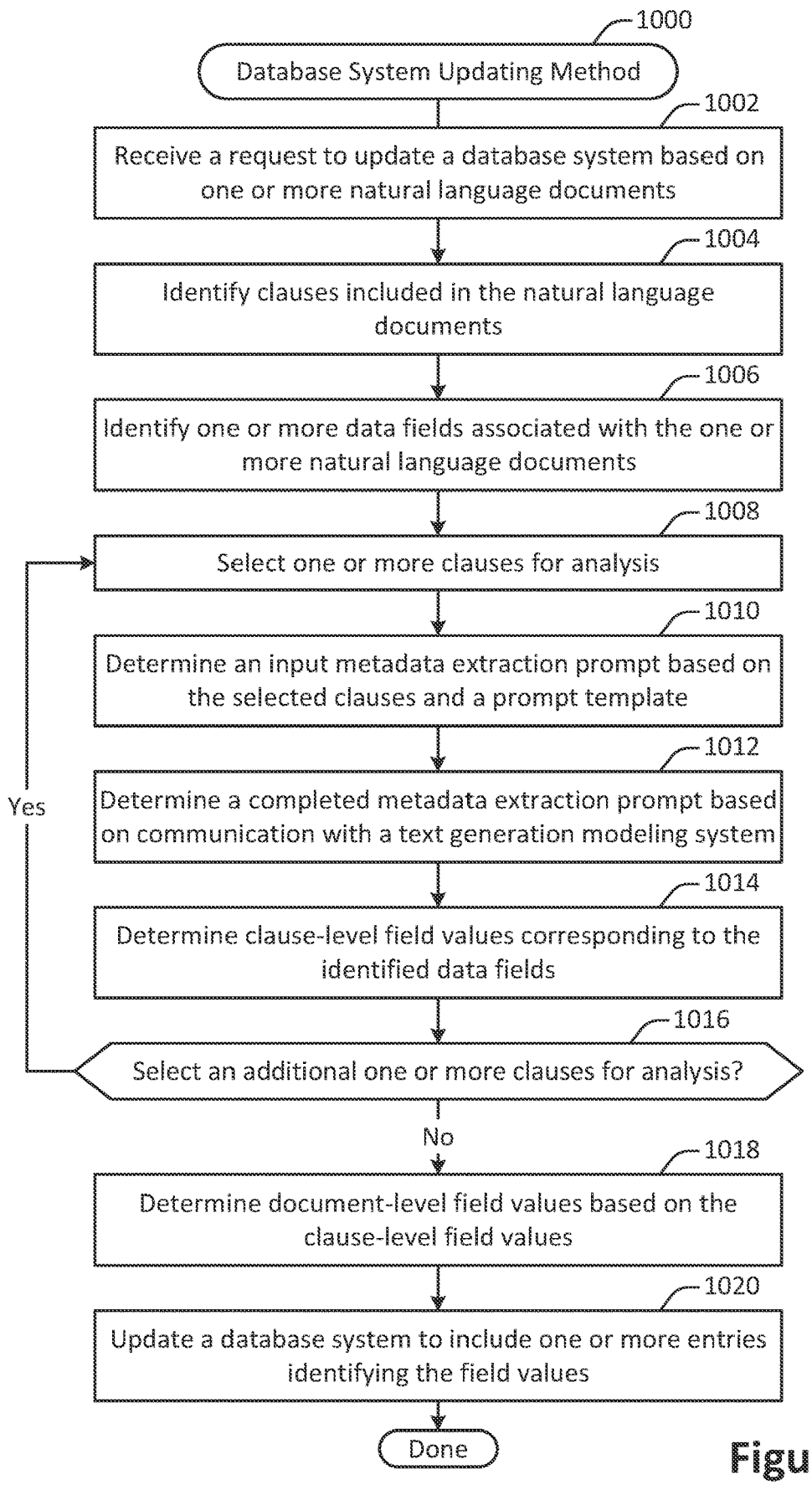
FIG. 10 illustrates a database system updating method, performed in accordance with one or more embodiments.

FIG. 10 illustrates a database system updating method 1000, performed in accordance with one or more embodiments. The method 1000 may be performed at a text generation system such as the system 200 shown in FIG. 2.

A request is received at 1002 to update a database system based on one or more natural language documents. In some embodiments, the request may be received via a chat interface. Alternatively, the request may be received in some other way, such as via an API request. The request may be generated automatically or based on user input, and may be received from a client machine.

According to various embodiments, the natural language documents may be identified in various ways. For example, documents may be uploaded from a client machine, identified based on a search query, retrieved from a repository based on one or more document identifiers, or identified in any other suitable way.

Clauses included in the natural language documents are identified at 1004. In some embodiments, each clause may include some portion of a natural language document. For instance, a clause may include a single phase, a collection of phrases, a single sentence, a collection of sentences, a section, a page, one or more page, or any other unit of analysis.

According to various embodiments, clauses may be identified based on one or more natural language processing techniques. For instance, a document may be tokenized into words. Words may then be grouped into phrases and/or sentences based on indicators such as punctuation and semantic content. Sentences may be grouped into sections such as paragraphs or other units. Clauses may then be identified based on the structure.

In particular embodiments, the identification of clauses may involve domain-specific logic. For instance, the identification of clauses in a general-purpose non-fiction text may be different from the identification of clauses in a legal contract. Accordingly, the text generation interface system may store domain-specific instructions for identifying clauses in one or more contexts.

One or more data fields associated with the one or more natural language documents are identified at 1006. In some embodiments, one or more data fields may be identified based on a query. Additional details regarding query parsing are discussed with respect to query parsing are discussed with respect to the method 1100 shown in FIG. 11.

In some implementations, one or more data fields may be identified based on the structure of a table in a database system or other such configuration parameters. For instance, if metadata for a set of documents is intended to be combined with metadata for other documents already reflected in one or more database tables, then fields associated with those database tables may be identified so as to identify values corresponding to the existing table structure.

One or more clauses are selected for analysis at 1008. A text chunk is determined at 1004 based on the natural language documents. In some embodiments, the one or more may be determined by dividing the clauses identified at 1004 into chunks based on a chunk size. Examples of techniques for determining text chunks are discussed with respect to the method 600 shown in FIG. 6. In some contexts, a text chunk may be limited to text from a single document. Alternatively, a single text chunk may include text from more than one documents.

An input metadata extraction prompt is determined at 1010 based on the text chunk and a clause splitting prompt template. In some embodiments, the input metadata extraction prompt may be determined by supplementing and/or modifying the input metadata extraction prompt based on the one or more clauses and the one or more data fields. For instance, the one or more clauses and a description of the one or more data fields may be added to a prompt template at an appropriate location. As one example, a prompt template may include a set of instructions for causing a large language model to identify values for the one or more data fields based on the one or more clauses. The prompt template may also include one or more additional instructions, such as an instruction to format the text generated by the text generation model as structured text. For instance, the structured text may be implemented as a JSON list. An example of a prompt template for identifying information and clauses relevant for answering a query is as follows:

Purpose: Find information in a contract that is highly relevant to a question.

The following Clauses are from a {{context}}

For each of the Contract Clauses below, decide whether the Contract Clause contains language that is necessary or highly relevant to answer the question. If it does, provide the IDs of the clauses that contain the information necessary or highly relevant to answer the question.

A few guidelines regarding what constitutes relevance:

It will often be the case that nothing in the Contract Clauses answers the question. This is not a problem. When this happens, simply respond by saying "none" (all lower case)

Sometimes, multiple clauses will contain information highly relevant or necessary to answer the question. If that happens, please list all such relevant clauses in your answer.

If there is/are Clause(s) that only partially answer the question, include them in your answer.

If the answer to a question can be inferred from a Clause, include that Clause in your answer list, even if the Clause does not directly answer the question.

If a Clause contains information that could potentially help answer the question if it were combined with other information not seen here, include this Clause in your answer list.

If a question is asking whether something is present or missing, a Clause closely related to the subject of the question that is missing the element is still helpful in answering the question.

If a header Clause is relevant, then list all the Clauses under that header as relevant as well.

Question: {{query.text}}
Contract Clauses XML:
<contract_clauses>
{% for contract_section in paragraphs %}
<section>
   <id>CC{{loop.index0}}</id>
   <text>{{contract_section.text}}</text>
</section>
{% endfor %}
</contract_clauses>
Give your answer in the following format:
<question_comprehension>[restate what the Question is trying to ask in clear terms to show that you understood the question]</question_comprehension>
<what_to_look_for>[briefly summarize what sorts of clauses you should be looking for to answer the question, but never refer to a specific clause ID here. It is very important that you not include the clause IDs in this section]</what_to_look_for>
<clauses>[if there are Clauses containing information highly relevant or necessary to answer the question, provide your answer as a pipe-character-separated list of the clause ID's here, for example: CC1|CC2|CC5|CC9</clauses>
Then give a very brief explanation of your answer.
<|endofprompt|>
{% if question_comprehension %}
<question_comprehension>{{question_comprehension}}</question_comprehension>
<what_to_look_for>{{what_to_look_for}}
</what_to_look_for>
<clauses>
{% else %}
<question_comprehension>
{%-endif %}

A completed metadata extraction prompt is determined at 1012 based on a request sent to a remote text generation modeling system. In some embodiments, the completed metadata extraction prompt may be determined by sending the input metadata extraction prompt to the remote text generation modeling system via an API request. A text generation model implemented at the remote text generation modeling system may then complete the prompt, after which it may be sent back to the text generation interface system.

Clause-level field values corresponding to the identified data fields are determined at 1014. In some embodiments, the clause-level field values may be determined by parsing the completed metadata extraction prompt. For instance, structured text such as JSON included in the completed metadata extraction prompt may be parsed to identify data values corresponding with data fields for clauses included in the metadata extraction prompt.

A determination is made at 1016 as to whether to determine an additional one or more clauses for analysis. In some implementations, additional clauses may continue to be selected for analysis until all of the natural language documents have been processed.

Document-level field values are determined at 1018 based on the clause-level field values. In some embodiments, the document-level field values may be determined by first identifying and then aggregating clause-level field values for a given document. For example, in the legal context, a data field may indicate whether a contract includes an indemnification clause. One or more metadata extraction prompts may be used to identify, for each clause in the document, whether that clause is an indemnification clause. Although most clauses in the document will not be an indemnification clause, the data field value for the document as a whole will be true if even one of the clauses for the document is identified as an indemnification clause.

As another example, in the legal context, a data field may indicate whether a contract involves an exchange valued at more than a threshold value. In this context, one or more metadata extraction prompts may be used to identify the exchange value, if any, associated with each clause in the document. The data field value for the document may then be determined by identifying the maximum exchange value determined for any of the clauses.

In particular embodiments, determining the document-level field values may involve domain-specific logic. This domain-specific logic may be reflected in one or more configuration parameters and/or subroutines included in the text generation system.

A database system is updated at 1020 to include one or more entries identifying the field values. In some embodiments, the database system may maintain one or more tables at the document level, as well as one or more tables at the clause level. The database system may link documents with clauses. The text of the clauses may be included within the database system itself and/or may be identified by location within the text of the associated document. The one or more tables may include the field values to facilitate searching the documents and/or clauses on the basis of the field values. Additional details regarding the searching of natural language documents based on data field values are discussed with respect to the method 1200 shown in FIG. 12.

According to various embodiments, the operations discussed in FIG. 10 may be performed in various orders, and in sequence or in parallel. For instance, a set of prompts may be created in one phase and then sent to the text generation modeling system in a subsequent phase.

Figure 11:
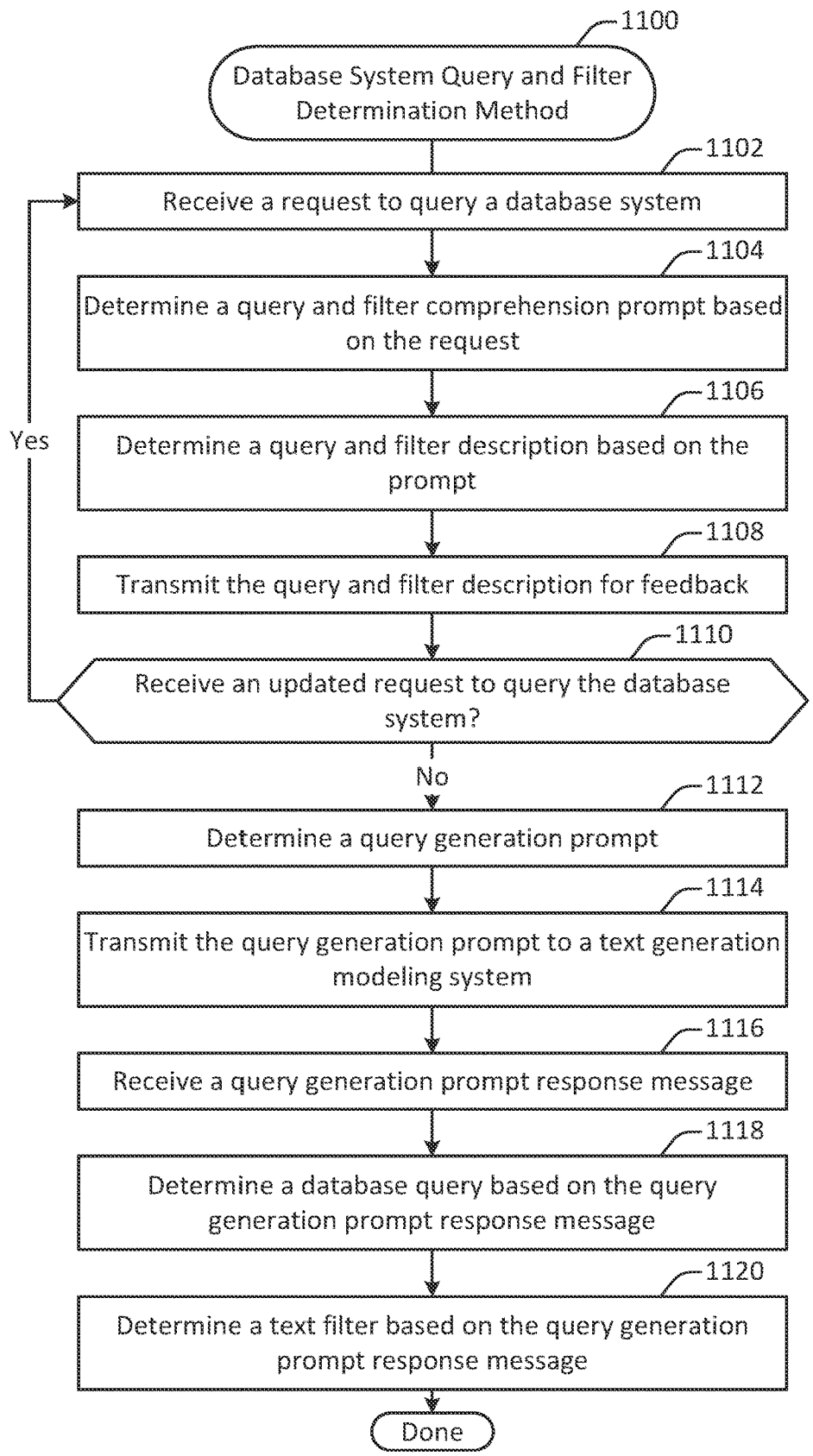
FIG. 11 illustrates a database system query and filter determination method, performed in accordance with one or more embodiments.

FIG. 11 illustrates a database system query and filter determination method 1100, performed in accordance with one or more embodiments. The method 1100 may be performed at a text generation system such as the system 200 shown in FIG. 2. For instance, the method 1100 may be performed at the text generation interface system 210.

A request to query a database system is received at 1102. In some embodiments, the request may be received as part of a chat flow. Alternatively, the request may be received via an API call. In either case, the request may be received from a client machine in communication with the text generation interface system 210 via the internet. The request may, for instance, include a natural language query to identify, count, summarize, or other interact with documents that meet one or more criteria. For instance, the request may include a natural language query to determine the proportion of contracts for the purchase of goods or services valued over $100,000 signed by parties within California in the last 10 years where the contract includes a mandatory arbitration clause.

A query and filter comprehension prompt is determined at 1104 based on the request. In some embodiments, the query and filter comprehension prompt may be determined by combining some or all of the query received with the request at 1102 with a query and filter comprehension prompt template. The query and filter comprehension prompt template may include one or more fillable elements that may be filled with text, such as "{{query.text}}". The query and filter comprehension prompt template may also include an instruction to the text generation modeling system to restate the query and filter request included in the query and filter comprehension prompt template. The prompt template may also include one or more additional instructions, such as an instruction to format the text generated by the text generation model as structured text. For instance, the structured text may be implemented as a JSON list. An example of a template for generating a summary of a query is as follows:

Purpose: Find information in a contract that is highly relevant to a question.
Question: {{query.text}}
Give your answer in the following format:
<question_comprehension>[restate what the Question is trying to ask in clear terms to show that you understood the question]</question_comprehension>
Then give a very brief explanation of your answer.
<|endofprompt|>
<question_comprehension>

A query and filter description is determined at 1106 based on the prompt. In some embodiments, the query and filter description may be determined by transmitting the query and filter comprehension prompt to a remote text generation modeling system, for instance via an API call. The remote text generation modeling system may then complete the prompt and return it to the text generation interface system. The text generation interface system may extract from the completed prompt a description of the query and filter request included in the prompt.

The query and filter description is transmitted for feedback at 1108. In some embodiments, the query and filter description may be transmitted to a client machine, such as the client responsible for generating the request received at 1102. For instance, the query and filter description may be transmitted for feedback via a chat session or response to an API call.

A determination is made at 1110 as to whether to receive an updated request to query the database system. In some embodiments, the determination may be made based at least in part on user input. For instance, a user may review the description and provide feedback as to whether the description produced by the text generation modeling system accurately characterizes the user's initial intent when formulating the query. The user may then provide feedback either accepting or updating the query requested.

If it is determined to receive an updated request to query the database system, then an updated request to query the database system is received at 1102. The updated request may then be re-evaluated. In this way, the text generation system may ensure that the text generation modeling system more accurately interprets the user's intent when formulating the query.

If instead it is determined not to receive an updated request to query the database system, then a query generation prompt is determined at 1112. In some embodiments, the query generation prompt may be determined by combining some or all of the query received with the request at 1102 and/or the query and filter description determined at 1106 with a query generation prompt template. The query generation prompt template may include one or more fillable elements that may be filled with text, such as "{{query.text}}". The query generation prompt template may also include an instruction to the text generation modeling system to determine one or more query and/or filter parameters based on the query generation prompt. The prompt template may also include one or more additional instructions, such as an instruction to format the text generated by the text generation model as structured text. For instance, the structured text may be implemented as a JSON list. In particular embodiments, a query generation prompt may be used to generate multiple queries, each of which may be executed against a suitable database. An example of a prompt template for generating a query is as follows:

We are generating queries for a search engine given a user's original query. The search engine output must follow a specific output format which we will explain to you soon. The search engine, called AllSearch, can search with two different modes, "parallel" (aka Parallel Search) and "kw" (aka Keyword Searches).
Parallel Searches are vector-based searches. This means that input queries must resemble full sentences.
The full sentences are encoded as dense vectors and used to retrieve the K nearest neighbors in the index's vector space.
For example, if a user wanted to know if refusal to wear a mask at work constituted employment discrimination, a good query for parallel search would be:
"McVader's termination of Skywalker for refusal to wear a mask cannot be construed as discriminatory."
If the user provided a name, then it's good to use the name, but if no name is given, it's ok to make one up (in this case "McVader").
Keyword searches are bag-of-words based retrieval searches that use ranking methods such as BM-25 or TF-IDF.
In these searches, it's important for queries to make exact word or phrase matches in order to get relevant results.
A good query would use single words and/or short phrases with words that we would guess are likely to appear in the search corpus.
For example, if the user who wanted to know if refusal to wear a mask at work constituted employment discrimination was making a keyword search, good queries would include:
apparel workplace discrimination
employee discrimination
mask mandates workplace
religious exemption employment law
and so forth.
Finally, Keyword Searches can use terms and connectors. The purpose of using terms and connectors is less so to answer a question, but to help someone search over a corpus of documents that may be responsive to the query. Turn the user's question into three terms-and-connectors searches, including using proximity searching, "OR" and "AND" parameters, root expansion (using !), and parentheses using the following guidelines:
The terms and connectors search terms should cover all the substantive aspects of the question
Examples of good terms-and-connectors searches: '(reject! or refus!)/s settl!/s fail!/s mitigat!', '((sexual/2 (assault! OR harass! OR misconduct))/p "first amendment") AND (school OR university OR college)'

Given the user's original query: "{{query_text}}",
{% if query_comprehension_text %} And given this supplemental information about the query that the user approved: {{query_comprehension_text}},{% endif %}
Generate several XML documents (bounded by the '<q>' tag), with each document representing a search query. The documents must conform to the following schema:
<q>
   <t>[string—the query text that you generate]</t>
   <m>[the mode, must be exactly one of "kw" or "parallel"]</m>
</q>
You must provide at least two of each: parallel search, keyword search without terms and connectors, and keyword search with terms and connectors.
Provide three more queries of any any mode.
<|endofprompt|>
Here are the XML documents and nothing else:

The query generation prompt is transmitted to a text generation modeling system at 1114. Then, a query generation prompt response message is received at 1116. According to various embodiments, the query generation prompt may be transmitted to the text generation modeling system via an API request. The text generation modeling system may then complete the prompt via a text generation model implemented at the text generation modeling system, and send a response that includes the completed prompt.

A database query is determined at 1118 based on the query generation prompt response message. In some embodiments, determining the database query may involve extracting one or more database query parameters from the query generation response message. For instance, the query generation response message may include a JSON portion that encodes a list of database query parameters. The database query parameters may then be combined with a query template to generate the database query. Alternatively, the query generation prompt response message may include a fully formed database query.

According to various embodiments, the particular operations involved in determining the database query may depend in part on the type of database system employed. For example, the query structure may depend on whether the database system is a relational database system or a nonrelational database system. As another example, the query structure may depend on the structure of tables within the database system. Additional details regarding the querying of the database system are discussed with respect to the method 1200 shown in FIG. 12.

At 1120, a text filter is determined based on the query generation prompt response message. In some embodiments, the text filter may include any suitable information for providing to a text generation modeling system for filtering results returned by the database query determined at 1118. For example, the text filter may include one or more qualitative restrictions capable of being evaluated by the text generation modeling system. As another example, the text filter may include one or more restrictions that are not reflected by information stored in the database system. Additional details regarding the filtering of results returned by the database system are discussed with respect to the method 1200 shown in FIG. 12.

Figure 12:
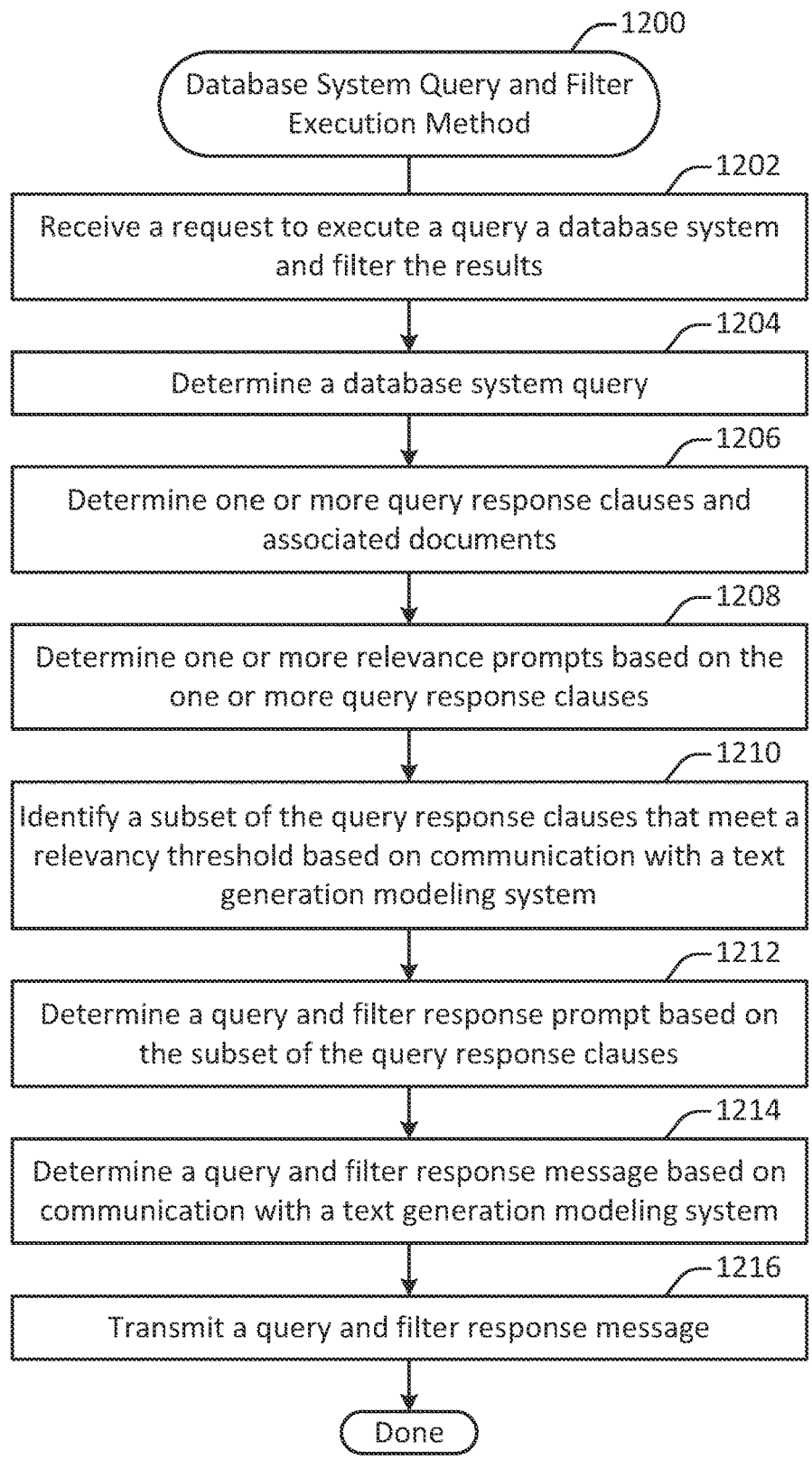
FIG. 12 illustrates a database system query and filter execution method, performed in accordance with one or more embodiments.

FIG. 12 illustrates a database system query and filter execution method 1200, performed in accordance with one or more embodiments. The method 1200 may be performed at a text generation system such as the system 200 shown in FIG. 2. For instance, the method 1100 may be performed at the text generation interface system 210.

A request to execute a database system is received at 1102. In some embodiments, the request may be generated automatically, for instance after a database query is generated as discussed with respect to operation 1118 shown in FIG. 11. The request may be generated as part of a chat flow or based on an API request. In either case, the request may be generated based on interaction with a client machine in communication with the text generation interface system 210 via the internet.

A database system query is identified at 1204. According to various embodiments, the database system query may be determined as discussed with respect to operation 1118 shown in FIG. 11.

One or more query response clauses and associated documents are determined at 1206. In some embodiments, the one or more query response clauses and associated documents may be determined by executing the query identified at 1204 against the database system. As discussed herein, for instance with respect to FIG. 10, the database system may store metadata characterizing documents portions of text from documents. Executing the query may result in the database system returning one or more documents, document portions, and/or identifiers that identify documents and/or document portions.

One or more relevance prompts are determined at 1208 based on the one or more query response clauses. In some embodiments, a relevance prompt may be determined by combining some or all of the query results received at 1206 with a relevance prompt template. The relevance prompt template may include one or more fillable elements that may be filled with text. One or more of the fillable elements may be filled with some or all of the query results received at 1206. Additionally, one or more of the fillable elements may be filled with relevance information. The relevance information may include some or all of the text filter determined at 1120. Alternatively, or additionally, the relevance information may include some or all of the query received at 1102, the query and filter description determined at 1106, and/or the database query determined at 1118.

In some embodiments, the relevance prompt template may also include an instruction to the text generation modeling system to evaluate and/or rank the included search result or results for relevance against the relevance information. The prompt template may also include one or more additional instructions, such as an instruction to format the text generated by the text generation model as structured text. For instance, the structured text may be implemented as a JSON list. An example of a relevance prompt template is as follows:

Evaluate whether these documents are relevant to this research request or query:
"{{text}}"
$$DOCUMENTS$$
{{documents}}
$$/DOCUMENTS$$
   Only respond with relevant documents. In order to be deemed relevant, a document must directly answer the request or query. A document should also be considered relevant if it reaches a conclusion in opposition to the research request.
   If there are no relevant documents, do not include any in your response.

Assign a relevance score to each document, judging its relevance to the research request or query: "{{text}}". The score should correlate to these values:
5—the document is directly on-point (i.e., it precisely responds to every aspect of the query or request, even if it is in opposition to the request, and not a similar but different issue; it fully and conclusively settles the question raised in the request either in favor or against the intention of the request, if any)
4—the document may provide a useful analogy to help answer the request, but is not directly responsive
3—the document is roughly in the same topical area as the request, but otherwise not responsive
2—the document might have something to do with the request, but there is no indication that it does in the text provided
1—the document is in no way responsive to the request
Return a JSON array of objects, each object representing a relevant case, ordered with the most relevant case first. Each object in the array will have the keys:
\'result_id\'—string, the result ID
\'reason_relevant\'—string, a description of how the document addresses the research request or query: "{user_request}". In drafting this response, only draw from the excerpted language of the document; do not include extraneous information.
\'relevance_score\'—number, between 1-5, of how relevant the document is to the research request or query: "{user_request}"
\'quotes\'—array of strings. For each document, quote the language from the document that addresses the request. In finding these quotes, only draw from the excerpted language; do not include extraneous information. Do not put additional quotation marks around each quote beyond the quotation marks required to make valid JSON.
Only valid JSON. Quotation marks within strings must be escaped with a backslash (\'\\\'). Examples for reason_relevant: \'"The concept of \\"equitable tolling\\" applies in this case."\', \'"The case overturns a lower court decision that found a state abortion restriction unconstitutional based on Roe v. Wade and Casey, and argues that the viability rule from those cases is not the \\"central holding.\\" This case calls into question the continued validity of Roe v. Wade."\'
If there are no relevant documents, respond with an empty array.
<|endofprompt|>
Here's the JSON:

In some implementations, more than one relevance prompt may be determined. For instance, if many query response clauses are determined at 1206, then these query responses may be divided into groups for the purpose of relevancy analysis. The size of the groups may be determined based on a chunk threshold. Additional details regarding the division of text into chunks are discussed with respect to the method 600 shown in FIG. 6.

A subset of the query response clauses that meet a relevancy threshold based on communication with a text generation modeling system are identified at 1210. In some embodiments, the subset of the query response clauses may be identified by transmitting the prompt or prompts determined at 1208 to a remote text generation modeling system. The remote text generation modeling system may then respond with one or more completed prompts. The text generation interface system may then extract relevancy information from the completed prompts.

According to various embodiments, the relevance threshold may be determined in any of various ways. For example, all results that exceed a designated relevance threshold (e.g., 3 out of a scale of 1-5 as shown in the example prompt template included above) may be identified. As another example, the most relevant results that are able to fit in a designated number (e.g., one or two) chunks may be identified.

A query and filter synthesis prompt is determined at 1212 based on the subset of the query response clauses. In some embodiments, the query and filter synthesis prompt may be determined by combining a query and filter synthesis prompt template with information about the query and with query response clauses deemed suitable relevant at operation 1210. The query information may include some or all of the query received at 1102, the query and filter description determined at 1106, the database query determined at 1118, and/or the text filter determined at 1120. An example of a query and filter synthesis prompt template in the legal context is as follows:

You are helping a lawyer research the prevailing market consensus on a given type of contract clause.
Using the following list of contract clauses, analyze the range of different terms for this type of clause in the context of this request from the lawyer: "{{text}}"
$$CONTRACT_CLAUSE_LIST$$
{{documents}}
$$/CONTRACT_CLAUSE_LIST$$
Based on these contract clauses, and in the context of the lawyer's request, prepare:
1. Range of Terms: An extensive analysis of the range of different provisions included in these clauses, following these instructions:
    List the dimensions on which the clauses differ, and explain the range of provisions along each of the dimensions.
    Focus on the range of favorability to one side or another
    Only draw from the language in this list of clauses; do not include extraneous information.
2. Average Terms: State what the average terms over the above list of contracts is over the dimensions you analyzed for question 1 above.
3. Suggested Language: Draft a contract clause that is approximately average in terms when compared to the above list of clauses.
4. List the clauses that were most relevant to your analysis, following this guidance:
    Do not include in this list any clauses that are not relevant to the request.
    If none of the clauses are relevant, return an empty array for results.
Respond with nothing but a JSON object, with the following keys:
\'range_of_terms\': your analysis of the range of provisions in the clause list, in the context of the lawyer's request.
\'average_terms\': your analysis of the average provisions over the clauses in the list, in the context of the lawyer's request.
\'suggested_language\': your draft clause with approximately average terms.
\'ids\': (array of strings), in order of relevance, the document IDs of the documents that are most relevant to the request.

Only valid JSON; check to make sure it parses, and that quotes within quotes are escaped or turned to single quotes. For the \'answer\' key, this could look like: "This is an answer with \\"proper quoting\\""
<|endofprompt|>
Here's the JSON:

A query and filter response message is determined at 1214 based on communication with the text generation modeling system. In some embodiments, determining the query and filter response message may involve transmitting the prompt determined at 1212 to the remote text generation modeling system. The remote text generation modeling system may then respond with one or more completed prompts. The text generation interface system may then extract information for providing the query and filter response message. The extracted information may be used as-is or may be edited, supplemented, or otherwise altered to create the query and filter response message.

A query and filter response message is transmitted at 1216. In some embodiments, the query and filter response message may be provided to a client machine. The message may be sent in response to an API request, transmitted via a chat session, or provided in some other way.

Figure 13:
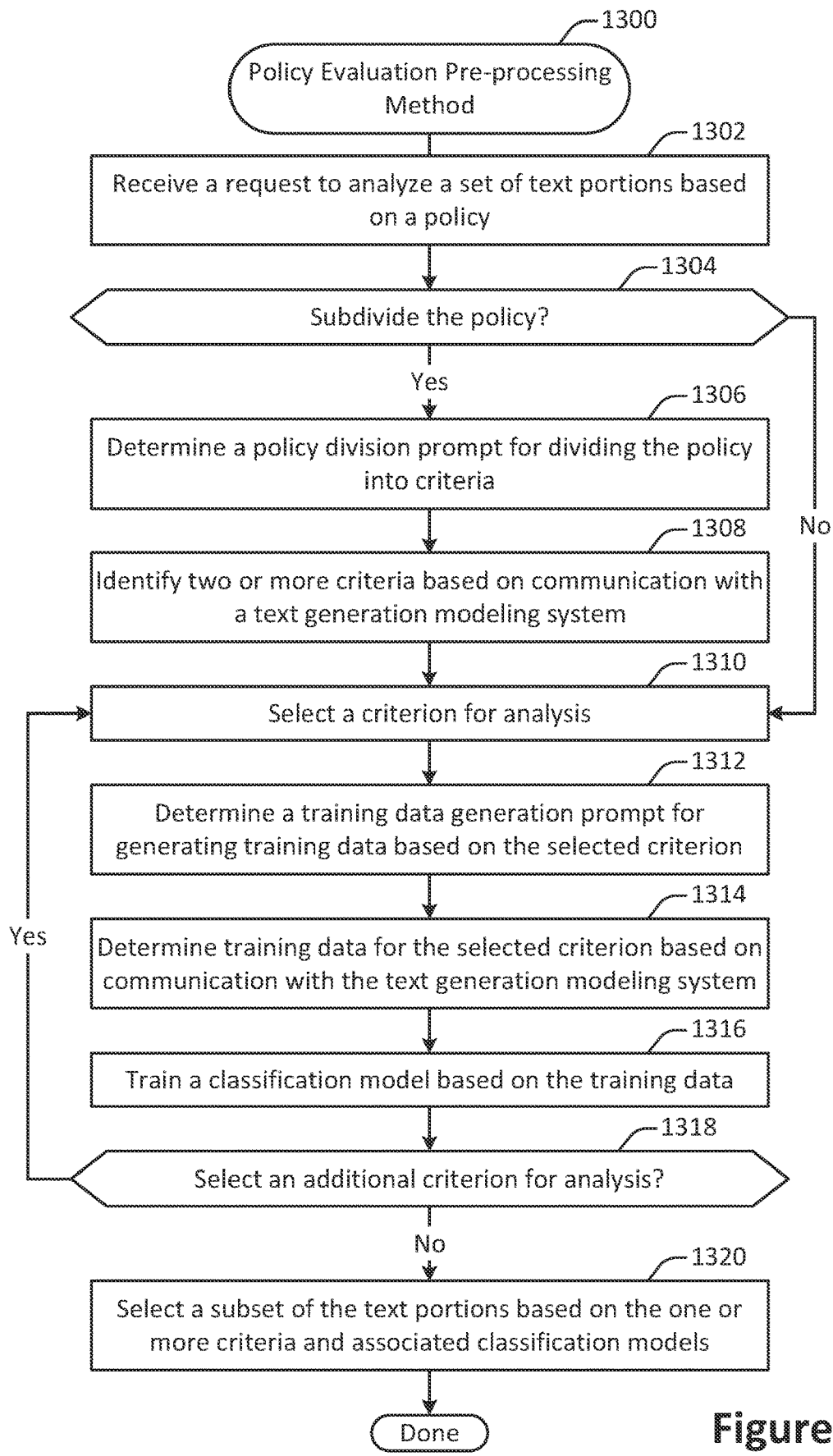
FIG. 13 illustrates a policy evaluation pre-processing method, performed in accordance with one or more embodiments.

FIG. 13 illustrates a policy evaluation pre-processing method 1300, performed in accordance with one or more embodiments. The method 1300 may be performed at a text generation system such as the system 200 shown in FIG. 2. For instance, the method 1300 may be performed at the text generation interface system 210.

A request to analyze a set of text portions based on a policy is received at 1302. In some embodiments, the request may be received via a chat interface. For instance, the text generation interface system may receive text-based messages from a client machine and then provide to the client machine text-based responses generated by a machine learning model. Alternatively, the request may be received in some other way, such as via an API request. The request may be generated automatically or based on user input.

According to various embodiments, a text portion may correspond to a document, a set of documents, a portion of a document, or text outside the context of a document. Text portions may be identified in any of various ways. For example, the request received at 1302 may include one or more identifiers that uniquely identify individual text portions and/or groups of text portions stored in a document repository or other location accessible to the text generation interface system. As another example, the request received at 1302 may include a query for searching for text portions within one or more document repositories or other sources of text, and the text portions identified at 1302 may include results determined by executing such a search.

In some implementations, the policy included in the request received at 1302 may include a natural language question, instruction, filter, or other such actionable text implemented in natural language. For example, the policy may specify that all documents that meet one or more criteria must include one or more terms such as a limitation of liability, legal disclaimer, or privacy notice. As another example, the policy may specify that all documents that meet one or more criteria must not include one or more terms such as an arbitration clause or force majeure clause.

A determination is made at 1304 as to whether to subdivide the policy. In some embodiments, the determination may be made based on one or more indicators that the policy is complex. For example, a determination may be made to subdivide a policy based on its length and/or complexity. As another example, a determination may be made to subdivide the policy based on the presence, absence, or number of characteristics such as question marks, sentences, conjunctives, and other such features. The determination may be made based at least in part on a machine learning model applied to the policy to classify it in terms of complexity.

If it is determined to subdivide the policy, then at 1306 a policy division prompt is determined for dividing the policy into subqueries. In some embodiments, the prompt may be determined by combining a prompt template with the text of the policy. The prompt template may include an instruction to divide the policy into a set of criteria. The prompt template may also include a fillable portion into which the policy text may be inserted. The prompt template may also include one or more additional instructions, such as an instruction to format the text generated by the text generation model as structured text. For instance, the structured text may be implemented as a JSON list.

At 1308, two or more criteria are identified based on communication with a text generation modeling system. In some embodiments, the two or more subqueries may be identified by sending the policy division prompt to the remote text generation modeling system via an API request. A text generation model implemented at the remote text generation modeling system may then complete the policy division prompt, after which it may be sent back to the text generation interface system. The text generation interface system may then extract the subqueries from the completed policy division prompt, for instance by parsing JSON included in the completed request.

A criterion is selected for analysis at 1310. According to various embodiments, criteria may be analyzed in sequence, in parallel, or in any suitable order.

A training data generation prompt for generating training data based on the selected criterion is determined at 1312. In some embodiments, the training data generation prompt may include an instruction for instructing a text generation modeling system to generate text that matches the criterion. The training data generation prompt may include a fillable portion for including the text of the criterion.

Training data for the selected criterion is determined at 1314 based on communication with the text generation modeling system. In some embodiments, the training data may be identified by sending the training data generation prompt to the remote text generation modeling system via an API request. A text generation model implemented at the remote text generation modeling system may then complete the training data generation prompt, after which it may be sent back to the text generation interface system. The text generation interface system may then extract the training data from the completed policy division prompt, for instance by parsing JSON included in the completed request.

In some embodiments, the training data may include one or more training data text portions. Each training data text portion may include text constructed by the text generation modeling system based on the text of the criterion. For example, a training data text portion may substitute one or more of the words in the criterion for synonyms. As another example, a training data text portion may restate a criterion using a different sentence structure.

A trained classification model is determined at 1316 based on the training data. According to various embodiments, any of a variety of classification models may be used. For instance, the classification model may include a text embedding model that positions text in a vector space.

A determination is made at 1318 as to whether to select an additional criterion for analysis. In some implementations, additional queries may continue to be selected until all available queries are processed.

If it is determined not to select an additional criterion for analysis, then a subset of the text portions is selected based on the one or more queries and the associated classification models. Additional details regarding the selection of text portions for analysis are discussed with respect to the method 1400 shown in FIG. 14.

Figure 14:
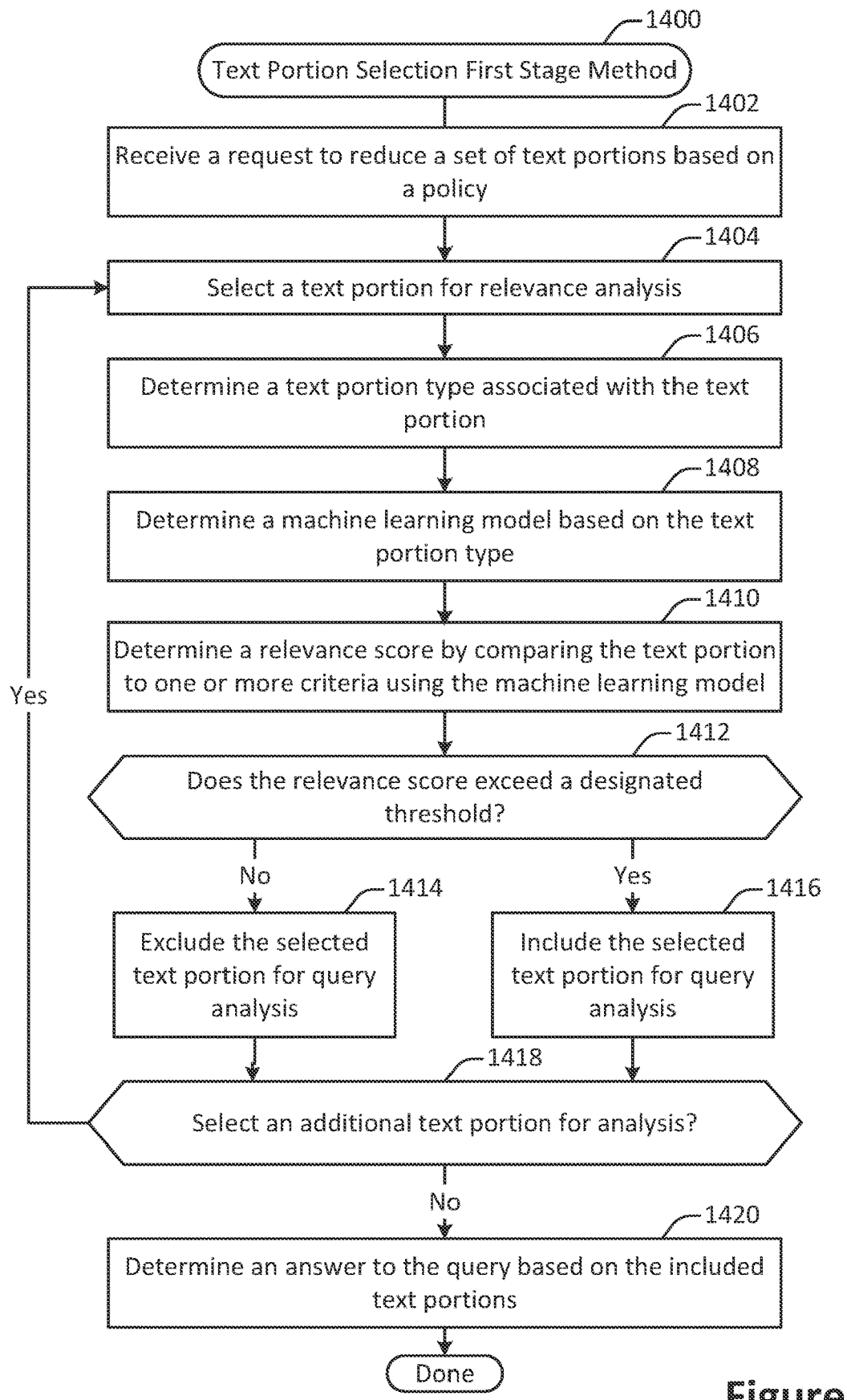
FIG. 14 illustrates a text portion selection first stage method, performed in accordance with one or more embodiments.

FIG. 14 illustrates a text portion selection first stage method 1400, performed in accordance with one or more embodiments. The method 1400 may be performed at a text generation system such as the system 200 shown in FIG. 2. For instance, the method 1400 may be performed at the text generation interface system 210.

In some embodiments, the text portion selection first stage method 1400 may be performed to select a subset of text portions for evaluation against one or more criteria. Alternatively, the text portion selection second stage method 1500 shown in FIG. 15 may be performed to select a subset of text portions for evaluation against one or more criteria. As still another possibility, the text portion selection first stage method 1400 shown in FIG. 14 may be performed in conjunction with the text portion selection second stage method 1500 shown in FIG. 15.

A request is received at 1402 to reduce a set of text portions based on a policy. In some embodiments, the request may be generated as discussed with respect to operation 106. The request may identify a policy to evaluate and a document or documents having a set of text portions that may be used to evaluate the policy. Optionally, the request may be generated after performing one or more of the preprocessing operations discussed with respect to the method 1300 shown in FIG. 13.

A text portion is selected for relevance analysis at 1404. According to various embodiments, text portions may be analyzed in parallel or in sequence, and in any suitable order.

A text portion type associated with the text portion is determined at 1406. A machine learning model is determined at 1408 based on the text portion type. In some embodiments, the text portion type may be determined based on the application of a classification model. For instance, a machine learning model may be configured to classify text portions or documents into one or more of a set of types of text. Then, a machine learning model may be selected that is specific to the text portion type.

In some embodiments, different types of text may be associated with different types of models. Alternatively, or additionally, a type of text may be associated with a machine learning model that is specifically trained for that type of text.

A relevance score is determined at 1410 by comparing the text portion to one or more criteria using a machine learning model. According to various embodiments, any of a variety of machine learning models may be used.

In some embodiments, a machine learning model may be implemented as a pre-trained text embedding model trained as discussed with respect to FIG. 13. For instance, a machine learning model may be implemented as a bi-encoder in which text portions are separately encoded and then mapped to a common embedding space. Then, at 1406, the relevance score may depend on the distance between the criterion and the text portion in the embedding space.

As another example, a machine learning model may be implemented as a cross-encoder model. In a cross-encoder, all or a portion of the criterion and all or a sub-portion of the text portion may be compared in a pair model, which may be built on a transformer-based language model such as BERT (Bidirectional Encoder Representations from Transformers) or RoBERTa (Robustly Optimized BERT Pretraining Approach).

Figure 15:
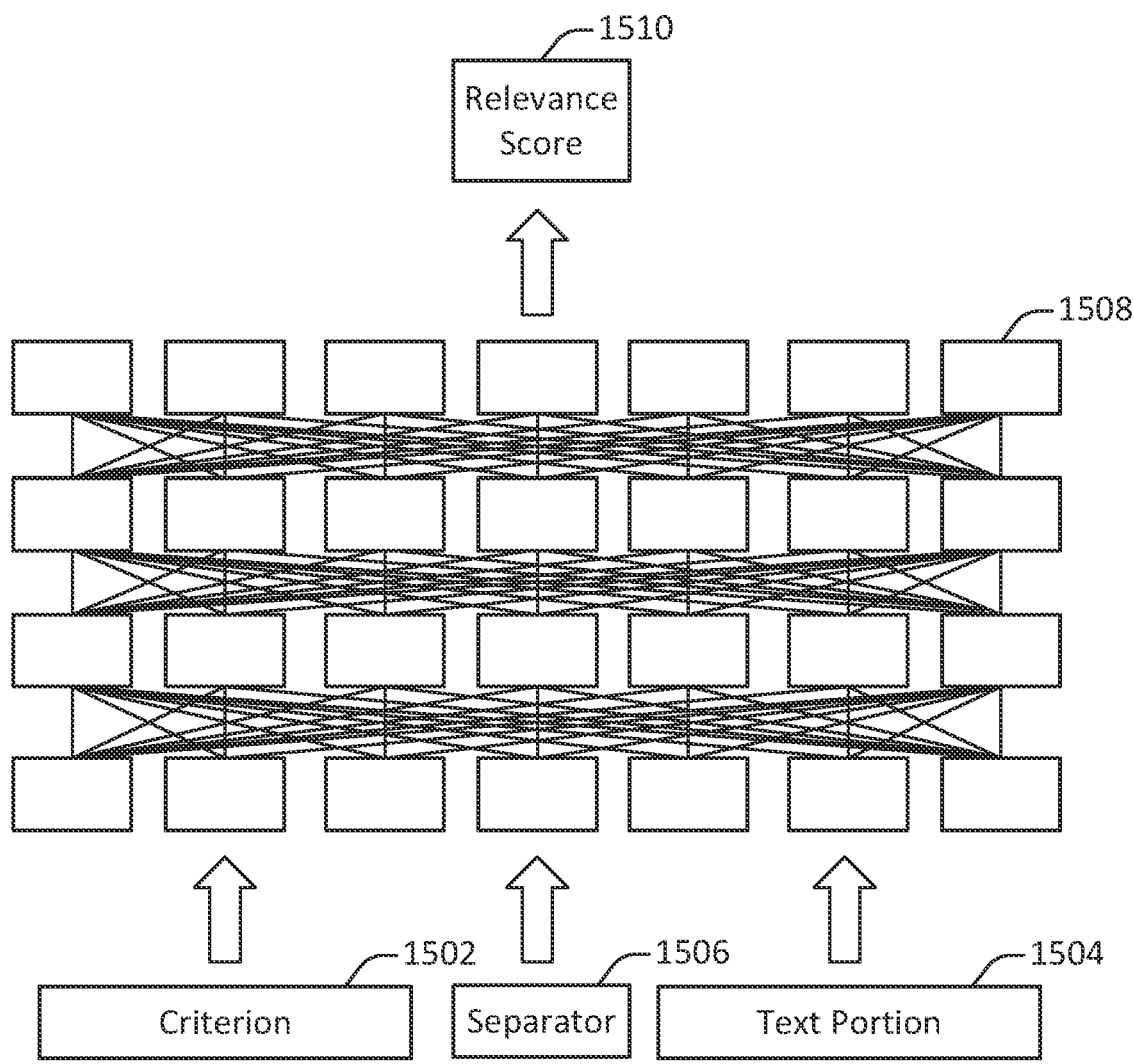
FIG. 15 illustrates a cross-encoder modeling system, configured in accordance with one or more embodiments.

FIG. 15 illustrates a cross-encoder modeling system, configured in accordance with one or more embodiments. The cross-encoder modeling system accepts as input both a criterion portion 1502 and a text portion 1504. The criterion and text portions are separated in the input by a separator 1506. The cross-encoder modeling system that employs a number of layers of cross-linked neurons 1508 to produce a relevance score 1510.

According to various embodiments, the number of layers of neurons and the number of neurons in each layer may be strategically determined for accuracy and efficiency. For instance, one or more text embedding models may be created using a training data set. The text embedding models may then be used to produce relevance scores for a number of different queries and text portions. The relevance scores may then be used to create a loss function for hyperparameter tuning of the number of layers of neurons and number of neurons per layer in a cross-encoder model. Then, the cross-encoder model may used for future iterations without pre-training.

In some embodiments, a combination of approaches may be used. For instance, in a trans-encoder, one or more bi-encoder representations may be used to fine-tune a cross-encoder. Then, the cross-encoder may be used to perform more accurate knowledge extraction using inter-sentence modeling. The resulting information may be used to improve the accuracy of the bi-encoder model. The process may be repeated to iteratively bootstrap from both the bi-encoder and the cross-encoder.

A determination is made at 1408 as to whether the relevance score exceeds a designated threshold. According to various embodiments, the designated threshold may be strategically determined based on various factors. For example, different machine learning models may produce relevance scores having different distributions, leading to a designated threshold that is model-dependent. As another example, the designated threshold may be determined based at least in part on the number of text portions included in the request and a desired reduction of the text portions. For instance, the designated threshold may be determined so as to select a particular number or proportion of the text portions as relevant. As another example, the designated threshold may be determined so as to select more or fewer text portions as relevant, which may involve various tradeoffs. For instance, setting a lower designated threshold may result in selecting more documents as relevant, potentially leading to improved accuracy in evaluating the policy at the expense of relatively greater cost and compute time. An example of a relevance prompt in the legal context is as follows:

Below are portions of two documents. One is our company's policies for contracts, the other is part of a contract that our company may enter into.

$$POLICY PROVISIONS$$

{% for policy in policies %}

$$POLICY {{policy.id}}$$

{{policy.text}}

$$/POLICY$$

```
{% endfor %}
$$/POLICY PROVISIONS$$
The following Clauses are from a {{context}}
$$CONTRACT CLAUSES$$
{% for clause in contract_clauses %}
    $$CLAUSE {{clause.id}}$$
        {{clause.text}}
    $$/CLAUSE$$
{% endfor %}
$$/CONTRACT CLAUSES$$
```

For each contract clause that applies or violates any of the provided policy provisions, provide an XML document called '<relevant_clause>' with the following tags:
  'policy_id' (string): ID of the policy (please use the full ID of the policy, e.g. 'Policy #6' instead of just '6')
  'clause_id' (string): ID of the clause (please use the full ID of the clause, e.g. 'Clause #9' instead of just '9')
  'applies' (bool): true if the policy applies to the clause, false if it does not. This should be true if the clause directly gives effect to or implements the policy.
  'change_required' (bool): true if the clause needs to be edited to come into compliance with the policy, false if it does not. This should be true whenever the clause violates the Policy.
  'relevance_score' (int): a 1-9 score rating how much the policy applies to the clause, 9 being the highest relevancy, 1 being the lowest.
Generally, err on the side of clauses violating policy when there is ambiguity or if the violation is minor.
Your answer must be thorough and complete, capturing every instance of the provided clauses being relevant to any of the provided policy provisions. You may provide lengthy answers when needed.
Return an XML list of the objects following the above criteria.
If nothing is relevant, return a single XML object with the sole key of 'no_matches' (bool) equalling true.
<|endofprompt|>
Here's the XML documents following your instructions:

If it is determined that the relevance score does not exceed the designated threshold, then at 1414 the selected text portion is excluded for policy analysis. If instead it is determined that the relevance score does exceed the designated threshold, then at 1416 the selected text portion is included for policy analysis.

A determination is made at 1418 as to whether to select an additional text portion for analysis. According to various embodiments, text portions may continue to be selected until all available text portions have been analyzed for relevance.

If it is determined not to select an additional text portion for analysis, then at 1420 the policy is evaluated based on the included text portions. According to various embodiments, evaluation of the policy may involve communicating with a text generation modeling system using the selected text portion.

In some implementations, evaluation of the policy may involve implementing one or more elements from workflows discussed herein. Optionally, the text portions may be reduced further, for instance as described with respect to the method 1600 shown in FIG. 16.

Figure 16:
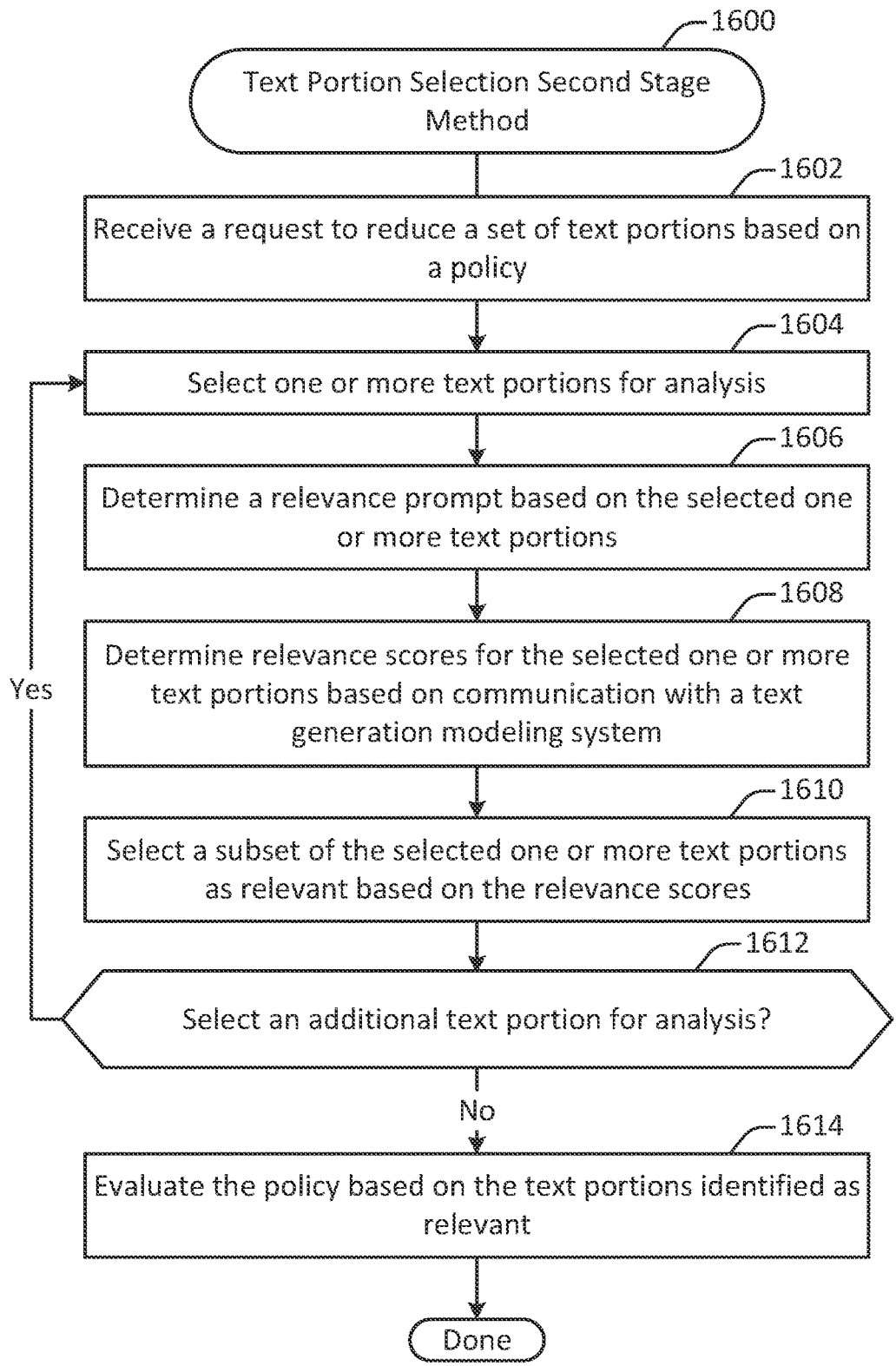
FIG. 16 illustrates a text portion selection second stage method, performed in accordance with one or more embodiments.

FIG. 16 illustrates a text portion selection second stage method 1600, performed in accordance with one or more embodiments. The method 1600 may be performed at a text generation system such as the system 200 shown in FIG. 2. For instance, the method 1600 may be performed at the text generation interface system 210.

A request is received at 1602 to reduce a set of text portions based on a policy. In some embodiments, the request may be generated as discussed with respect to operation 108. The request may identify a policy to evaluate and a set of text portions that may be used to evaluate the policy. Optionally, the request may be generated after performing one or more of the preprocessing operations discussed with respect to the method 1300 shown in FIG. 13 and/or one or more of the text portion selection operations discussed with respect to the method 1400 shown in FIG. 14.

One or more text portions are selected for analysis at 1604. In some embodiments, text portions may be selected so as to fit within a designated chunk size. Additional details regarding the division of text into chunks are discussed with respect to the method 600 shown in FIG. 6.

A relevance prompt is determined at 1606 based on the selected one or more text portions. In some embodiments, the relevance prompt template may also include an instruction to the text generation modeling system to evaluate and/or rank the included text portions for relevance against the policy. The prompt template may also include one or more additional instructions, such as an instruction to format the text generated by the text generation model as structured text. For instance, the structured text may be implemented as a JSON list.

Relevance scores for the selected one or more text portions are determined at 1608 based on communication with a text generation modeling system. In some embodiments, the relevance scores may be identified by sending the relevance prompt to the remote text generation modeling system via an API request. A text generation model implemented at the remote text generation modeling system may then complete the relevance prompt, after which it may be sent back to the text generation interface system. The text generation interface system may then extract the relevance scores from the completed prompt, for instance by parsing JSON included in the completed request.

In particular embodiments, the relevance prompts may be implemented as high-read, low-write. In such a configuration, the text generation modeling system may be instructed to provide a small amount of feedback for a text portion rather than to generate a description in natural language. For instance, the text generation modeling system may be asked to provide a sequence of numbers corresponding to relevance scores for the sequence of text portions. In this way, the cost associated with interacting with the text generation modeling system may be reduced.

A subset of the selected one or more text portions are selected as relevant at 1610 based on the relevance scores. According to various embodiments, the subset of the text portions may be selected as relevant based on a comparison of the relevance score against a designated threshold. As discussed with respect to the operation 1408 shown in FIG. 14, a relevance threshold may be determined based on various factors.

A determination is made at 1612 as to whether to select an additional text portion for analysis. According to various embodiments, additional text portions may continue to be selected until all available text portions have been analyzed for relevance.

If it is determined not to select an additional text portion for analysis, then at 1614 the policy is evaluated based on the text portions selected as relevant. According to various embodiments, evaluating the policy may involve communicating with a text generation modeling system using the selected text portion. Additional details regarding policy evaluation are discussed with respect to the method 1700 shown in FIG. 17.

Figure 17:
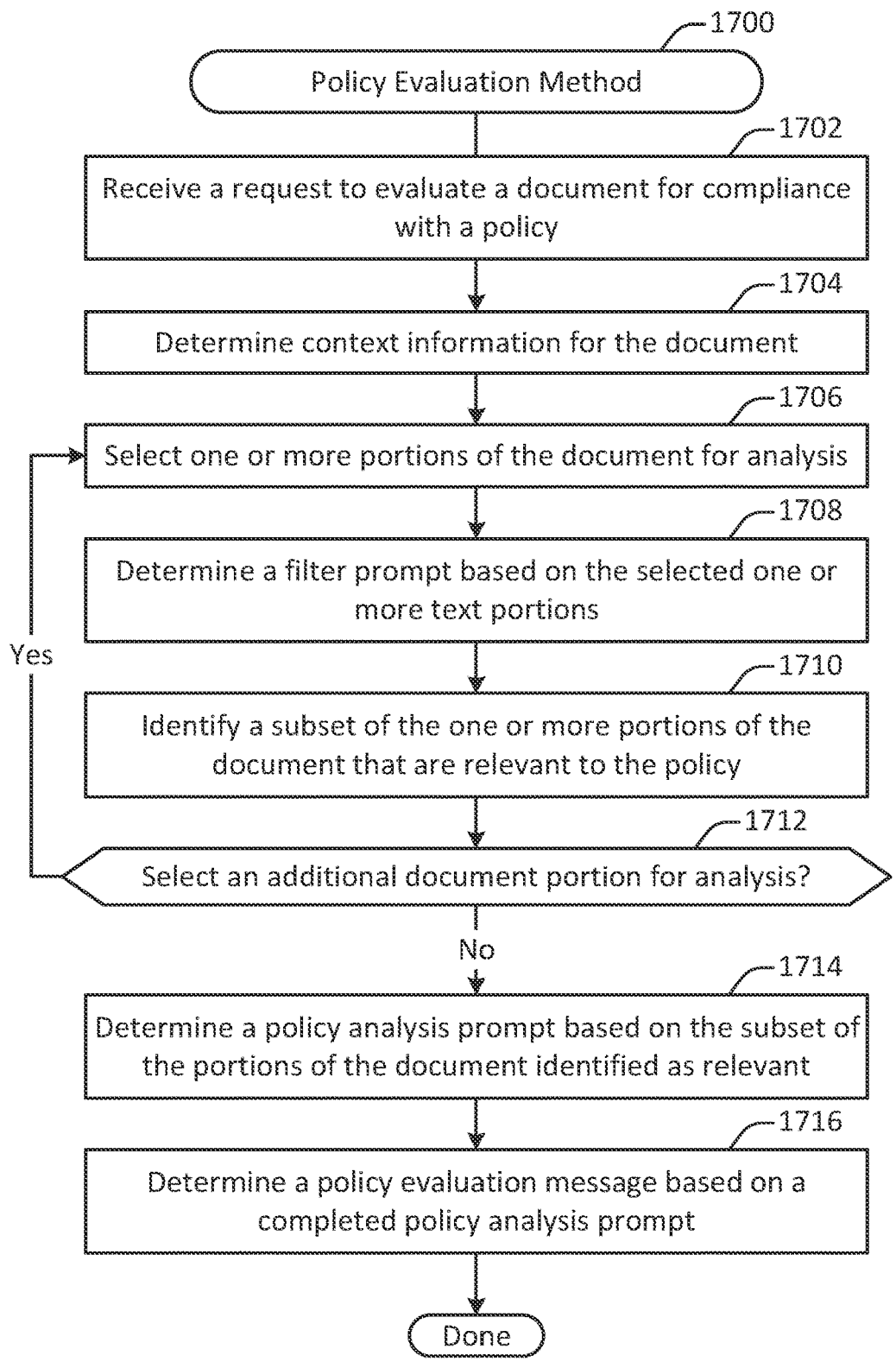
FIG. 17 illustrates a policy evaluation method, performed in accordance with one or more embodiments.

FIG. 17 illustrates a policy evaluation method 1700, performed in accordance with one or more embodiments. The method 1700 may be used to evaluate a natural language document for compliance with a policy specified in natural language.

A request to evaluate a document for compliance with a policy is received at 1702. In some embodiments, the request may be received via a chat interface. For instance, the text generation interface system may receive text-based messages from a client machine and then provide to the client machine text-based responses generated by a machine learning model. Alternatively, the request may be received in some other way, such as via an API request. The request may be generated automatically or based on user input.

In some embodiments, the request received at 1702 may identify a policy. A policy may be provided via user input and included in a chat interface. Alternatively, or additionally, a policy may be identified by reference to a file or other configuration information accessible to the system. The policy may include one or more criteria of any type capable of being expressed in natural language and applicable to documents written in natural language. For instance, a criterion may specify that documents of a particular type must include or exclude a particular stipulation, disclaimer, requirement or other type of language.

Context information for the document is determined at 1704. In some implementations, determining context information for the document may involve creating a prompt that instructs a text generation model implemented at a text generation modeling system to identify the relevant information from the document. Such a prompt may be included by combining information about the document with a context information template. An example of such a template in the legal context is as follows:

The following is the beginning of a contract.
    {% for contract_section in paragraphs %}
    {{contract_section.text}}
    {% endfor %}
    Please write a sentence stating the contract's title, the type of contract it is, the names of the parties to the contract, and the terms that will be used to refer to the parties in the rest of the contract.
    <|endofprompt|>

One or more portions of the document are selected for analysis at 1706. According to various embodiments, a document may be divided into portions suitable for analysis. For instance, a contract may be divided into clauses. A document portion may be composed of one or more sentences, paragraphs, sections, pages, or other suitable units.

In some embodiments, the division of a document into portions may depend on a maximum size associated with a chunk that may be included in a text generation prompt. Additional details regarding the division of text into chunks are discussed with respect to the method 600 shown in FIG. 6.

A filter prompt is determined at 1708 based on the selected one or more text portions. In some embodiments, the filter prompt may include an instruction to a large language model to identify any of the selected portions of the document that are potentially relevant to the policy identified at 1702.

In some implementations, the filter prompt may be determined by combining the selected one or more portions of the document, some or all of the context information determined at 1704, the policy identified at 702, a previously generated restatement (i.e., "comprehension") of the policy generated by the large language model, and a prompt template. The prompt template may include one or more fillable portions in which this information can be inserted. An example of such a prompt template is as follows:

Below are portions of two documents. One is our company's policies for contracts. They represent the kinds of terms we want all our contracts to adhere to. The other document is part of a contract that our company may enter into. We want to FIG. out if the policy in the policy document applies to which Clauses in the contract.
$$POLICY PROVISION$$
    <policy>
        <id>{{policy.id}}</id>
        <text>{{policy.text}}</text>
    </policy>
$$/POLICY PROVISION$$
    The following are the Contract Clauses and they are from a {{context}}
$$CONTRACT CLAUSES$$
{%-for clause in contract_clauses %}
<clause>
    <id>{{clause.id}}</id>
    <text>{{clause.text}}</text>
</clause>
{% endfor—%}
$$/CONTRACT CLAUSES$$
    For each of the Contract Clause and the Policy Provision, decide whether the Policy Provision applies to this type of Contract Clause. A Policy Provision applies to the Clause when they deal with the same type of right or obligation. The Policy Provision can apply to a Clause when the clause complies with the Policy Provision and when the Clause conflicts with the Policy Provision.
    A few guidelines for your answer:
        It will often be the case that a Policy Provision will apply to none of the Contract Clauses in this part of the contract. This is not a problem. When this happens, simply respond by saying APPLIES TO NONE.
        Sometimes, multiple Policy Provisions will apply to the same Contract Clause, or one Policy Provision will apply to multiple Contract Clauses. If that happens, please list all such matches in your answer.
        If a Policy Provision applies only when multiple Contract Clauses are considered together, state that the Policy Provision applies to all such Contract Clauses. Give your answer in the following format for the Policy Provision:
<policy>
<policy_comprehension>[restate the Policy in clear terms to show that you understood the Policy. Do not simply restate the policy verbatim, put it in your own words as clearly as you can to show that you understand it.]</policy_comprehension><what_to_look_for>[briefly summarize what sorts of Contract Clauses you should be looking for to which the Policy Provision applies. These should be the kind of Clauses that either implement or conflict with the Policy i.e. Clauses that either restate the Policy (or part of it) in different words or Clauses that violate the policy. What would a Clause look like that would bring the contract into compliance with the Policy?]</what_to_look_for>
<clauses>[if there are any Clauses to which the Policy Provision applies, list their IDs here (e.g. CC6 CC8

CC9). If the Policy Provision applies to none of the clauses, write "none" (all lower case) here. Do not include any explanation within this tag, just the list. If a Clause applies to only part of the Policy, you must always include it.]</clauses><context_clauses>[where a clause in the "clauses" list above is part of a list that has an introductory clause, and that introductory clause is needed for someone to understand what this clause means, list any such introductory clauses here in the same pipe character separated format. If the clauses above speak for themselves and no further clauses are needed to provide context, write "none" (all lower case) here. Do not include any explanation within this tag, just the list]</context_clauses>

<explanation>[A very brief explanation of why you said the Policy Provision either applies to these Clauses, or, if it didn't apply to any, very briefly explain why. Remember a Clause that does not comply with the Policy always applies.]</explanation>

</policy>

<|endofprompt|>

<policy>

{% if cached_comprehension %}

{{cached_comprehension}}

{% endif %}

A subset of the one or more portions of the document that are relevant to the policy is identified at 1710. In some embodiments, the subset of the portions that are relevant may be identified by transmitting the filter prompt determined at 1708 to a remote text generation modeling system. The remote text generation modeling system may then transmit as a response a completed filter prompt. In the completed filter prompt, none, some, or all of the document portions selected at 1706 may be identified as relevant.

In some embodiments, document portions may be identified as relevant based on the remote text generation modeling system including the entire text of the portion identified as relevant in a suitable portion of the completed filter prompt. Alternatively, or additionally, the remote text generation modeling system may include an identifier for a document portion instead of including text from the document portion.

A determination is made at 1712 as to whether to select an additional document portion for analysis. According to various embodiments, document portions may be analyzed in parallel or in sequence, and in any suitable order. Document portions may continue to be selected until all available portions of the document have been analyzed. Alternatively, document portions may continue to be analyzed until a terminating condition is met, such as the system reaching a conclusion about the application of a policy to a document.

If it is determined not to select an additional document portion for analysis, then at 1714 a policy analysis prompt is determined based on the subset of the portions of the document identified as relevant. In some embodiments, the policy analysis prompt may be determined by combining the text of the policy identified at 1702, some or all of the text information determined at 1704, and the document portions identified as relevant at 1710 with a prompt template that includes one or more fillable portions for including such information. An example of a prompt template is as follows:

The following Contract Clauses are suspected to conflict with a company Policy that applies to its contracts.

Please analyze the Policy below and the Clauses and answer the following questions for each clause:

1. Actually conflicting? Decide whether the Clause conflicts with the Policy. Answer Yes or No. The following are guidelines in deciding whether a Clause conflicts with a Policy:

We suspect these clauses do conflict, so err on the side of saying it conflicts when in doubt.

Take into account the other Clauses listed here—if they cover areas of the Policy that this clause misses in such a way that, taken together, make the contract comply with the policy, then there is no conflict for this Clause (though other clauses may still conflict).

Even seemingly small or insignificant differences count as conflicts because they are of legal significance, e.g. if the Policy says something shall be delivered by truck, and the clause says by car—that would count as a conflict.

Clauses that are not related to the policy (deal with wholly different subject matter) should not count as conflicting with the policy. They are just orthogonal to the policy and neither conflict nor comply with it, and should be marked as No actual conflict.

A Clause that partially complies with the Policy, but would need changes to fully comply must necessarily conflict with the Policy.

2. Differences between the Policy and the Clause? If it does conflict, explain all the ways the Clause does and doesn't conflict with the Policy (or write N/A if it doesn't conflict at all).

3. Risks? Explain the risks of keeping the Clause as-is. The mere fact that it "conflicts with a company policy" does not count as a risk here, you must explain substantively what the risks are given that the Policy is violated/conflicted with in this way.

4. New clause suggestion. Suggest a new clause that would comply with the Policy, while preserving as much of the original Clause as possible. You must reproduce the whole clause here including the changes you suggest. Where appropriate, you should use the same capitalized Defined Terms that the original clause uses.

Here is the Policy:

{{policy.text}}

Here is the Contract Clause from a {{context}}:

<clauses>

{% for clause in contract_clauses %}

<clause>

<id>{{clause.id}}</id>

<text>{{clause.text}}</text>

</clause>

{% endfor %}

</clauses>

Please put your answer in the following XML format with the answers for each clause in its own separate <conflict_check> tag. Never refer to a <clause> by its <clause_id>, instead only refer to a <clause> as the "Clause" rather than "CC_____". Include a conflict_check tag for every clause, even for those that are not actually conflicting:

<conflict_check>

<clause_id>[the ID of the clause]

<policy_comprehension>[list out the details of the policy to show you understand it. List all the rights and obligations the policy requires and which parties those rights and obligations belong to step by step. For example, if the Policy was "The supplier shall issue an accurate and valid invoice for the prices of Goods and/or Services in accordance with the contract, or, where no express provision is detailed, shall send an electronic invoice, monthly in arrears, clearly referencing the Contract", you should write something like:

"The supplier must do one of two things:
1. Issue an invoice that is
   a. accurate
   b. valid
   c. includes the prices of Goods and/or Services
   d. is in accordance with the contract
OR, if no express provision is detailed
2. Send an electronic invoice that
   a. is sent monthly detailing charges for the past month
   b. clearly references the Contract"]
   <similarities_and_differences>[List all the ways in which the Contract Clause complies and/or does not comply with the Policy Provision. Be sure to check every element of the Policy that you listed in <policy_comprehension> and explain how the Clause is the same or different for that element. If you need to refer to the clause, just call it "this clause"]
   <actual_relevance>[int rating from 1-10 of whether this Policy is actually relevant to this Clause at all, with 10 being highly relevant and 1 being not relevant at all. Give only the int rating. Do not attempt to explain in this tag]
   <actual_conflict>[Based on your analysis above, decide Yes or No on whether the Clause actually conflicts with the Policy. Remember to consider all the clauses together in deciding whether there is a conflict]
   <risks>[Risks associated with adopting the non-complying Contract Clause as-is, or N/A]
   <suggested_revision>[Full text of a contract clause that would comply with the Policy Provision while retaining as much of the original clause as possible, or N/A. The full text of the contract clause should not simply be a verbatim recitation of the policy. Do not use special formatting to show what has changed. Never refer to the "policy" in this revised clause.]
</conflict_check>
<|endofprompt|>
Here is the XML and nothing else:

A policy evaluation message is determined at 1716 based on a completed policy analysis prompt. In some embodiments, the completed policy analysis prompt may be determined by sending the input policy analysis prompt determined at 1714 to an remote text generation modeling system, for instance via an API request. The remote text generation modeling system may then complete the policy analysis prompt and return it to the text generation interface system.

In some implementations, the policy evaluation message may include an indication as to whether a particular clause or document portion is relevant to the policy. For example, the relevance clause may be ranked on a scale of 1-10. If the clause is relevant to the policy, then the policy evaluation message may indicate whether the clause complies with or conflicts with the policy.

In some embodiments, a determination that a clause does not comply with or conflicts with a policy may lead to the policy evaluation message including one or more explanations regarding the discrepancy. For example, the policy evaluation message may include an explanation as to the difference between the policy and the clause. As another example, the policy evaluation message may include an explanation of one or more risks of non-compliance.

In some embodiments, a determination that a clause does not comply with or conflicts with a policy may lead to the policy evaluation message including a proposed revision. For example, a new clause may be determined that is as close as possible to the original while nevertheless complying with the policy. As another example, a difference between the original clause and the proposed new clause may be included for the purpose of comparison.

According to various embodiments, clause-level evaluation of compliance with a policy may be aggregated to the document level. For instance, if a document is required to include a particular disclaimer but the system determines that no clause in the document is relevant to the disclaimer, then the document may be identified as being noncompliant with the policy, and a proposal may be provided that the disclaimer be added to the document.

Figure 18:
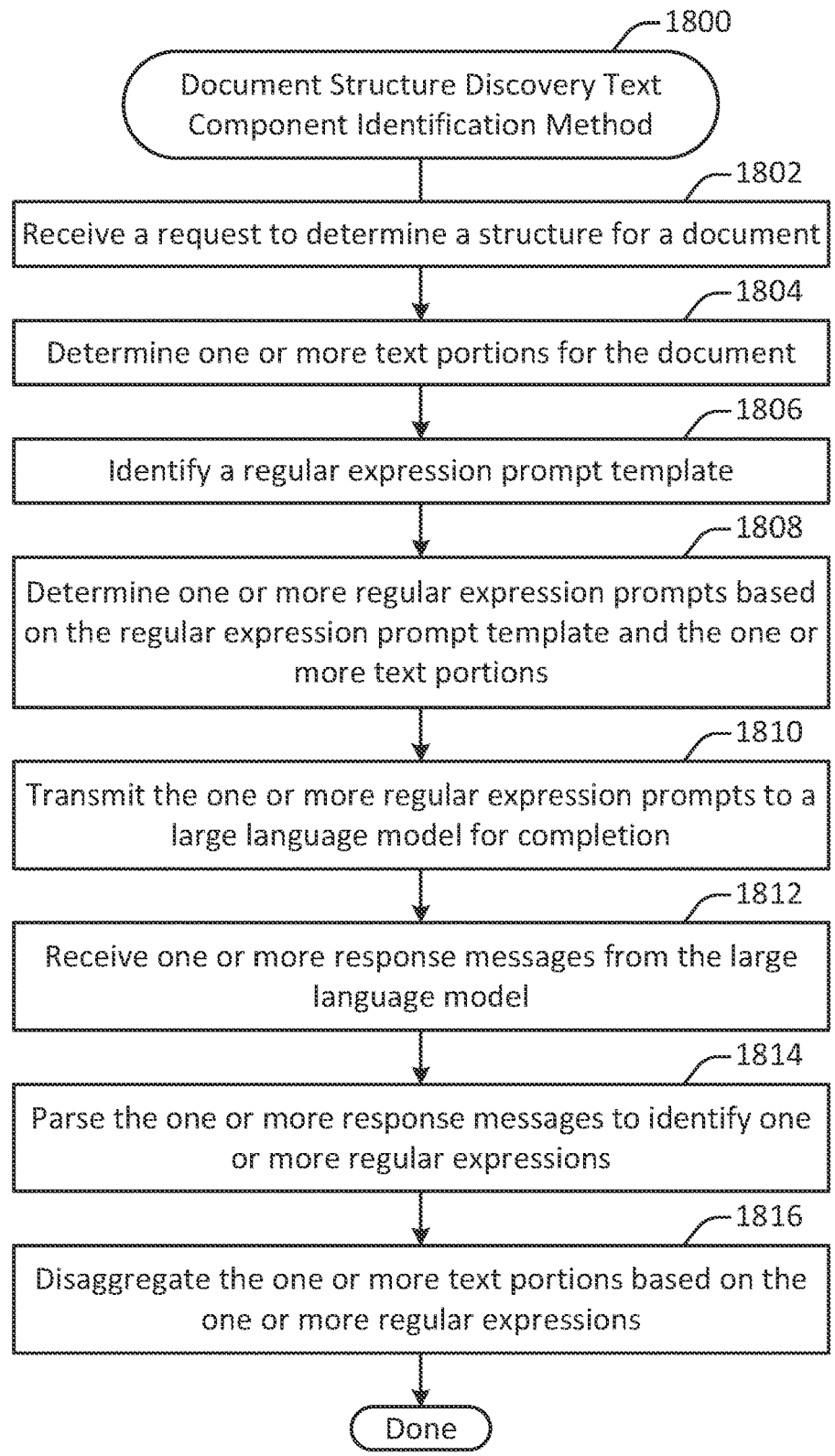
FIG. 18 illustrates a flow diagram for generating correspondence, configured in accordance with one or more embodiments.

FIG. 18 illustrates a method 1800 for identifying text components for document structure discovery, performed in accordance with one or more embodiments. According to various embodiments, the method 1800 may be performed at a computing device such as one or more devices within the text generation interface system 210 shown in FIG. 2.

At 1802, a request is received to determine a structure for a document. According to various embodiments, the request may be received in association with a document processing procedure. For example, the request may be received in association with a document summarization method such as the method 900 shown in FIG. 9. As another example, the request may be received in association with a request to update a database and/or query and filter a database based on document text, as is shown in FIGS. 10-12. As yet another example, the request may be received in association with a request to evaluate one or more documents based on one or more policies, as is shown in FIGS. 13-17.

One or more text portions for the document are determined at 1804. In some embodiments, the one or more text portions may be determined as discussed with respect to the document parsing method 300 shown in FIG. 3. Each portion of text may correspond to a sentence, a paragraph, a section, or some other suitable division.

In some embodiments, a text portion may be identified by use of a tag in a markup language such as XML. For example, in the following text passage, two different text portions (i.e., CC8 and CC9) were identified via XML tags.
   <CC8>ARTICLE 1 DEFINITIONS</CC8>
   <CC9>1.1 "Approval Achievement Date" means the earlier of the: (i) date on which Acme receives marketing approval for a Development Product in one-half of the countries included in the Sublicensed Territory, as defined in the Sublicense Agreement; or (ii) the payment by Acme to BigCo of Development Fees hereunder of $1.0 million.</CC9>

A regular expression prompt template is determined at 1806. In some implementations, a regular expression prompt template may include at least two components. First, the regular expression prompt template may include one or more fillable portions that may be filled with text from a document to create a regular expression prompt. A fillable portion may be specified via a markup language. For instance, a fillable portion may include language such as <text portion>, which may be replaced with an actual text portion to create a regular expression prompt.

Second, the regular expression prompt template may include one or more natural language instructions instructing a large language model to generate one or more regular expressions. In some embodiments, the natural language instructions may be implemented in natural language, not computer code. The natural language instructions may include information such as a format to be used for generating the one or more regular expressions, an example of a regular expression to generate, and the like. The natural language instructions may also include other information, such as an instruction to associate a regular expression with a document structure level, a markup tag, or other such information.

An example of a regular expression prompt template that may be used to generate regular expressions is as follows. In the following example, the fillable portion "{% for clause in clauses %}<CC{{loop.index0}}>{{clause.text}}</CC{{loop.index0}}>{% endfor %}" indicates where to insert the input text portions to create the regular expression prompt from the regular expression prompt template.

Purpose
You are an advanced legal AI assistant, proficient in understanding and generating an XML schema that outlines a contract. Your task is to analyze clauses from a contract and create an XML representation of the contract's structure, identifying how the sections and subsections are denoted and organized.

Instructions
Please consider the following instructions:
1. Examine the contract structure. Contracts generally use prefixing to indicate the hierarchy of sections. Use the provided clauses to determine:
The number of layers in the contract
The prefixes used to denote hierarchy levels
Regex patterns that can be used to identify these prefixes
2. Format your response as XML tags. Each tag must have the following attributes:
level: indicates a level of sectioning in the contract
pattern: regex pattern that can be used to identify the prefix or formatting
example: an example of the prefix

Examples

Input Example:
<CC0>APP ANNIE MASTER SUBSCRIPTION AGREEMENT ("MSA")</CC0>
<CC1>1. Definitions. Any capitalized terms not defined in this MSA will have the meaning set forth in the Agreement. </CC1>
<CC2>1.1 "App Annie" means the App Annie entity set forth in the Order Form. </CC2>
<CC3>1.2 "Customer" means the entity that signs the Order Form and expressly excludes any related entities, affiliates, subsidiaries, partners, customers, clients, or third-party agents.</CC3>
<CC4>1.3 "Subscription Start Date" has the meaning set forth in the initial Order Form.</CC4>
<CC5>1.4 "Order Form" means an ordering document for the Services that incorporates this MSA by reference and is entered into by the parties. 1.5 "Services" means those services identified in the Order Form.</CC5>
<CC6>1.6 "Subscription Term" means the term of the subscription identified in the applicable Order Form, including all renewals, for the Services.</CC6>
<CC7>2. Payment.</CC7>
<CC8>2.1 Customer agrees to pay the fees set forth in the Order Form. Unless otherwise expressly stated in an Order Form, all payments are due in United States Dollars. Customer will pay all wire, electronic transfer, and administrative fees associated with its payment of fees under the Agreement; such fees may not be deducted from the amount payable to App Annie hereunder. Payment obligations are non-cancelable, fees paid are non-refundable, and Customer shall not withhold, reduce, or set-off fees owed under the Agreement.</CC8>
<CC9>(a) Payment obligations may be cancelable only upon App Annie's written permission;</CC9>
Output Example:
<contract>
<section level="1" pattern="\d+\." example="1.">
<subsection level="2" pattern="\d+\.\d+\s" example="1.1">
<subsection level="3" pattern="\([a-z]\)" example="(a)"></subsection>
</subsection>
</section>
</contract>
Input
The input includes parts of a contract split into individual clauses. Your task is to verify if the clauses were correctly separated. Note that a single clause may contain multiple subclauses or sections, and your job is to generate regex patterns that can further segment these clauses.
The clauses are represented as follows:
{% for clause in clauses %}
<CC{{loop.index0}}>{{clause.text}}</CC{{loop.index0}}>
{% endfor %}
Output
Here is your response of the output with the XML schema showcasing the structure of this contract:
<|endofprompt|>
<contract>

One or more regular expression prompts are determined at 1808 based on the regular expression prompt template and the one or more text portions. In some embodiments, a regular expression prompt may be determined by replacing a markup portion of a regular expression prompt template identifying a location at which to insert one or more text portions with one or more of the text portions determined at 1804.

In some embodiments, a single regular expression prompt template may be generated. For instance, text portions may be selected from the beginning of the document, from the end of the document, or throughout the document until a designated length threshold is reached.

In some embodiments, multiple regular expression prompt templates may be generated. For instance, some or all of the text portions may be divided into different regular expression prompt templates, which may then be used independently to identify regular expressions.

The one or more regular expression prompts are transmitted to a large language model for completion at 1810. In some embodiments, the regular expression prompt may be transmitted to the large language model via the model API interface 252 shown in FIG. 2.

In some embodiments, the large language model may execute the one or more natural language instructions using the text portions included in the prompt to determine one or more regular expressions. The large language model may then complete the prompt by adding these regular expressions in accordance with the instructions.

One or more response messages are received from the large language model at 1812. The response messages are parsed to identify one or more regular expressions at 1814. In some embodiments, parsing a response message may involve extracting from the response message a portion corresponding to a regular expression. In the event that more than one response message is received, as may be the case if more than one prompt is created and sent, then regular expressions extracted from the different response messages may be deduplicated.

According to various embodiments, regular expressions may be specified in any suitable regular expression language. Examples of such languages include, but are not limited to: Python, Java, JavaScript, R, C, and C++.

In particular embodiments, regular expressions may be provided in the context of an overview of the document structure, with the regular expressions identifying text that signifies a new section. For example, the following text passage determined by a large language model based on the input text portions identified above includes three different regular expressions corresponding to different levels of the document structure:

<contract>
  <section level="1" pattern="ARTICLE\s\d+" example="ARTICLE 1">
    <subsection level="2" pattern="\d+\.\d+\s" example="1.1">
      <subsection level="3" pattern="\(i\)|\(ii\)\)" example="(i)"></subsection>
    </subsection>
  </section>
</contract>

The one or more text portions are disaggregated at 1816 based on the one or more regular expressions. In some embodiments, disaggregating the one or more text portions may involve applying the one or more regular expressions to the text portions to subdivide the text portions into smaller portions where appropriate and to provide structure metadata for the text portions. Additional details regarding the disaggregation and structuring of the text portions are discussed with respect to the method 1900 shown in FIG. 19 and the method 2000 shown in FIG. 20.

Figure 19:
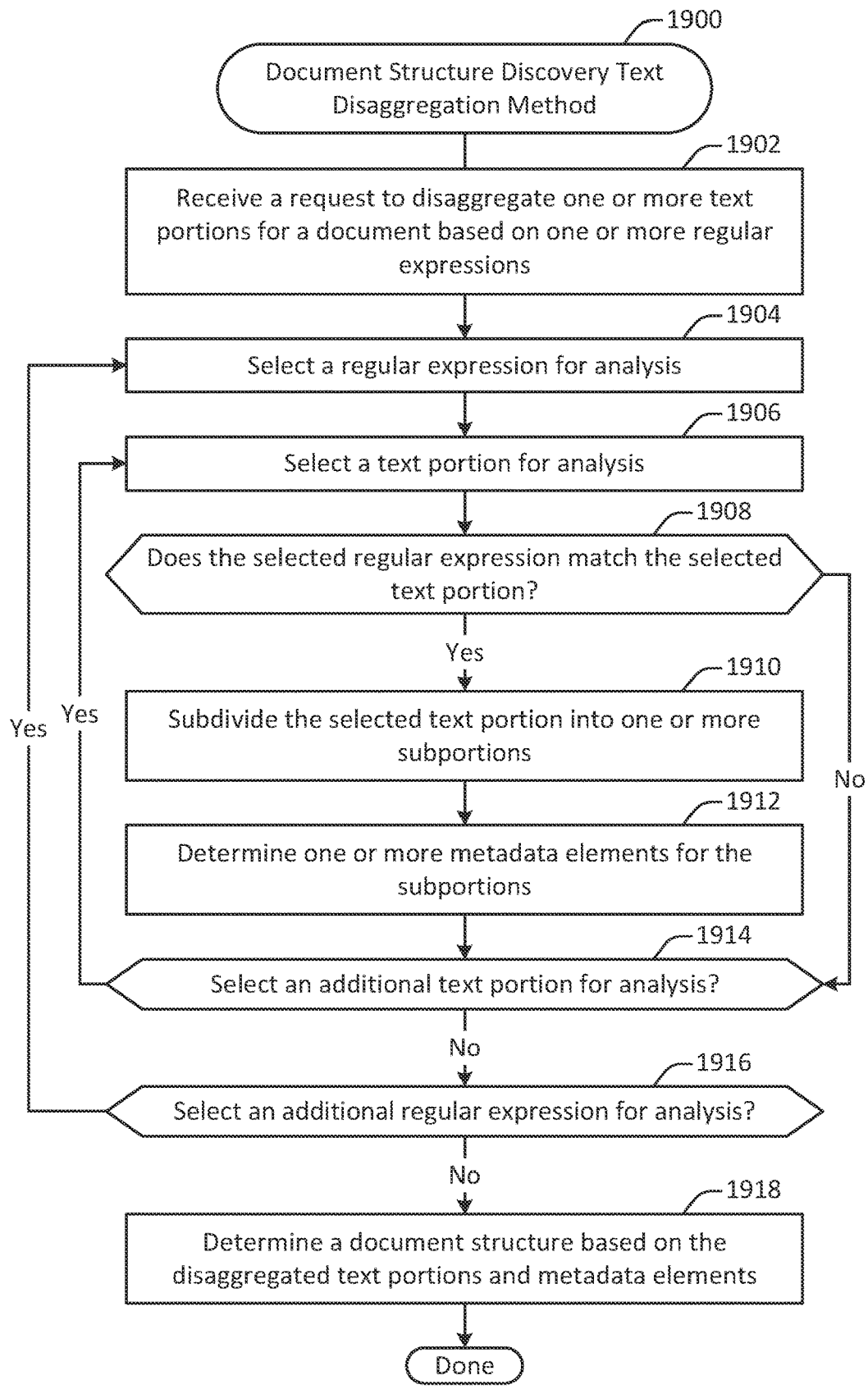
FIG. 19 illustrates a method for disaggregating text for document structure discovery, performed in accordance with one or more embodiments.

FIG. 19 illustrates a method 1900 for disaggregating text for document structure discovery, performed in accordance with one or more embodiments. According to various embodiments, the method 1900 may be performed at a computing device such as one or more devices within the text generation interface system 210 shown in FIG. 2.

A request to disaggregate one or more text portions for a document based on one or more regular expressions is received at 1902. In some embodiments, the request may be generated as discussed with respect to the operation 1816 shown in FIG. 18.

A regular expression is selected for analysis at 1904. In some embodiments, the regular expressions may be determined as discussed with respect to the operation 1814 shown in FIG. 18. Regular expressions may be selected for analysis in any suitable order.

In some embodiments, regular expressions may be selected for analysis in order of their place in a hierarchical structure, in a top-down fashion. For example, a regular expression that identifies a document heading may be selected for analysis before one that identifies a document subheading, which in turn may be selected for analysis before one that identifies a text passage that falls within a document subheading.

In some embodiments, regular expressions may be selected for analysis in order of their place in a hierarchical structure, in a bottom-up fashion. For example, a regular expression that identifies a document heading may be selected for analysis after one that identifies a document subheading, which in turn may be selected for analysis after one that identifies a text passage that falls within a document subheading.

A text portion is selected for analysis at 1906. According to various embodiments, text portions may be selected in sequence or in any suitable order. Text portions may be analyzed sequentially or in parallel.

A determination may be made at 1908 as to whether the regular expression matches the selected text portion. The regular expression may be applied to the text portion by executing one or more programming instructions that receive as input both the text portion and the regular expression.

If it is determined that the regular expression matches the selected text portion, then the selected text portion is subdivided into one or more sub-portions at 1910. The selected text portion may be subdivided in accordance with the regular expression. For example, the regular expression may include two or more components corresponding to the one or more sub-portions. As another example, the regular expression may match a first part of the text portion and not match a second part of the text portion, with the first and second parts then corresponding to different sub-portions.

In some embodiments, text sub-portions determined by subdivision at 1910 may be treated as text portions for the purpose of further regular expression analysis. That is, when a text sub-portion is determined, that text sub-portion may be added to the list of text portions so that it may be analyzed to determine whether it matches any regular expressions and should be subdivided again.

One or more metadata elements for the sub-portions are determined at 1912. In some embodiments, a sub-portion of text may be associated with one or more metadata elements that identify, for instance, the regular expression corresponding with the sub-portion, an identifier for the sub-portion, or any other suitable information.

In some embodiments, a metadata portion may be a new tag for a text portion. For instance, after applying the regular expressions to the text in the example provided above, the disaggregated text portions present after the application of the regular expressions may be identified via tags (e.g., XML) tags as shown in the following example:

<CC8>ARTICLE 1 DEFINITIONS</CC8>
<CC9>1.1 "Approval Achievement Date" means the earlier of the: </CC9>
<CC10>(i) date on which Acme receives marketing approval for a Development
Product in one-half of the countries included in the Sublicensed Territory, as defined in the Sublicense Agreement; or </CC10>
<CC11>(ii) the payment by Acme to BigCo of Development Fees hereunder of
$</CC11>
<CC12>1.0 million.</CC12>

A determination is made at 1914 as to whether to select an additional text portion for analysis. According to various embodiments, additional text portions may be selected until all text portions have been analyzed. For instance, additional text portions may be selected until a determination is made that the selected regular expression has been applied to all of the text portions.

A determination is made at 1916 as to whether to select an additional regular expression for analysis. In some embodiments, analysis may continue until all regular expressions have been selected.

In some embodiments, the operations shown in FIG. 19, or indeed in any method discussed herein, may be performed in an order different from that shown. For instance, in FIG. 19, a regular expression is shown as being first selected and then iteratively applied to text portions. However, alternatively, a text portion may be selected first and then iteratively divided via one or more regular expressions.

At 1918, a document structure is determined based on the disaggregated text portions and metadata elements. In some embodiments, the document structure may be determined as discussed with respect to the method 2000 shown in FIG. 20.

Figure 20:
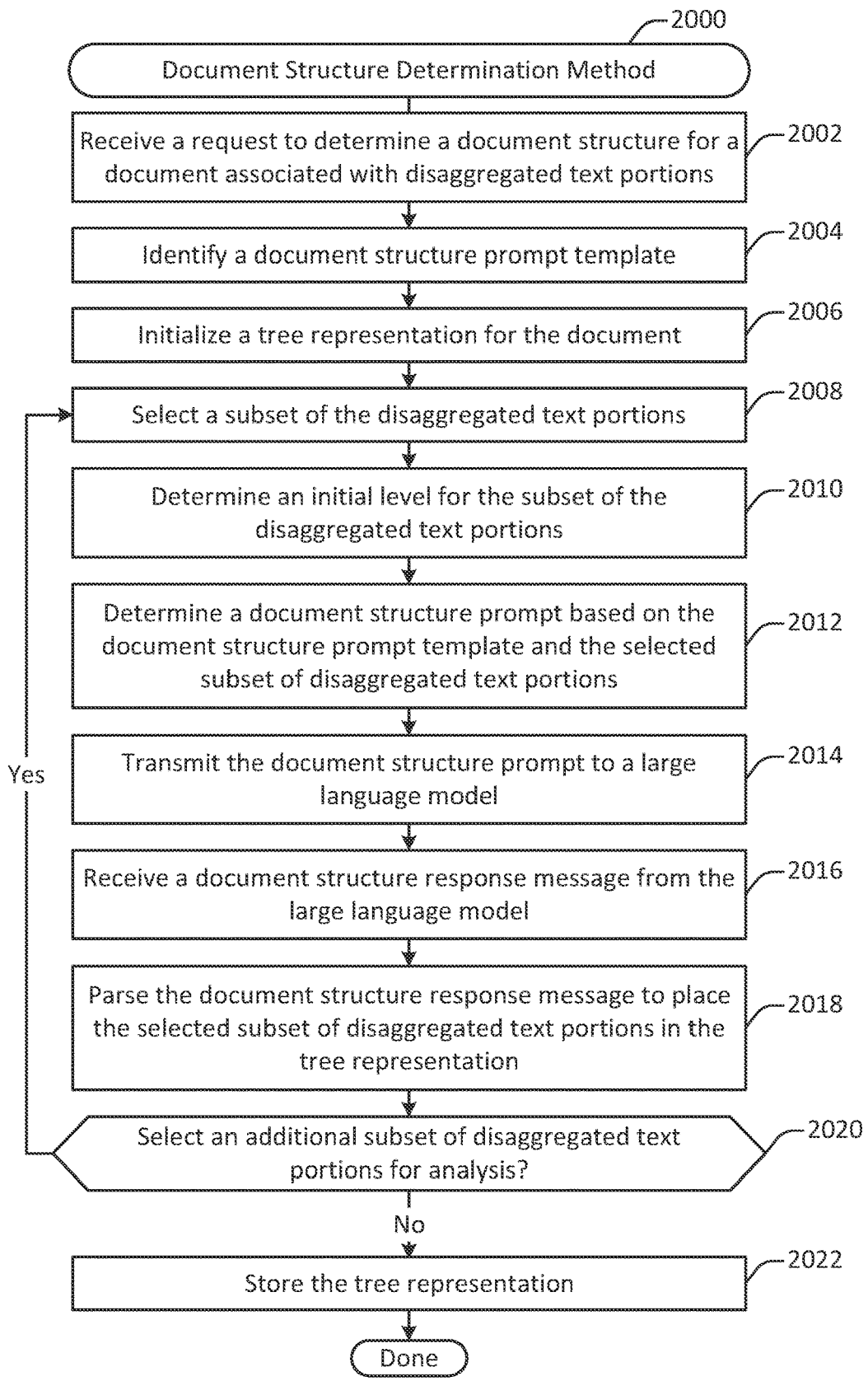
FIG. 20 illustrates a method of determining a document structure, performed in accordance with one or more embodiments.

FIG. 20 illustrates a method 2000 of determining a document structure, performed in accordance with one or more embodiments. According to various embodiments, the method 2000 may be performed at a computing device such as one or more devices within the text generation interface system 210 shown in FIG. 2.

A request to determine a document structure for a document associated with a set of disaggregated text portions is received at 2002. In some implementations, the request may be generated as discussed with respect to the operation 1918 shown in FIG. 19.

A document structure prompt template is identified at 2004. In some implementations, a document structure prompt template may include at least two components.

First, the document structure prompt template may include one or more fillable portions that may be filled with information selected from disaggregated text portions. A fillable portion may be specified via a markup language. For instance, a fillable portion may include language such as <text portion>, which may be replaced with information selected from a disaggregated text portion to create a document structure prompt.

Second, the document structure prompt template may include one or more natural language instructions instructing a large language model to generate structural information. In some embodiments, the natural language instructions may be implemented in natural language, not computer code. The natural language instructions may include information such as a format to be used for generating the one or more structural information, an example of structural information to generate, and the like.

An example of a document structure prompt template is as follows. In the following example, the fillable portion "{{example}}" may be used to provide an example of the hierarchical arrangement of text portions. Similarly, the fillable portions "{{root_clause.clause.text}}" and "{% for clause in clauses %}", "{{clause.idx}}", "{{clause.text }}", "{{clause.idx}}", and "{% endfor %}" indicate where to insert text and metadata information (e.g., a clause index) for the text portions.

> #Purpose
> You are a competent legal A.I. assistant. Your role is to generate an XML schema that accurately represents the hierarchical structure of a legal contract.
> ##Structure
> Below is an indicative representation of the contract's structure, and an example of how each prefix corresponds to the formats and prefixes used in the document. Use this information to discern the hierarchical levels of clauses while analyzing a contract section.
> Here is a representation of the contract hierarchy:
> {{example}}
> ##Instructions
> When constructing the XML schema's hierarchy, adhere to these instructions:
> 1. Evaluate the given contract clauses to discern the structure of the contract. Prefixes, numbering patterns, or formatting like bullet points can signify different levels of hierarchy in the contract. Aim to classify all CC #tags with a 'lvl' attribute, which denotes the hierarchical level they belong to, based on the context and prefix used.
> 2. At times, the text of a single coherent contract clause may be divided across multiple <CC #> tags. If the split parts form one continuous thought when combined, they should be merged in the XML output. Indicate this merging by including all relevant CC #values separated by a space in the 'ids' attribute, e.g., <clause ids="C# CC #">.
>> Note: Consider a 'continuous thought' to be a statement or clause that conveys one complete idea or concept. For instance, a definition of a term is one continuous thought, even if it's spread over multiple CC #tags. Similarly, if a sentence in one tag abruptly ends, and the sentence in the next tag logically continues the thought, they should be considered as one continuous thought.
>> Don't make the mistake of merging clauses solely because they fall under the same subsection and use similar prefixes. Each clause should be considered a separate entity unless the continuity of thought is broken across tags. In such cases, look for signs of abrupt discontinuation or new points starting within the same level of the hierarchy.
>> Additionally, observe if a single coherent prefix or numbering pattern is split across multiple tags. This can indicate a need to merge those clauses, as they likely form one continuous thought. However, remember that continuity of thought is paramount, and clauses should be merged even without a distinct prefix if they clearly belong together.
> 3. Some clauses serve as definitions for specific terms in the contract. In these instances, add an 'is_definition' attribute to the XML flag to indicate that it is a defined term, e.g., is_definition="Defined Term". Generally, this should be done only when it is evident that a contract clause is from a definitions section and is explicitly formatted to define a specific word or phrase.
> 4. A clause may also contain references to other sections of the contract. In these cases, include a 'references' attribute in the XML tag to specify the sections being referred to. The references should be separated by a '|' in the attribute, e.g., references="4.2|12|14".
> 5. Your output must include every contract clause provided in the input. Every CC #tag from the input must be represented in the response, ensuring the complete contract is accurately captured in the schema.

Examples

Input Example:
<contract_root>APP ANNIE MASTER SUBSCRIPTION AGREEMENT ("MSA")</contract_root>
. . .
<CC1>1. Definitions. Any capitalized terms not defined in this MSA will have the meaning set forth in the Agreement. </CC1>
<CC2>1.1 "App Annie" means the App Annie entity set forth in the Order Form. </CC2>
<CC3>1.2 "Customer" means the entity that signs the Order Form and expressly excludes any related entities, affiliates, subsidiaries, partners, customers, clients, or third-party agents. </CC3>
<CC4>1.3 "Subscription Start Date" has the meaning set forth in the initial Order Form. </CC4>
<CC5>1.4 "Order Form" means an ordering document for the Services that incorporates this MSA by reference and is entered into by the parties. </CC5>
<CC6>1.5 "Services" means those services identified in the Order Form. </CC6>
<CC7>1.6 "Subscription Term" means the term of the subscription identified in the applicable Order Form, including all renewals, for the Services. </CC7>
<CC8>2. Payment. </CC8>
<CC9>2.</CC9>
<CC10>1 Customer agrees to pay the fees set forth in the Order Form. Unless otherwise expressly stated in an Order Form, all payments are due in United States Dollars. Customer will pay all wire, electronic transfer, and administrative fees associated with its payment of fees under the Agreement; such fees may not be deducted from the amount payable to App Annie hereunder. Payment obligations are non-cancelable, fees paid are non-refundable, and Customer shall not withhold, reduce, or set-off fees owed under the Agreement. </CC10>
<CC11>2.2 If Customer in good faith disputes the accuracy of any portion of an App Annie invoice, then Customer shall pay all undisputed amounts when due, but may withhold any portion that is disputed in good faith pending resolution of the dispute, provided that Customer provides App Annie with written notice of such dispute within thirty (30) days of receipt of the invoice and provides reasonable detail for the basis of such dispute; otherwise such invoice will be deemed undisputed and due. If it is determined that Customer owes the disputed charges, then such charges will be paid with interest accrued beginning on the date such charges were originally due at the rate of </CC11>
<CC12>1.5% per month or the maximum rate permitted by law, whichever is lower, up until the date of receipt of payment. </CC12>
<CC13>2.3 Customer is responsible to maintain complete and accurate billing and contact information with App Annie to avoid termination or interruption of the Services. If Customer fails to pay any amount owed by the date such amount is due then App Annie may, without limiting its rights and remedies: </CC13>
<CC14>(a) suspend or terminate Customer's use of the Services until such amounts are paid in full; and </CC14>
<CC15>(b) charge Customer interest on the outstanding amount at the rate of </CC15>
<CC16>1.5% per month or the maximum rate permitted by law, whichever is lower. Customer agrees to reimburse</CC16>
<CC17>App Annie for all costs, expenses and attorneys' fees to collect past due balances and interest. </CC17>

Output Example:
<clause ids="CC1"|vl="1">
<clause ids="CC2"|vl="2" is_definition="App Annie">
<clause ids="CC3"|vl="2" is_definition="Customer">
<clause ids="CC4"|vl="2" is_definition="Subscription Start Date">
<clause ids="CC5"|vl="2" is_definition="Order Form">
<clause ids="CC6"|vl="2" is_definition="Services">
<clause ids="CC7"|vl="2" is_definition="Subscription Term">
<clause ids="CC8"|vl="1">
<clause ids="CC9 CC10"|vl="2">
<clause ids="CC11 CC12"|vl="2">
<clause ids="CC13"|vl="2">
<clause ids="CC14"|vl="3">
<clause ids="CC15 CC16 CC17"|vl="3">

Input
Here are the contract clauses for a contract:
<contract_root>{{root_clause.clause.text}}
</contract_root>
. . .
{% for clause in clauses %}
<CC{{clause.idx}}>{{clause.text}}</CC{{clause.idx}}>
{% endfor %}

Output:
Here is your response:
<|endofprompt|>

A tree representation for the document is initialized at 2006. According to various embodiments, the tree representation may be implemented in one or more of a variety of ways. For example, the tree representation may be implemented as a data structure in a programming language. As another example, the tree representation may be implemented as a structured document. For instance, the tree representation may be implemented as a JSON document, as an XML document, or as another type of markup language document.

A subset of the disaggregated text portions is selected at 2008. In some embodiments, the subset of the disaggregated text portions may be selected by selecting disaggregated text portions that fall below a designated size threshold. In this way, the selected subset may be combined with the document structure prompt template to determine a document structure prompt that is sufficiently small so as to be completed by a large language model without exceeding a maximum token size for the large language model.

An initial level for the subset of the disaggregated text portions is determined at 2010. In some embodiments, the disaggregated text portions may be divided into subsets. In such a situation, without having an initial level in a hierarchy identified for the subset of the disaggregated text portions, the large language model may have no way of knowing where the subset of the disaggregated text portions sits in the hierarchy. Accordingly, the initial level may be identified prior to determining a document structure prompt. For instance, the initial level may indicate a level in the hierarchy or tree corresponding to the first disaggregated text portion in the subset of the disaggregated text portions. Such information may be identified, for instance, via the method 1800 shown in FIG. 18. In this way, continuity between successive subsets of disaggregated text portions may be maintained. For example, in the following example, the model may be informed that clause <CC16> starts at the same level as <CC16> (e.g., level 3), so as to properly connect the clauses to the rest of the text portions across chunk breakpoints:

<CC14>2.1<CC14>
    <CC15>(i) . . . <CC15>
    ——Chunk Breakpoint——
    <CC16>(ii) . . . <CC16>
    <CC17>2.2<CC17>

A document structure prompt is determined at 2012 based on the document structure prompt template and the selected subset of disaggregated text portions. In some embodiments, the document structure prompt may be determined by filling one or more fillable portions of the document structure prompt template with the subset of the disaggregated text portions selected at 2008.

The document structure prompt is transmitted to a large language model at 2014. According to various embodiments, the document structure prompt template may be transmitted to the large language model via the model API interface 252 shown in FIG. 2.

In some embodiments, the large language model may then execute the one or more natural language instructions using the text portions included in the prompt to determine the structural information. The large language model may then complete the prompt by adding the structural information in accordance with the instructions.

According to various embodiments, the large language model may determine one or more of a variety of types of information about a disaggregated text portion. For example, the large language model may determine information such as an original identifier, an updated identifier, structure level information, definitional information, reference number information, and/or any other suitable information.

In some embodiments, an identifier for a disaggregated text portion may include and/or be based on structural metadata identification included in a text element of the disaggregated text portion. For instance, a portion of document text may include information such as "II.A.1" indicating that the text portion corresponds to the first subsection of Section A of Part II of the document.

In some embodiments, an identifier for a disaggregated text portion may include and/or be based on a sequential arrangement of text within the document. For instance, text portions within a document may be associated with a sequential index.

In some embodiments, an original identifier for a text portion may be assigned when text portions are originally processed. However, since a text portion may be subdivided as discussed with respect to operation 1910 shown in FIG. 19, two or more text portions may be associated with the same original identifier. Accordingly, the large language model may determine updated identifiers to ensure that different text portions are assigned different identifiers.

In some embodiments, structure level information may identify an outline depth or other such structural metadata. For instance, a portion of document text corresponding to "II.A.1" may be identified as belonging to a third structure level.

In some embodiments, reference number information may include one or more references to other portions of a document within a disaggregated text portion. For instance, subsection "II.A.1" of a document may include a text element that refers to subsection "II.B.3" of the document. Such a reference may be identified by analyzing the text and then recorded via a metadata reference from the disaggregated text portion to the referenced document portion.

In some implementations, definitional information may include information defined in a text element of the disaggregated text portion, which may be relevant for interpreting other portions of the document. For instance, if the disaggregated text portion includes a text element stating that "a material breach of contract is one that causes damages in excess of $10,000", then such information may be useful in interpreting another portion of the document that refers to "a material breach of contract". Definitional information may be extracted by the large language model and placed in a format such as a markup language for use in further analysis of the document.

A document structure response message is received from the large language model at 2016. In some embodiments, the document structure response message may include a version of the document structure prompt template that has been completed by the large language model. For instance, the document structure response message may include some or all of the identifiers, structure level information, definitional information, reference information, and/or other suitable information. An example of the type of document structure information that may be provided by the large language model is shown in the following text passage, which identifies information such as the level and the definition status for the clauses corresponding to the provided clause identifiers:

<clause ids="CC8"|v|="1">
    <clause ids="CC9"|v|="2" is_definition="Approval Achievement Date">
    <clause ids="CC10"|v|="3">
    <clause ids="CC11 CC12"|v|="3">

The document structure response message is parsed at 2018 to place the selected subset of disaggregated text portions in the tree representation. In some embodiments, parsing the document structure response message may involve extracting any or all of the disaggregated text portions as well as the information determined by the large language model. Such information may then be used to update the tree representation. For example, a data structure or markup language representation may be updated to include a portion that represents a disaggregated text portion including some or all of the information determined about the disaggregated text portion by the large language model.

In particular embodiments, placing the selected subset of disaggregated text portions in the tree representation may involve specifying one or more parent-child relationships. For example, based on the previous example, clauses CC10, CC11, and CC12 are children of clause CC9, which is in turn a child of clause CC8.

A determination is made at 2020 as to whether to select an additional subset of disaggregated text portions for analysis. According to various embodiments, additional subsets of disaggregated text portions may be selected until all available disaggregated text portions have been processed. Such processing may be completed in sequence or in parallel.

If it is determined not to select an additional subset of disaggregated text portions for analysis, then at 2022 the tree representation is stored. In some embodiments, the tree representation may be stored in a database system, a file repository, or in any suitable format for information retrieval. Additional details regarding the application of the tree representation are discussed with respect to the method 2100 shown in FIG. 21.

Figure 21:
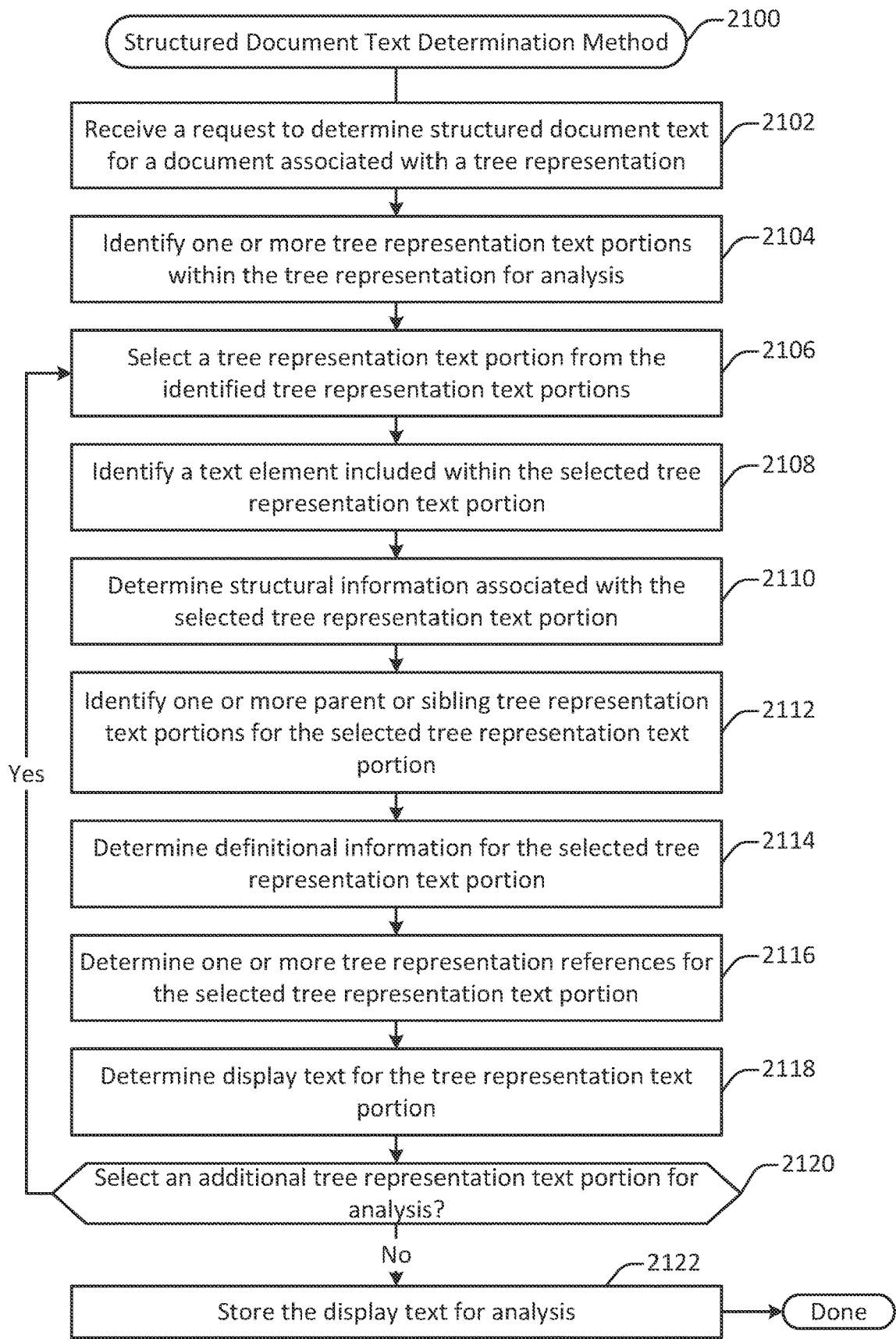
FIG. 21 illustrates a method of determining structured document text, performed in accordance with one or more embodiments.

FIG. 21 illustrates a method 2100 of determining structured document text, performed in accordance with one or more embodiments According to various embodiments, the method 2000 may be performed at a computing device such as one or more devices within the text generation interface system 210 shown in FIG. 2.

A request to determine structured document text for a document associated with a tree representation is received at 2102. In some embodiments, the request may be received in the context of a process for determining novel text, such as an application for generating correspondence, answering a question, or evaluating a document for compliance with a policy.

One or more tree representation text portions within the tree representation are identified for analysis at 2104. In some embodiments, the one or more tree representation text portions may be identified based on textual relevance to a particular application. For instance, the applications mentioned in the prior paragraph include operations in which relevant text is identified. Text passages identified as relevant may be analyzed based on structural information to determine display text enhanced with structural information using the method 2100.

A tree representation text portion is selected from the identified tree representation text portions at 2106. According to various embodiments, tree representation text portions may be selected in any suitable order. For example, tree representation text portions may be selected in sequence within a document. As another example, tree representation text portions may be selected in order of relevance.

At 2108, a text element included within the selected tree representation text portion is identified. In some embodiments, the text element may include the portion of the tree representation text portion that is from the input document. Such information may be stored directly in the tree representation or may be indexed there and retrieved from a different location.

Structural information associated with the selected tree representation text portion is determined at 2110. In some embodiments, the structural information may include, for instance, a structure level associated with the text portion. For example, a text portion may be identified as residing at "level 3" of a document.

One or more parent or sibling tree representation text portions are identified for the selected tree representation text portion at 2112. In some embodiments, the tree representation may store parent-child relationships. For instance, in the example above, contract clause CC9 was identified as a child of contract clause CC8. One or more parent text portions may be identified for presentation so as to provide appropriate contextual information derived from the text structure. Similarly, one or more sibling text portions may be identified in the event that such information is useful.

Definitional information for the selected tree representation text portion is determined at 2114. According to various embodiments, definitional information may indicate that a particular text portion is a definition. The definitional information may identify information such as the term being defined and the definition for the defined term.

One or more tree representation references for the selected tree representation text portion is determined at 2116. In some embodiments, a tree representation reference may include an identifier associated with a different tree representation portion (e.g., CC15) referenced by the focal tree representation text portion. Such references may be used to retrieve text for the referenced text portion or portions.

Display text for the tree representation text portion is determined at 2118. According to various embodiments, the display text may include some or all of the information determined and identified as discussed with respect to the operations 2108 through 2116. An example of the display text determined in keeping with the examples provided above is as follows, with the text arrows being used to indicate structure levels and the ellipsis being used to indicate text that is not displayed:

Exhibit 10.1

. . .

ARTICLE 1 DEFINITIONS
        1.1 "Approval Achievement Date" means the earlier of the:
            (i) date on which Acme receives marketing approval for a Development Product in one-half of the countries included in the Sublicensed Territory, as defined in the Sublicense Agreement; or
            (ii) the payment by Acme to BigCo of Development Fees hereunder of $1.0 million.

In some embodiments, definitional and/or reference information may be used to augment the display text with text portions other than that selected. For example, if the following contract clause were identified as relevant, then Section 1.1 and one or more of its children may be displayed since the definition for "Approval Achievement Date" was used in this clause.

<CC15>1.7 "Development Territory" means (i) until the Approval Achievement Date, the Sublicensed Territory, as defined in the Sublicense Agreement; and (ii) after the Approval Achievement Date, the Sublicensed Territory, as defined in the Sublicense Agreement, other than Poland.</CC15>

In some embodiments, parent/child information may be used to augment the display text with text portions other than that selected. For example, if the section 2.1(ii) were identified as relevant, then Section 2.1 may be displayed also since it is a parent of 2.1(ii):

<CC18>2.1 Subject to the terms and conditions of this Agreement, Acme hereby agrees to use its commercially reasonable efforts in good faith to take, or cause to be taken, all actions, and to do or cause to be done, all things necessary, proper or desirable or advisable under applicable laws to develop and commercialize the Development Products, with a goal of eventual approval of Development Products in the Development Territory. In exchange for the payment by Acme of the Development Fee to BigCo, BigCo hereby agrees to pay Acme the following payments: </CC18>
    <CC19>(i) within thirty Business Days from the date of this Agreement, BigCo will make an upfront payment of $225,000 to Acme; and </CC19>
    <CC20>(ii) within thirty days of the verified achievement of the Phase II Milestone, (such verification shall be conducted by an independent third party mutually acceptable to the parties hereto), BigCo will make a payment of $775,000 to Acme. </CC20>

A determination is made at 2120 as to whether to select an additional tree representation text portion for analysis. According to various embodiments, tree representations may continue to be selected for analysis until a terminating condition is reached. For example, tree representations may continue to be selected until all tree representations identified as relevant have been selected. As another example, tree representations may continue to be selected until the amount of display text reaches a threshold, such as a maximum amount of text that can be included in a prompt.

Upon determining that an additional tree representation text portion is not to be identified, then the display text is stored for analysis at 2122. According to various embodiments, the display text may then be used in any of a variety of applications, examples of which are discussed throughout the application, for instance with respect to FIGS. 8-18.

According to various embodiments, the operations shown in FIG. 21, or indeed in any method described herein, may be performed in an order different than that shown. For example, one or more operations may be performed in parallel. As another example, relevant tree representation text portions may first be collected by iteratively identifying (1) tree representation text portions initially deemed relevant, (2) tree representation text portions referenced by other tree representation text portions deemed relevant, (3) parent, child, or sibling nodes of tree representation text portions deemed relevant. Then, the display text may be determined for the tree representation text portions identified as relevant.

In some embodiments, one or more of the operations shown in FIG. 21 may be omitted. For example, operation 2114 may be omitted for tree representations that do not correspond to definitions.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of large language models. However, the techniques of disclosed herein apply to a wide variety of language models. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
   determining a regular expression prompt via a hardware processor by combining a regular expression prompt template with input text from an input document, the regular expression prompt template including a natural language instruction to identify one or more regular expressions from the input text, the regular expression prompt template also including one or more fillable portions designated for filling with the input text;
   transmitting the regular expression prompt to a large language model for evaluation via a model interface;
   identifying the one or more regular expressions based on a response received from the large language model;
   determining a plurality of disaggregated text portions by applying the one or more regular expressions to subdivide the input text into the disaggregated text portions;
   determining a structured document that includes the disaggregated text portions and structural information for the disaggregated text portions, the structural information characterizing a hierarchical relationship among the disaggregated text portions;
   receiving a query identifying one or more characteristics for querying the structured document; and
   transmitting via a communication interface a query response that includes a subset of the input text selected based on evaluating the query based at least in part on the structural information included in the structured document.

2. The method recited in claim 1, wherein determining the structured document comprises:
   determining a document structure prompt based on a document structure prompt template and the plurality of disaggregated text portions, the document structure prompt template including a document structure natural language instruction to identify the structural information, the document structure prompt template also include one or more fillable elements designated for filling with the plurality of disaggregated text portions.

3. The method recited in claim 2, wherein determining the structured document further comprises:
   transmitting the document structure prompt to a large language model for evaluation via the model interface;
   receiving a document structure response from the large language model, the document structure response including a completed portion that includes the structural information; and
   parsing the response to identify the structural information.

4. The method recited in claim 1, wherein the structural information identifies a designated level in a hierarchy corresponding to a designated disaggregated text portion of the plurality of disaggregated text portions.

5. The method recited in claim 1, wherein the structural information identifies a parent-child relationship between a first designated disaggregated text portion of the plurality of disaggregated text portions and a second designated disaggregated text portion of the plurality of disaggregated text portions.

6. The method recited in claim 1, wherein the structural information identifies a first designated disaggregated text portion of the plurality of disaggregated text portions referenced by a second designated disaggregated text portion of the plurality of disaggregated text portions.

7. The method recited in claim 1, wherein the structural information identifies a term defined by a definitional disaggregated text portion of the plurality of disaggregated text portions.

8. The method recited in claim 1, wherein the query response includes a first text element from a first disaggregated text portion of the plurality of disaggregated text portions selected based on the one or more characteristics.

9. The method recited in claim 8, wherein the query response includes a second text element from a second disaggregated text portion of the plurality of disaggregated text portions selected based on a structural relationship between the first disaggregated text portion and the second disaggregated text portion, the structural relationship being reflected in the structural information.

10. The method recited in claim 9, wherein the structural relationship is a parent-child relationship.

11. The method recited in claim 9, wherein the structural relationship is a sibling relationship.

12. The method recited in claim 8, wherein the query response identifies a hierarchy level for the first text element determined based on the structural information.

13. A computing system having a hardware processor and a communication interface, the computing system being configured to perform a method comprising:
    determining a regular expression prompt via the hardware processor by combining a regular expression prompt template with input text from an input document, the regular expression prompt template including a natural language instruction to identify one or more regular expressions from the input text, the regular expression prompt template also including one or more fillable portions designated for filling with the input text;
    transmitting the regular expression prompt to a large language model for evaluation via a model interface interacting with the communication interface;
    identifying the one or more regular expressions based on a response received from the large language model;
    determining a plurality of disaggregated text portions by applying the one or more regular expressions to subdivide the input text into the disaggregated text portions;
    determining a structured document that includes the disaggregated text portions and structural information for the disaggregated text portions, the structural information characterizing a hierarchical relationship among the disaggregated text portions;
    receiving a query identifying one or more characteristics for querying the structured document; and
    transmitting via a communication interface a query response that includes a subset of the input text selected based on evaluating the query based at least in part on the structural information included in the structured document.

14. The computing system recited in claim 13, wherein determining the structured document comprises:
    determining a document structure prompt based on a document structure prompt template and the plurality of disaggregated text portions, the document structure prompt template including a document structure natural language instruction to identify the structural information, the document structure prompt template also include one or more fillable elements designated for filling with the plurality of disaggregated text portions.

15. The computing system recited in claim 14, wherein determining the structured document further comprises:
    transmitting the document structure prompt to a large language model for evaluation via the model interface;
    receiving a document structure response from the large language model, the document structure response including a completed portion that includes the structural information; and
    parsing the response to identify the structural information.

16. The computing system recited in claim 13, wherein the structural information identifies a designated level in a hierarchy corresponding to a designated disaggregated text portion of the plurality of disaggregated text portions.

17. The computing system recited in claim 13, wherein the structural information identifies a parent-child relationship between a first designated disaggregated text portion of the plurality of disaggregated text portions and a second designated disaggregated text portion of the plurality of disaggregated text portions.

18. The computing system recited in claim 13, wherein the structural information identifies a first designated disaggregated text portion of the plurality of disaggregated text portions referenced by a second designated disaggregated text portion of the plurality of disaggregated text portions.

19. The computing system recited in claim 13, wherein the structural information identifies a term defined by a definitional disaggregated text portion of the plurality of disaggregated text portions.

20. One or more non-transitory computer readable media having instructions stored thereon for performing a method, the method comprising:
    determining a regular expression prompt via the hardware processor by combining a regular expression prompt template with input text from an input document, the regular expression prompt template including a natural language instruction to identify one or more regular expressions from the input text, the regular expression prompt template also including one or more fillable portions designated for filling with the input text;
    transmitting the regular expression prompt to a large language model for evaluation via a model interface interacting with the communication interface;
    identifying the one or more regular expressions based on a response received from the large language model;
    determining a plurality of disaggregated text portions by applying the one or more regular expressions to subdivide the input text into the disaggregated text portions;
    determining a structured document that includes the disaggregated text portions and structural information for the disaggregated text portions, the structural information characterizing a hierarchical relationship among the disaggregated text portions;
    receiving a query identifying one or more characteristics for querying the structured document; and
    transmitting via a communication interface a query response that includes a subset of the input text selected based on evaluating the query based at least in part on the structural information included in the structured document.

* * * * *